INVENTOR
Joseph Gardberg

Dec. 11, 1962 J. GARDBERG 3,067,661

PHOTOCOMPOSING SYSTEM

Original Filed Dec. 27, 1957 32 Sheets-Sheet 2

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 3

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 4

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 5

INVENTOR

Joseph Gardberg

INVENTOR
Joseph Gardberg

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 8

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 9

INVENTOR

Joseph Gardberg

Dec. 11, 1962 J. GARDBERG 3,067,661
PHOTOCOMPOSING SYSTEM
Original Filed Dec. 27, 1957 32 Sheets-Sheet 10

INVENTOR
Joseph Gardberg

Dec. 11, 1962 J. GARDBERG 3,067,661

PHOTOCOMPOSING SYSTEM

Original Filed Dec. 27, 1957 32 Sheets-Sheet 11

INVENTOR
Joseph Gardberg

INVENTOR
Joseph Gardberg

INVENTOR
Joseph Gardberg

Dec. 11, 1962 J. GARDBERG 3,067,661

PHOTOCOMPOSING SYSTEM

Original Filed Dec. 27, 1957

32 Sheets-Sheet 14

INVENTOR

Joseph Gardberg

INVENTOR
Joseph Gardberg

INVENTOR
Joseph Gardberg

Dec. 11, 1962 J. GARDBERG 3,067,661

PHOTOCOMPOSING SYSTEM

Original Filed Dec. 27, 1957 32 Sheets-Sheet 17

INVENTOR

Joseph Gardberg

INVENTOR
Joseph Gardberg

INVENTOR
Joseph Gardberg

INVENTOR
Joseph Gardberg

Dec. 11, 1962 J. GARDBERG 3,067,661

PHOTOCOMPOSING SYSTEM

Original Filed Dec. 27, 1957 32 Sheets-Sheet 21

INVENTOR
Joseph Gardberg

INVENTOR
Joseph Gardberg

INVENTOR
Joseph Gardberg

INVENTOR
Joseph Gardberg

INVENTOR
Joseph Gardberg

INVENTOR
Joseph Gardberg

INVENTOR
Joseph Gardberg

INVENTOR
Joseph Gardberg

| | | | | | | |
|---|---|---|---|---|---|---|
| FIG. 17 | FIG. 18 | FIG. 19 | FIG. 20 | FIG. 21 | FIG. 22 | FIG. 23 |
| FIG. 24 | FIG. 25 | FIG. 26 | FIG. 27 | FIG. 28 | FIG. 29 | FIG. 30 |

INVENTOR
Joseph Gardberg

Dec. 11, 1962 J. GARDBERG 3,067,661

PHOTOCOMPOSING SYSTEM

Original Filed Dec. 27, 1957 32 Sheets-Sheet 30

INVENTOR

Joseph Gardberg

INVENTOR

Joseph Gardberg

Dec. 11, 1962 J. GARDBERG 3,067,661

PHOTOCOMPOSING SYSTEM

Original Filed Dec. 27, 1957 32 Sheets-Sheet 32

INVENTOR

United States Patent Office 3,067,661

Patented Dec. 11, 1962

3,067,661

PHOTOCOMPOSING SYSTEM

Joseph Gardberg, Chicago, Ill., assignor to Allan Friedman, Skokie, Ill.

Original application Dec. 27, 1957, Ser. No. 705,659. Divided and this application Aug. 17, 1959, Ser. No. 835,162

11 Claims. (Cl. 95—4.5)

This invention relates to a photocomposing system, and more particularly to a system wherein justified text material is reproduced photographically.

This application is a division of copending application Serial No. 705,659, filed December 27, 1957.

In the past, many systems have been developed for reproducing text material and for justifying such material. For the most part, these systems have been basically mechanical, and of late years, the trend has been toward systems which combine certain mechanical elements with electrical or electronic circuits. While these latter systems are less cumbersome than the wholly-mechanical systems, the need of a relatively simple, inexpensive, extremely accurate and completely electronically-controlled photocomposing system still exists.

An object of this invention is to provide simple and efficient means for the reproducing of justified text material photographically.

Other objects and many of the attendant advantages of this invention will be readily appreciated as the invention becomes better understood by reference to the following description when taken in conjunction with the following drawings, wherein.

Figure 1:
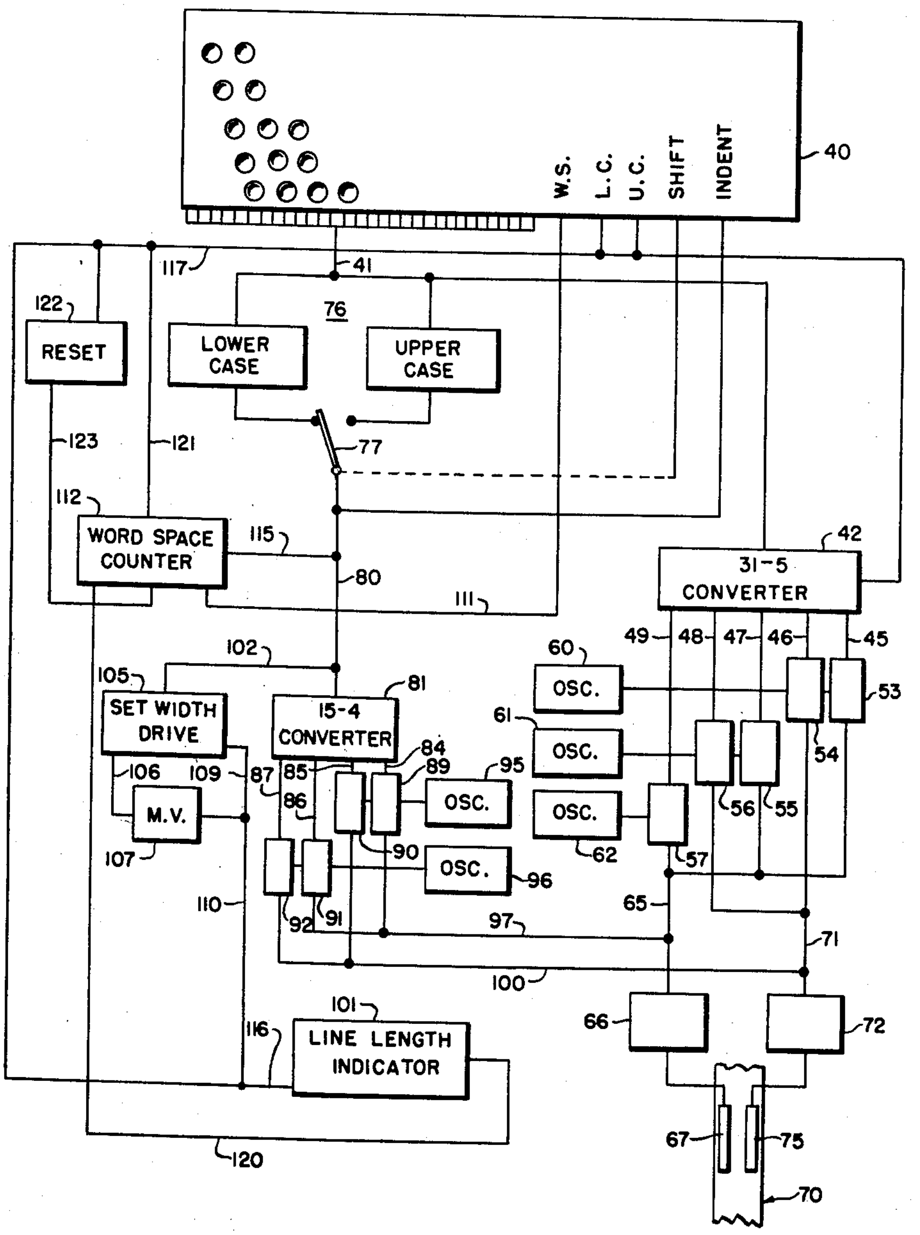
FIG. 1 is a functional diagram of a recorder according to the invention.
Figure 2:
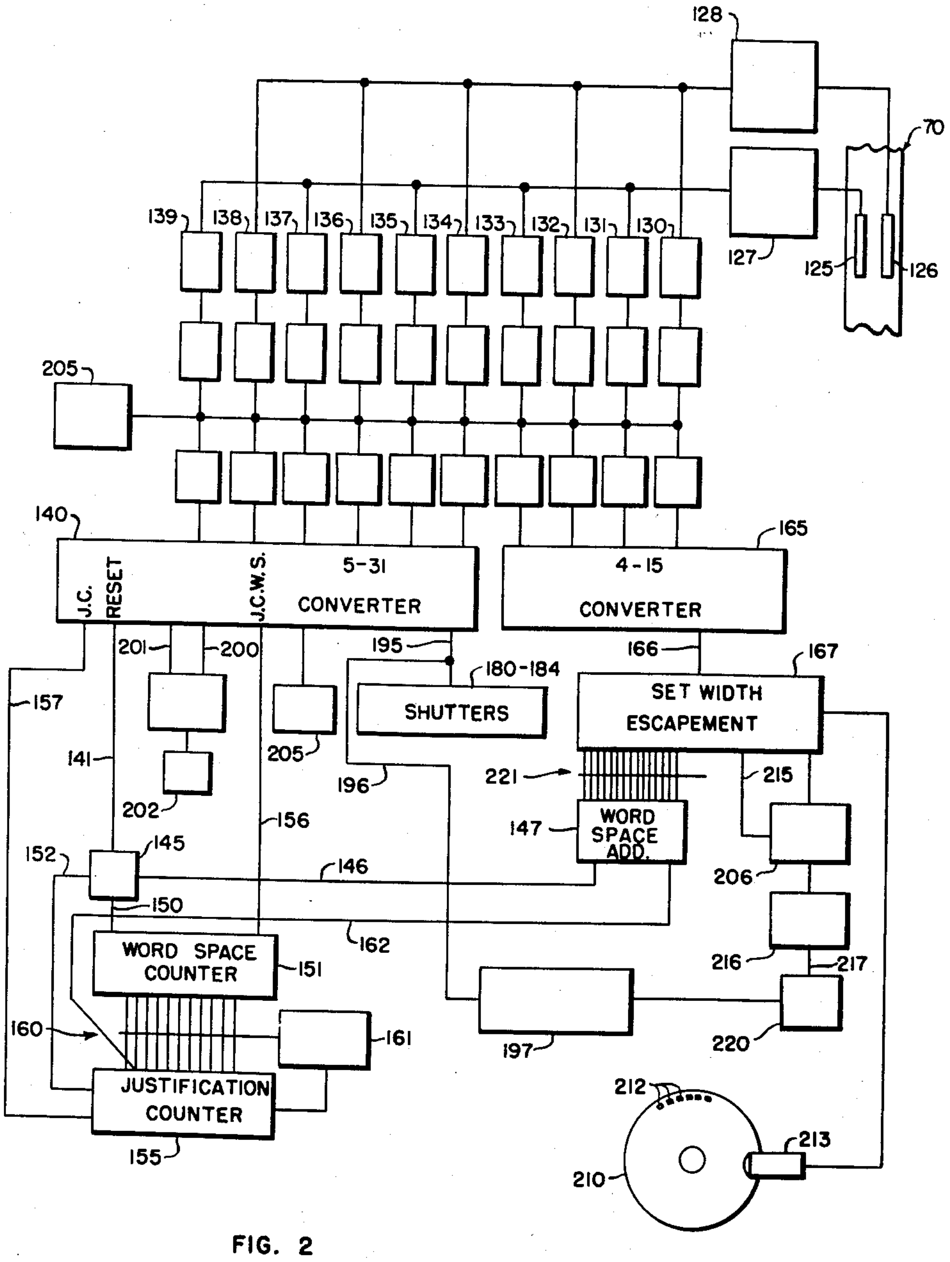
FIG. 2 is a functional diagram of a printer according to the invention.
Figure 3:
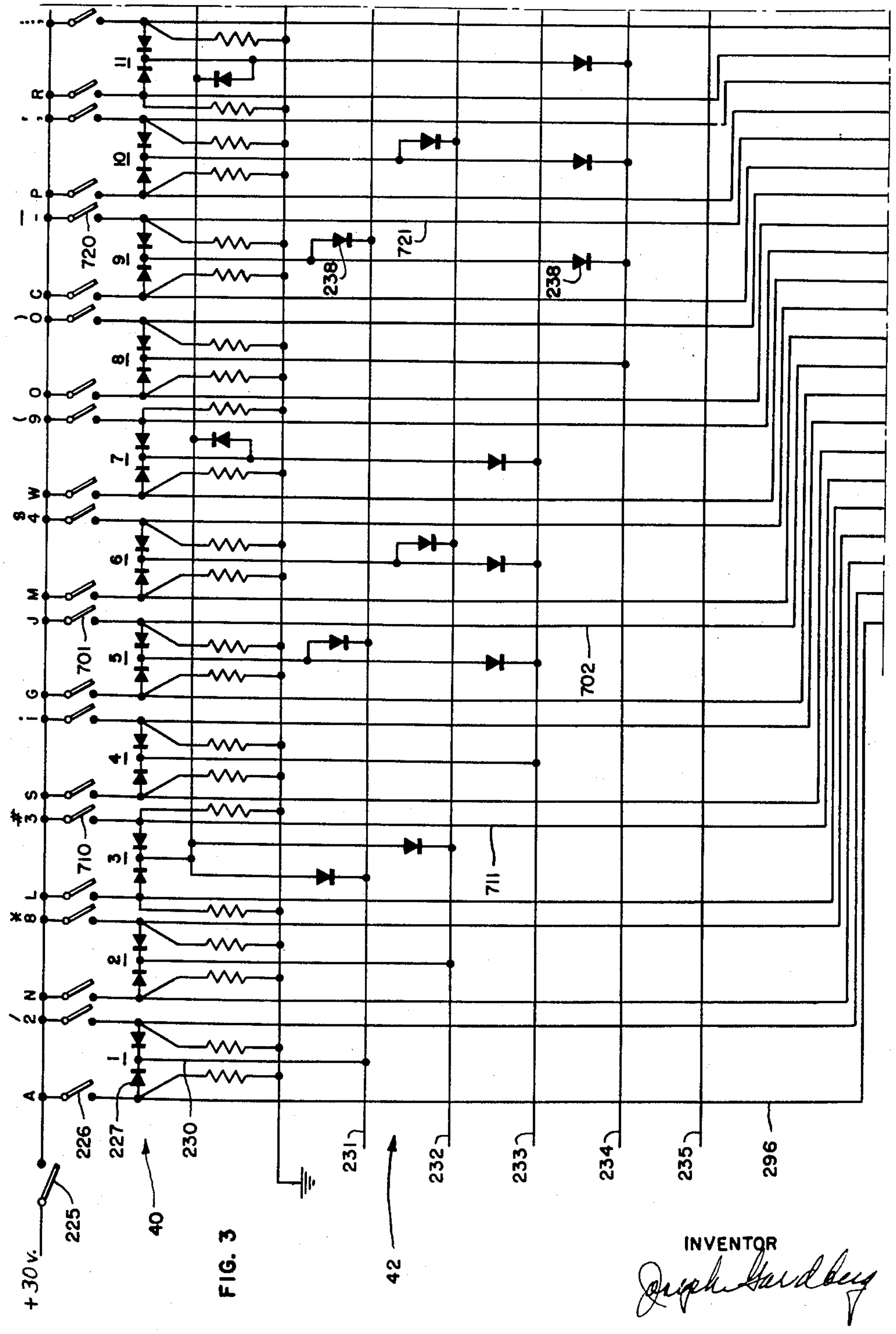
Figures 15, 16:
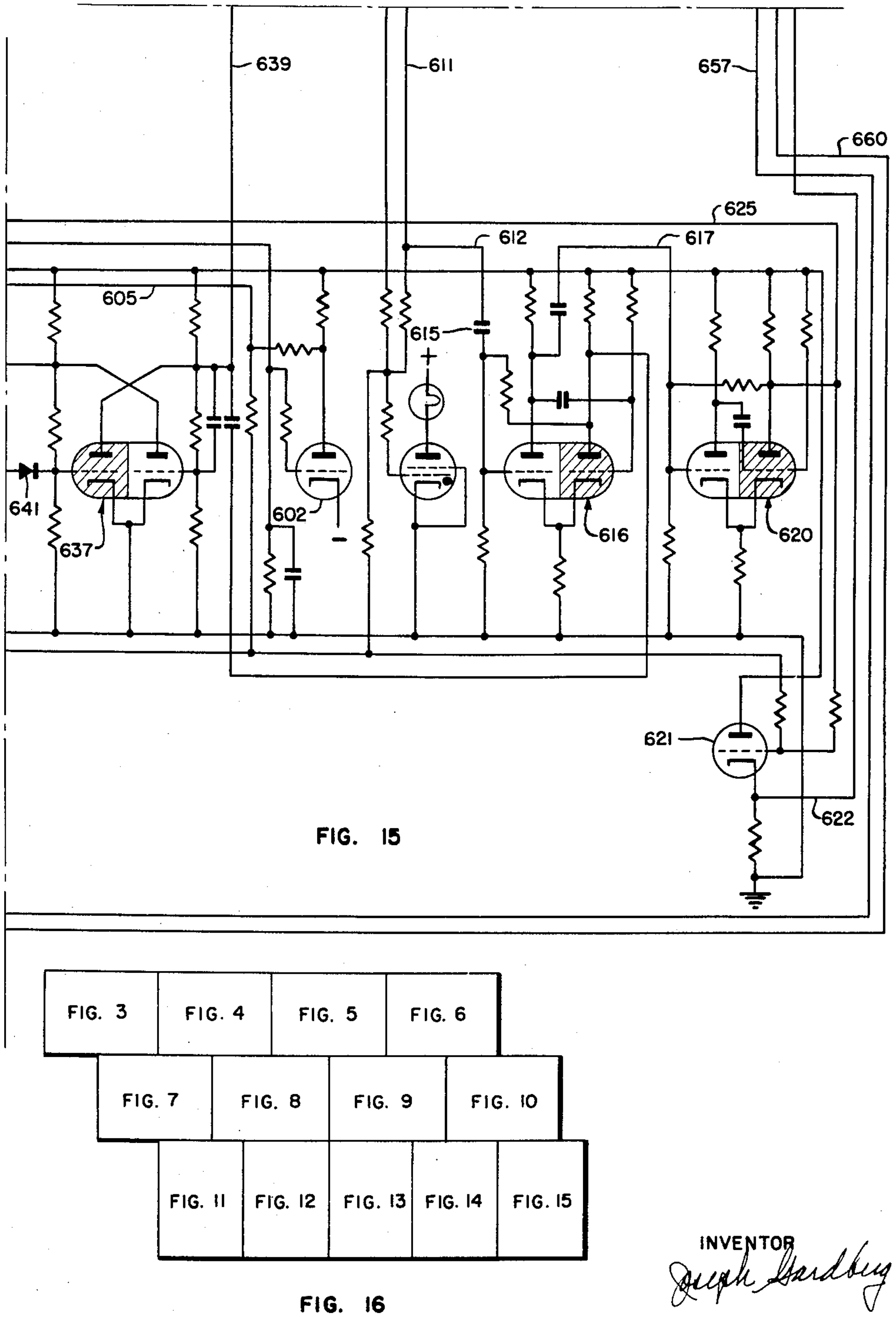
Figure 17:
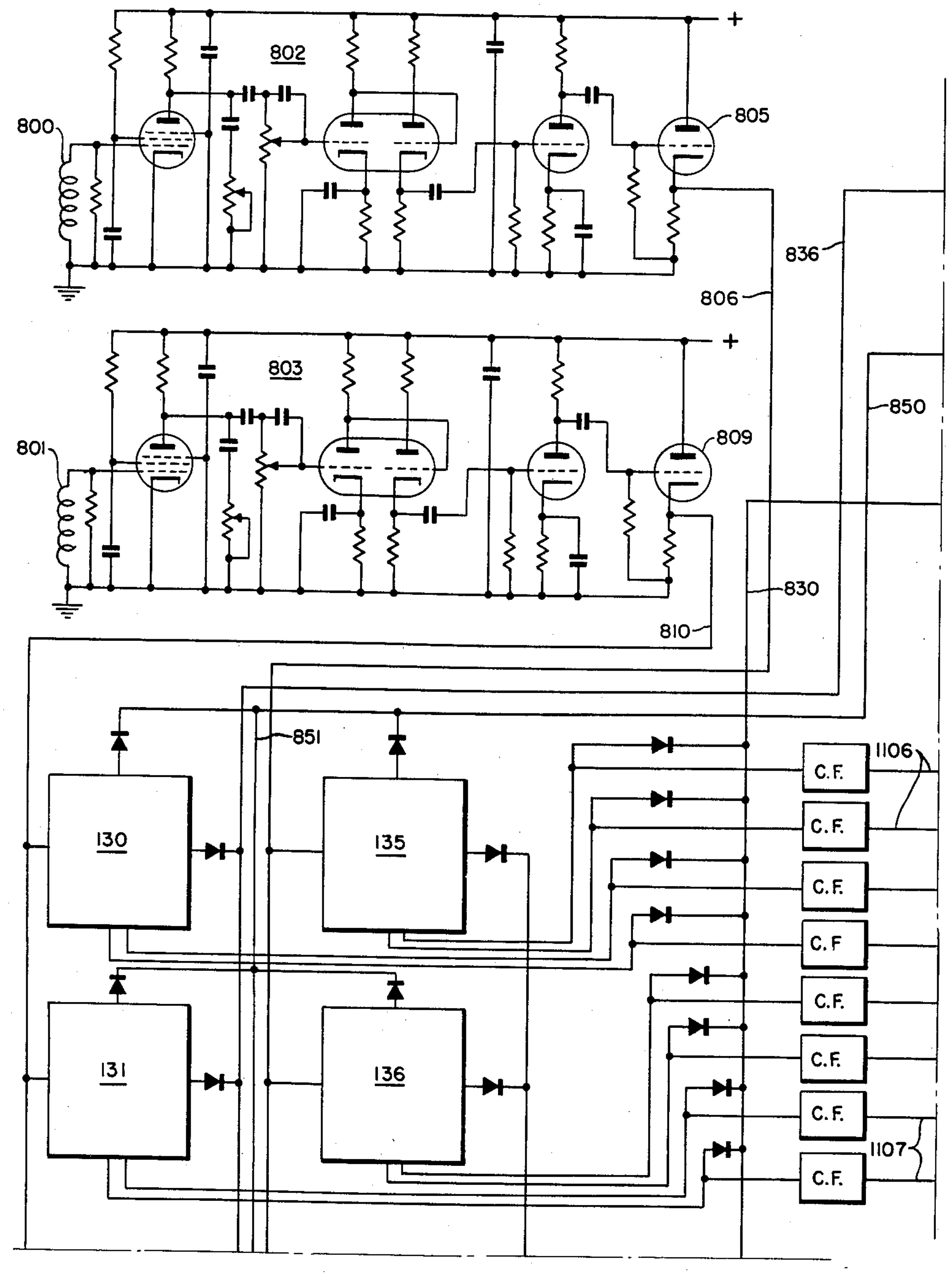
Figure 29:
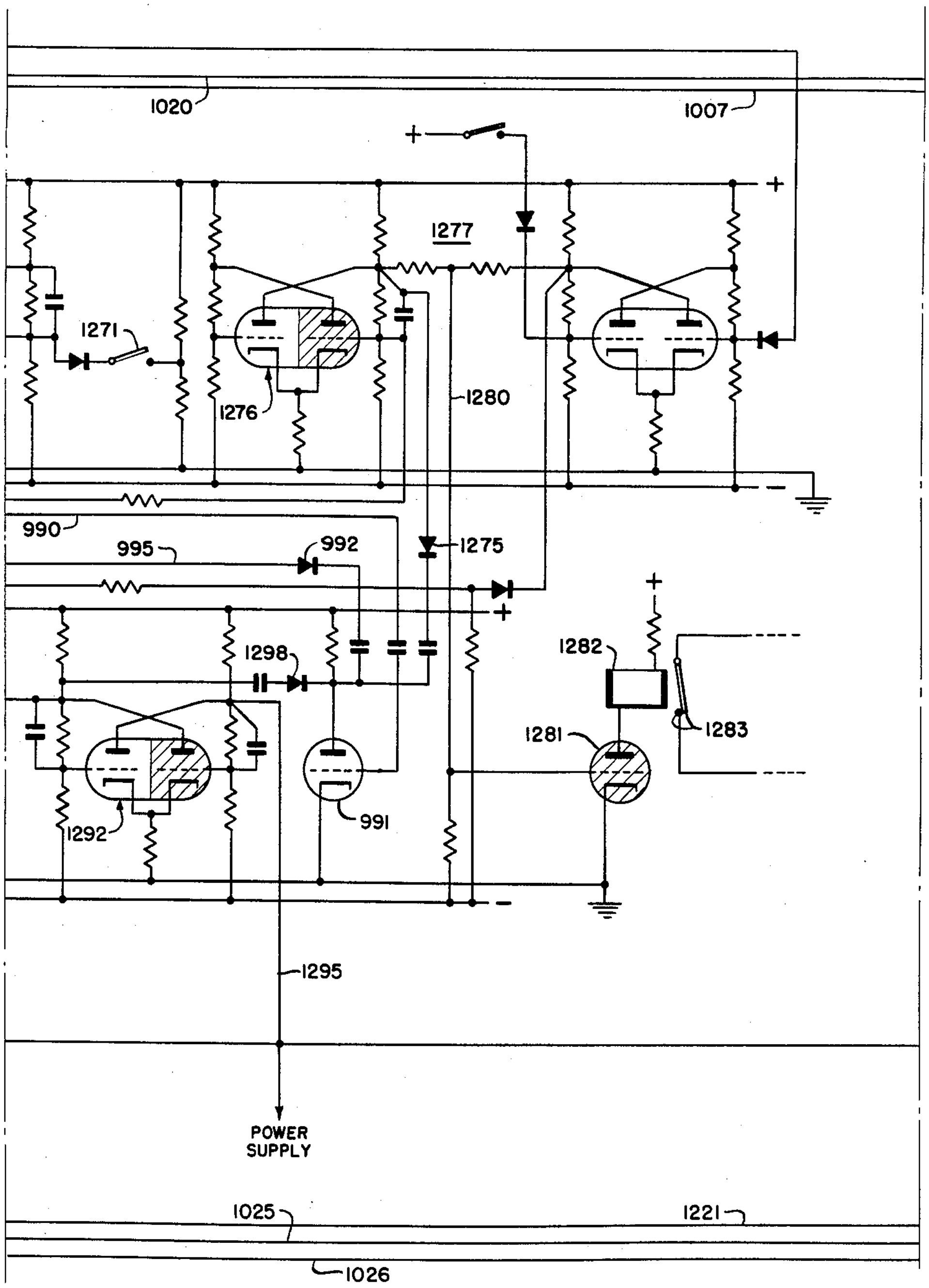
Figures 30, 31:
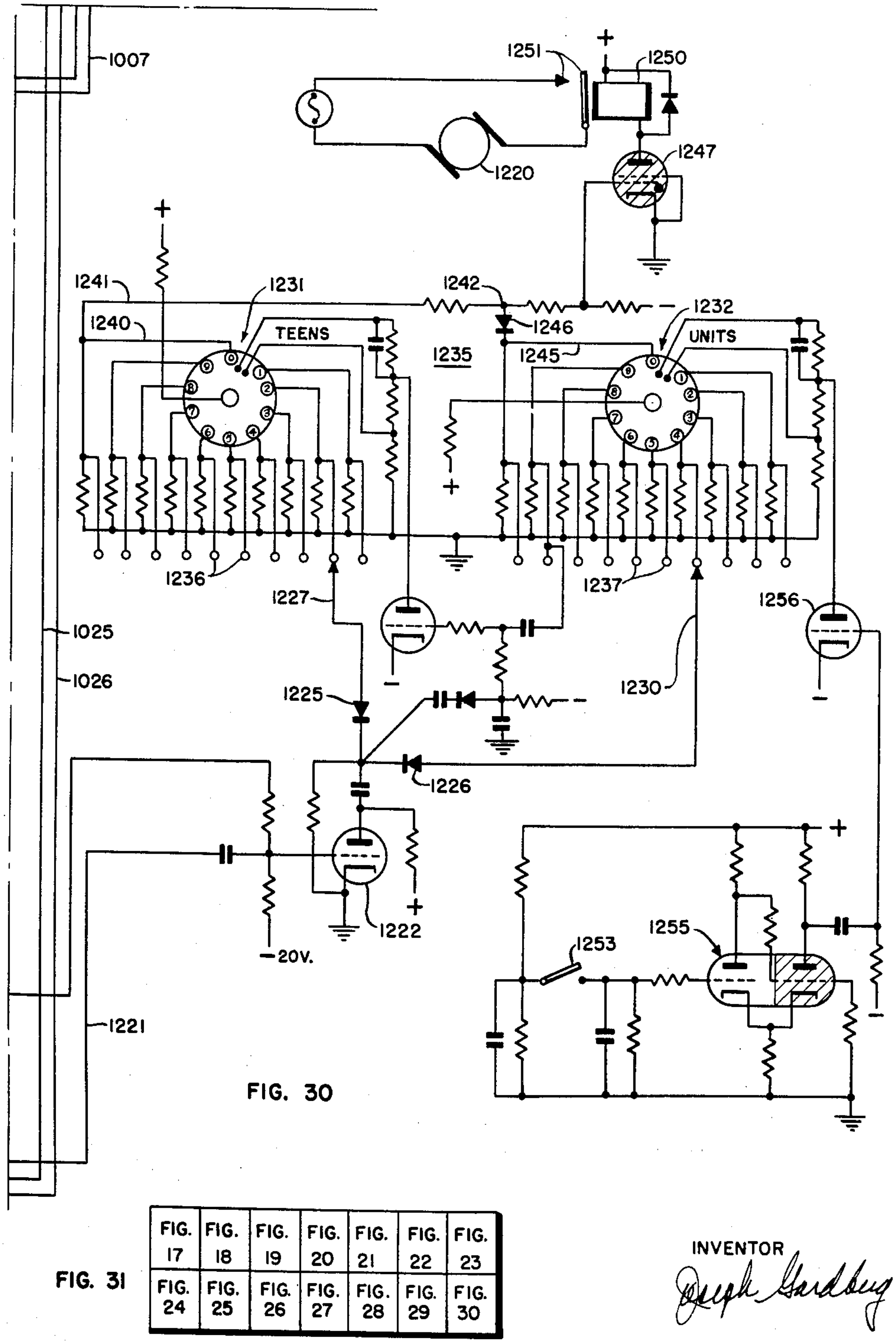
Figures 32, 33:
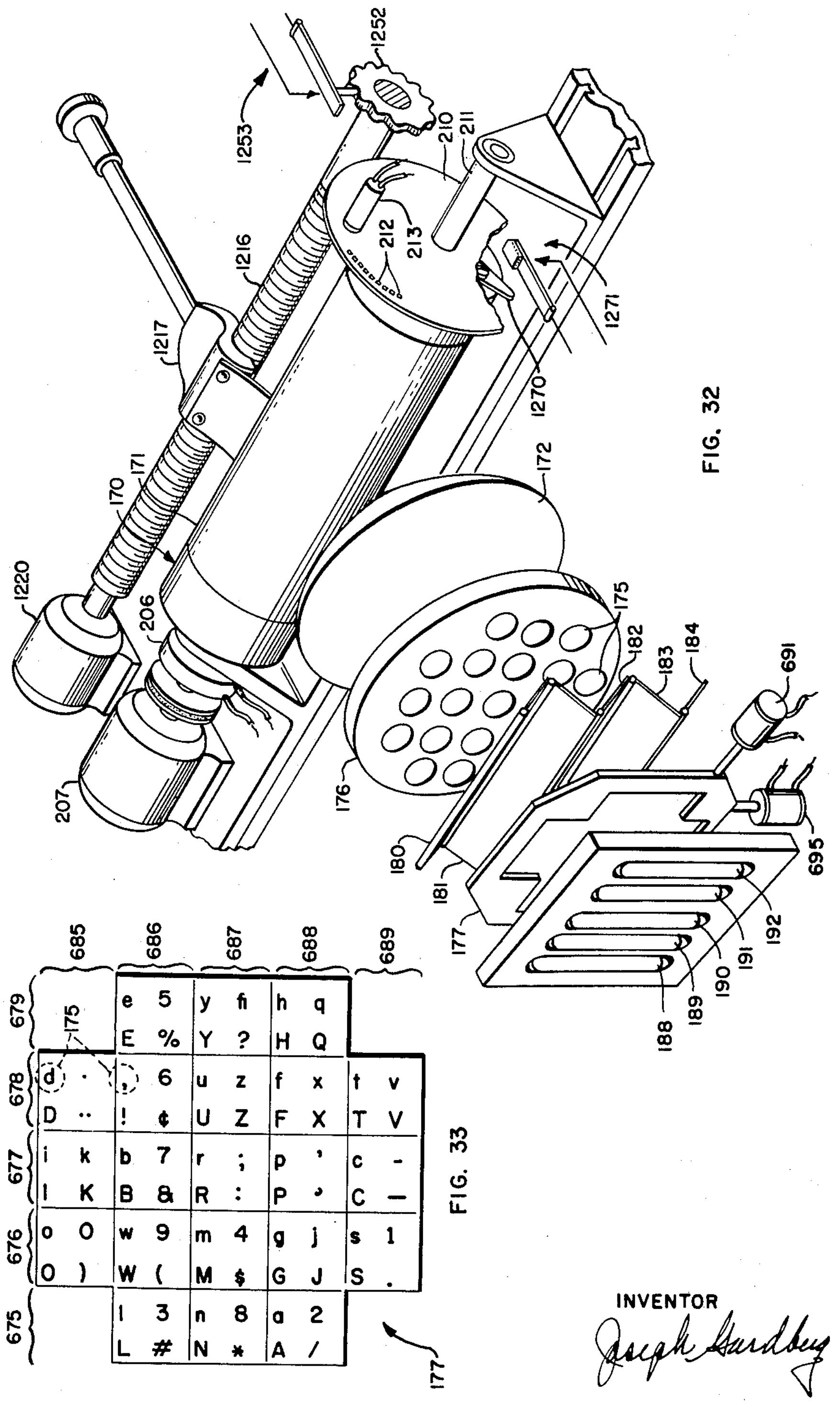
Figure 35:
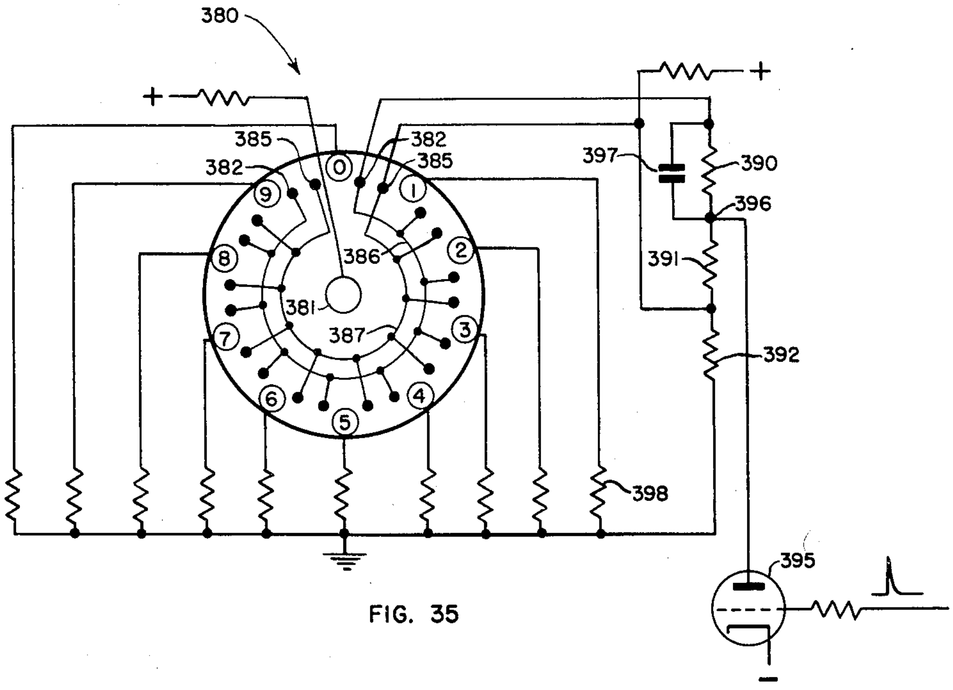
Figure 34:
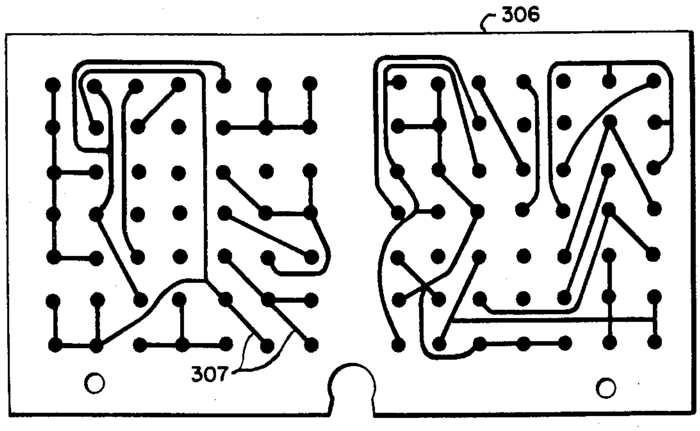
Figure 36:
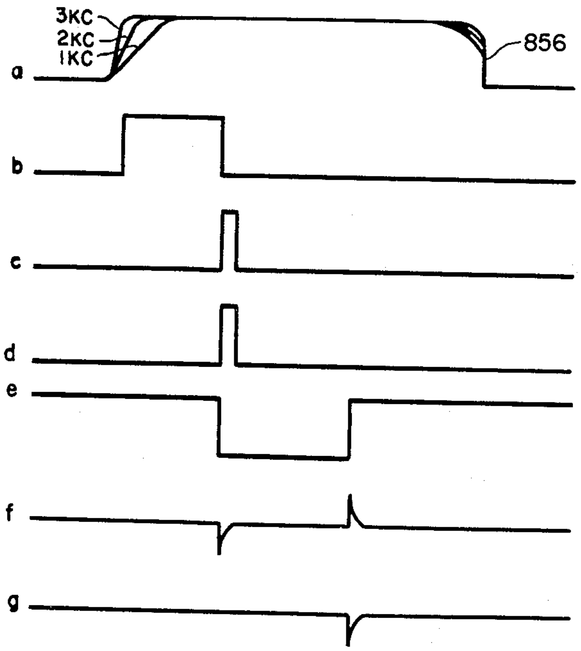
Figure 37:
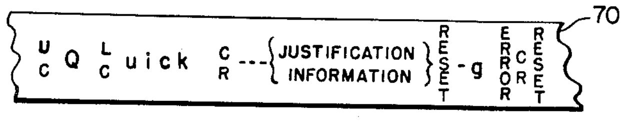

FIGS. 3 to 15, inclusive, when assembled according to FIG. 16, form a detailed schematic drawing of the recorder of FIG. 1;

FIGS. 17 to 30, inclusive, when assembled according to FIG. 31, form a detailed schematic drawing of the printer of FIG. 2;

FIG. 32 is a perspective view of the photographic means in the printer;

FIG. 33 is an elevation view of a type font used in the photographic means of FIG. 32;

FIG. 34 is an elevation view of a set width insert used in the recorder;

FIG. 35 is a counter circuit used to illustrate the operation of the several counters in the invention;

FIG. 36 includes a plurality of waveforms used to illustrate the operation of certain circuits of the invention, and FIG. 37 is a schematic representation of a portion of magnetic storage tape.

GENERAL DESCRIPTION

Referring to the block diagrams in FIGS. 1 and 2, wherein a general picture of a part of the invention can be seen, a keyboard and control unit is designated by the numeral 40. The unit 40 may be a modified version of a standard typewriter keyboard having thereon keylevers for all characters to be reproduced and for all functions used in the reproduction of such characters. The depression of a character keylever impresses a signal on a lead 41 and applies such signal to a 31-to-5 converter 42. The lead 41 represents one of thirty-one input leads to the converter 42, and a voltage on any of such input leads results in the energizing of various output leads of a group of five leads 45 to 49, inclusive, at the output of the 31-to-5 converter 42. Energization of any of the leads 45 to 49, inclusive, causes a corresponding gating circuit of a group of gating circuits 53 to 57, inclusive and respectively, to be opened. The opening of any of the gating circuits 53 to 57, inclusive, permits the output of a corresponding oscillator 60, 61 or 62 to pass therethrough. Output voltages from these oscillators, passing through the gates 53, 55 or 57, are impressed upon a lead 65 and passed to an amplifier 66. Such signals, comprising from one to three frequencies, are amplified and energize a recording head 67 to impress magnetic spots corresponding thereto on a magnetic tape 70. Similarly, opening of the gates 54 or 56 impresses output voltages from the oscillators 60 and 61 on a lead 71. These voltages are amplified by an amplifier 72 and stored magnetically on the other side of the tape 70 by a recording head 75.

The output from the keyboard and control unit 40, impressed on the lead 41, is also passed to a set width insert unit 76. Depending upon whether the character chosen is an upper case or a lower case character, a signal is passed through a circuit equivalent to a switch 77, over a lead 80 and to a 15-to-4 converter 81. As will be described more fully hereinafter, an important factor in determining the signals derived from the converter 81 depends upon a predetermined choice of the width of the characters to be reproduced. For the present purposes, however, it is sufficient to state that an input signal being applied to the converter 81 will place an output voltage on one to four of a group of four leads 84 to 87, inclusive. As in the case of the 31-to-5 converter 42, signals on the leads 84 to 87, inclusive, will open corresponding gating circuits 89 to 92, inclusive and respectively. The opening of the gating circuits 89 and 91 permits the output voltages from two more oscillators 95 and 96 to be applied over a lead 97 and to the amplifier 66 to be placed on the tape 70 by the recording head 67. Also, the opening of the gates 90 and 92 impresses output voltages from the oscillators 95 and 96 onto a lead 100 and to the amplifier 72 to be placed on the tape 70 by the recording head 75.

A line length indicator is designated by the numeral 101 in FIG. 1, and, prior to the typing of a line on the keyboard and control unit 40, the operator sets switches (not shown) in the line length indicator at predetermined readings which will be registered on counters therein, depending upon the length of the line to be reproduced. Each time characters or certain functions are selected on the keyboard and control unit 40, the input signal to the 15-to-4 converter 81, appearing on the lead 80, is also impressed on a lead 102 and applied to a set width drive circuit 105. The circuit 105 includes a counter on which the signal being applied thereto causes to register a given count, depending upon the predetermined width of the character or function selected on the keyboard and control unit 40. When the counter in the circuit 105 leaves its zero position, a signal is impressed on a lead 106 to energize a multivibrator 107 which applies drive pulses over a lead 109 to the circuit 105 to zero the counter therein and to the line length indicator 101 over a lead 110 to drive the counters in the indicator toward zero. The number of units indicated on the line length indicator 101 is driven down by the drive pulses an amount corresponding to the width of the character to be reproduced at this time.

The count registered on the line length indicator 101 is also driven down when a space between words is to be reproduced in the text. Depression of a word space keylever on the keyboard and control unit 40 generates a signal which is applied to a lead 111 and to a word space counter 112. The word space counter 112 registers the number of word spaces that appear in a given line. Also, an output pulse is derived from the word space counter 112 each time the word space keylever is depressed on the keyboard and control unit 40. This output pulse is applied over a lead 115 and to the input of the 15-to-4 converter 81, to be applied to the tape 70 in a manner described hereinabove. This pulse is also applied over the lead 102 and to the set width drive circuit 105 to reduce the count on the line length indicator 101 a predetermined amount indicative of the width of the minimum word space chosen.

Keylevers for other functions are provided on the keyboard and control unit 40 which will be described more fully hereinafter. For the present, however, reference will be made only to upper case, lower case and carriage return keylevers which appear on the keyboard and control unit 40. Like an ordinary typewriter, there is one keylever for the upper and lower case characters. Normally a lower case character will be chosen unless the typewriter is shifted to cause the printing of an upper case character. Similarly, in the present invention, a signal indicative of the lower case is applied normally to the tape, and, if an upper case character is to be reproduced, an upper case keylever is depressed to place a second pulse on the tape. The frequencies included in the second pulse, when received by the printer shown in FIG. 2, will cause upper case characters to be reproduced until the lower case signal is again generated.

As the typing of a line progresses, signals indicative of words, including either upper case or lower case characters, and word spaces are stored magnetically on the magnetic tape 70. As the end of a line approaches, the operator notes on the line length indicator 101 that insufficient room remains for the typing of another word. At this time, he depresses the carriage return keylever on the keyboard and control unit 40. Actuation of this keylever causes three things to happen successively and automatically. First, the units remaining on the line length indicator 101 are converted into pulses which are impressed on a lead 116 and a lead 117 and are applied to the 31-to-5 converter 42. Certain of the gates 53 to 57, inclusive, are thereby opened to put a predetermined number of magnetic spots composed of certain frequencies on the magnetic tape 70, and these spots are equal in number to the number of counts remaining on the line length indicator 101. When the line length indicator 101 reaches zero, indicating that all units of a given line are accounted for, these pulses cease.

Immediately upon the line length indicator's reaching zero, a pulse is derived therefrom and applied over a lead 120 to the word space counter 112 to drive the counter therein down to zero. For each of such counts, a pulse is applied to a lead 121 and over the lead 117 to the 31-to-5 converter 42 to apply a series of pulses to the magnetic tape 70. This latter series of pulses is comprised of predetermined ones of the frequencies of the oscillators 60 to 62, inclusive, and is equal in number to the number of word spaces used in the line which was previously typed. When the last of such pulses is applied to the tape 70, the word space counter 112 triggers a re-set pulse circuit 122 by applying thereto a suitable signal over a lead 123. The output of the re-set circuit 122 is connected by the lead 117 to the 31-to-5 converter 42. The output of the converter 42 generates a re-set pulse of a predetermined combination of frequencies, and stores such pulse on the magnetic tape 70.

It can be seen from the above description that the operator can observe, on the keyboard unit 40, the text to be reproduced and justified. It can also be seen that information is now stored on the magnetic tape 70 which includes not only the text to be reproduced but also the necessary information to justify each line of such text. Details of the invention such as indenting for paragraphs, what is done in case an error is made in a line, back spacing and the like will be described more fully hereinafter when the specific circuits embodying the invention are described. For the present, however, assume that a full, typed page, similar to the page to be reproduced and justified, is completed. Obviously, information must be impressed on the tape concerning the starting of a new page. This, too, will be described more fully hereinafter.

It can be seen, then, that the invention, as thus far described, stores information on the tape 70 which includes the text of each line to be reproduced, the amount of such line which remains to be justified, the number of word spaces that must be widened to accomplish such justification and a re-set pulse after each line. After a tape such as the tape 70 is filled with such information, the tape is fitted into the printer which is shown in block diagram in FIG. 2. The printer utilizes such information to reproduce, photographically, a completely-justified version of the text which appears in the typed page of the keyboard and control unit 40. It is obvious that in order to justify a given line, the printer must first receive the justification information. Consequently, the tape 70 is fed into the printer in a direction opposite to that in which it was moving in the recorder. For this reason, the printer reproduces a page from the lower, right-hand side thereof and proceeds to the upper, left-hand side.

Since the tape 70 is fed into the printer in a direction opposite to that in which it was moving in the recorder, the first information that the printer senses in any given line is the re-set pulse which the recorder generated at the end of such line. This re-set pulse serves to condition the printer for operation by zeroing all counters therein. To accomplish this, the re-set pulse is sensed by magnetic pick-up heads 125 and 126, the outputs of which are amplified in amplifiers 127 and 128, respectively, and are applied to a plurality of filters 130 to 139, inclusive. The filters 130 to 139, inclusive, pass those frequencies which were included in the magnetically stored re-set pulse and apply voltages at those frequencies to a 5-to-31 converter 140. The converter 140 converts this particular plurality of input voltages to one voltage on the lead 141. This signal is applied over a lead 142 and to a zeroing circuit 145, and outputs thereof are applied over a lead 146 to a word space add counter 147, over a lead 150 to a word space counter 151 and over a lead 152 to a justification counter 155, to zero these counters.

Signals indicative of the number of word spaces are then sensed by the pick-up heads 125 and 126, are amplified in the amplifiers 127 and 128, respectively, and are applied to the filters 130 and 139, inclusive. The filters pass those frequencies which are included in the pulses being applied thereto and apply voltages at these frequencies to predetermined ones of the input leads to the 5-to-31 converter 140. The converter 140 causes a single series of pulses to be applied to a lead 156 and to the word space counter 151 to drive such counter up until it registers a count equal to the number of word spaces which appear in the line to be reproduced. Thereafter, signals indicative of the number of units remaining in the line to be justified are sensed by the pick-up heads 125 and 126 and are applied, in a similar manner, to the 5-to-31 converter 140. The converter 140 converts these pulses into a series of pulses equal in number to the number of units to be justified and applies such pulses over a lead 157 and to the justification counter 155 which is driven up one count for each received pulse.

A coincidence circuit 160 is positioned between the word space counter 151 and the justification counter 155 and will be described in more detail hereinafter. Suffice to say for the present that when these two counters have the same count registered on them, a pulse is obtained which will reset the justification counter 155 to zero. As each pulse indicative of a justification unit is applied to the lead 157, the justification counter 155 is driven up one count. When the justification counter 155 registers a count which is equal to the number of word spaces registered on the word space counter 151, coincidence is sensed by the coincidence circuit 160, and a pulse is derived therefrom to trigger a re-set circuit 161 and to reset the justification counter to zero. Also, each time a given count is registered on the justification counter 155, a pulse is applied over a lead 162 to cause the word space add counter 147 to be driven up one count. Assuming that the number of justification units to be justified when divided by the number of word spaces will result in an integral number, the count registered by the word space add counter 147 will be this resulting number. Thereafter, as will be shown more fully hereinafter, the count registered on the word space add counter 147 is added to the predetermined minimum set width of each word space, when such word spaces are sensed, to enlarge the word spaces and cause justification of the line. It will also be shown that if the number of units registered on the justification counter when divided by the number of word spaces does not result in an even number, a predetermined number of word spaces, equal to the remainder, will have an additional unit of set width added thereto.

After the justification information has been fed into the printer, the various characters, both upper case and lower case, and functions in a line are sensed by the recording heads 125 and 126. As described hereinabove, these characters and functions correspond to signals having predetermined frequencies therein. These frequencies only are passed by predetermined ones of the filters 130 to 139, inclusive, and are applied to the 5-to-31 converter 140 and to a 4-to-15 converter 165. Depending upon the set width of the character chosen, a single signal is derived from the 4-to-15 converter 165 and passed over a lead 166 to a set width control circuit 167 including a set width counter. The signal on the lead 166 causes the set width counter to register a count equal to the set width chosen for the particular character involved.

Before explaining the printer block diagram shown in FIG. 2 further, refer now to FIG. 32, wherein is shown the actual apparatus for photographing the text material. This apparatus includes a rotatively-mounted drum 170 on which a sheet 171 of light-sensitive material is secured fixedly. Positioned adjacent to the drum 170 is a lens assembly including a large Petzval objective lens 172 and a plurality of smaller lenses 175—175 supported in a disc 176. A type font 177 (FIGS. 32 and 33) is positioned in line with the lens assembly so that squares, including four characters each, are positioned substantially in alignment with a corresponding one of the smaller lenses 175—175. Generally, the type font includes five rows of two characters each in both horizontal and vertical rows. Positioned between the type font and the lens assembly are five shutters 180 to 184, inclusive, with each shutter positioned in line with a corresponding one of the horizontal, double rows of type on the type font 177. Also, positioned behind the type font are five flash lamps 188 to 192, inclusive, and each of the flash lamps is positioned directly behind a corresponding one of the five vertical, double rows of type on the type font 177. The lens assembly shown in FIG. 32 is described in more detail in an applicaton thereon by D. K. Jewell, Serial No. 527,076, filed August 8, 1955, now abandoned. Also, the remainder of the apparatus shown in FIG. 30 is described in more detail in an application of A. Friedman, Serial No. 694,019, filed November 1, 1957, now Patent No. 3,044,-374, granted July 17, 1962.

As described in the Friedman application, the type font 177 is positioned horizontally between two positions depending upon a character's being upper case or lower case. Also, the font is positioned vertically depending upon the character's being a common or uncommon character. When a given character is chosen, a particular one of the flash lamps 188 to 192, inclusive, is energized, and a particular one of the shutters 180 to 184, inclusive, is opened so that not only is the character in correct alignment with a corresponding lens 175 in the disc 176, but also the correct one of the flash lamps is energized, and the correct one of the shutters is actuated. When this occurs, the character will be projected through one smaller lens 175 and directed by the objective lens 172 to a predetermined area on the light-sensitive paper 171 on the drum 170.

Referring back to the block diagram of the printer shown in FIG. 2, assume that a character is sensed by the pick-up heads 125 and 126, and passed to the filters 130 to 139, inclusive. Signals, indicative of the chosen character are sent to the 5-to-31 converter 140 and to the 4-to-15 converter 165. The signals applied to the 5-to-31 converter appear as a single pulse on a lead 195 at the output thereof. This signal is applied to the correct one of the shutters 180 to 184, inclusive. The signal is also applied over a lead 196 to a flash storage circuit 197 to condition the flash lamps 188 to 192, inclusive, for operation. If the chosen character is a lower case character, a signal appears on a lead 200, and if the chosen character is an upper case character, a signal appears on a second lead 201. In any event, an upper case circuit 202 is actuated to position the type font 177 properly in a horizontal direction. Further, depending upon whether the chosen character is common or uncommon, a split shift circuit 205 is energized to position the type font 177 in the proper vertical position.

The input to the 4-to-15 converter causes a voltage to be applied to one of a plurality of output leads, represented in FIG. 2 by the lead 166, depending upon the set width of the chosen character. Assume, for example, that the set width of a particular character is 12 units. The proper output lead 166 of the 4-to-15 converter has thereon a voltage which is applied to the set width counter 167 to register on this counter a count of 12. As will be described more fully hereinafter, when the set width counter 167 leaves its zero position, a brake 206 (FIG. 32) which normally holds the drum 170 against rotaion, is released to permit a motor 207 to drive the drum. When the drum 170 is so driven, a disc 210, attached to a drum shaft 211 and having a circular row of translucent windows 212—212 spaced radially therearound, causes the successive energization of a photoelectric cell 213. The cell 213 thereby causes pulses to be applied to the set width counter 167 to drive this counter back to zero. When the set width counter again reaches zero, a pulse is applied over a lead 215 to set the brake 206 once more. It can be seen that with this structure, the drum has been rotated the exact set width of the chosen character, and it is thereafter held against rotation. When the brake 206 is set to maintain the drum 170 in a fixed position, a pulse is generated by a brake-off circuit 216 and applied to a lead 217 and through a time delay circuit 220 to actuate the flash storage circuit 197 and to energize the conditioned one of the flash lamps 188 to 192, inclusive, after a predetermined time. Therefore, since the proper shutter is open, since the type font 177 is in its proper vertical and horizontal positions, and since the drum 170 has been rotated the exact set width of the chosen character, when the flash lamp energizes, the character will be reproduced photographically on the light-sensitive paper 171 in its proper position.

When a word space is sensed by the pick-up heads 125 and 126, signals of different frequecies are sent to the 4-to-15 converter 165 in the same manner as when a character is chosen. Also, in a similar manner, a signal is applied over the lead 166 to drive the set width counter 167 up to a predetermined count equal to the minimum word space chosen. As described hereinabove, it is the word spaces that are increased in size to cause justification of the line. Consequently, when pulses are generated by the photocell 213 to drive the set width counter 167 down to zero, the brake 206 must not be set when the counter 167 reaches zero. Consequently, instrumentalities are provided to prevent a setting of the brake 206 when the set width counter 167 reaches zero. Such instrumentalities include a coincident circuit 221, and an output thereof sets the brake 206 when coincidence appears between the set width counter 167 and the word space add counter 147. Remembering that the word space add counter has registered thereon the precise amount of units to be added to each word space to justify a given line, when coincidence appears between the set width counter 167 and the word space add counter 147 to set the brake 206, the word space will be its correct, increased number of units to provide justification of the line.

RECORDER

*Character on Tape*

Referring to the circuits of the recorder as shown in FIGS. 3 to 15, inclusive, assume that a "run-standby" switch 225 has been closed and that the keylever for the upper case character "A" on the keyboard and control unit 40 has been depressed. A switch 226 is closed thereby and is kept closed by mechanical instrumentalities (not shown) for a period of forty milliseconds. Consequently, +30 volts are applied through a diode 227, and to a lead 230. The lead 230 is one of thirty-one input leads to the 31-to-5 converter 42, shown in detail in FIGS. 3, 4 and 5. In the case of the character "A," the +30 volts is impressed on a lead 231. The lead 231 and leads 232 to 235, inclusive, constitute five output leads of the 31-to-5 converter 42. When a +30 volt signal is placed on any one of the input leads, such as the lead 230, to the 31-to-5 converter 42, from one to five of the output leads 231 to 235, inclusive, have the signal applied thereto to result in a combination of energized output leads which is exclusive to the character or function corresponding to the energized input lead. This can better be seen by considering that the output leads 231 to 235, inclusive, have values associated therewith of 1, 2, 4, 8 and 16, respectively.

As stated above, when the upper case "A" is chosen, the input lead 230 has a +30 volt signal applied thereto, and the output lead 231 is energized thereby. Consequently, the numeral "1" is shown adjacent to the upper case "A" in FIG. 3. Should the upper case "C" be chosen, the +30 volt signal is applied through a diode corresponding to the diode 227 and through two diodes 238—238 to energize the output leads 231 and 234. Since the value "1" is associated with the lead 231 and the value "8" with the lead 234, the sum of these values, "9," is shown adjacent to the upper case "C." Similarly, the upper case "D" is associated with the output leads 232 (a value of "2") and 235 (a value of "16"), and the numeral "18" is shown adjacent to the upper case "D." The same operation of the converter 42 can be described for all thirty-one input leads such as the lead 230. Returning now to the description of the upper case "A," a +30 volt signal on the output lead 231 is applied through a resistor 236 to one input of a twin-T gated oscillator 237. For the purposes of the present description, it is sufficient to say that when the +30 volts are applied to the lead 231 and to the input of the oscillator 237, a signal of a first predetermined frequency (for example, 3000 c.p.s.) is applied to an output lead 240 and to a common lead 241.

Any signal appearing on the common lead 241 is amplified in a record amplifier 242, including two amplifying tubes 245 and 246, and is applied thereto over a lead 243. A record head 247 is connected in series with the anode circuit of the tube 246, and the record head 247 is positioned adjacent to one side of the magnetic tape 70 to record on the tape any signal that is impressed thereacross. A bias oscillator (not shown) may be connected across the record head 247 to provide undistorted recording, but since such an oscillator is well known in the art, no further reference will be made to it. In a like manner, any signal appearing on the output lead 232 of the 31-to-5 converter 42 is passed through a resistor 250 to energize another gate in the oscillator 237. This latter signal will cause an output voltage from the oscillator 237 to be applied to a second output lead 251 and to a second common lead 252. Any signal appearing on the second common lead 252 is passed over a lead 255 and amplified in a second record amplifier 256. A second record head

257 is connected at the output of the amplifier 256 and is positioned adjacent to the other side of the magnetic tape. With this structure, two rows of magnetic spots are stored on the magnetic tape 70.

Two other oscillators 260 and 261 are energized by signals on the three remaining output leads 233 to 235, inclusive, of the 31-to-5 converter 42. For example, a signal appearing on the third lead 233 is applied through a resistor 262 and energizes the oscillator 260 to place a signal at a second frequency (for example, 2000 c.p.s.) on a lead 263 and on the first common lead 241. Consequently, the record head 247 is energized by a signal of this second frequency. Similarly, a signal appearing on the fourth output lead 234 of the 31-to-5 converter 42 is passed through a resistor 265 associated with the oscillator 260 to place a signal of the second frequency on the second common lead 252 to energize the record head 257. Finally, a signal on the fifth output lead 235 is passed through a resistor 266 associated with the oscillator 261 to impress a signal of a third frequency (for example, 1000 c.p.s.) on the first common lead 241 and the record head 247.

As described hereinabove, signals appearing on the first, third and fifth output leads, that is, the leads 231, 233 and 235 of the 31-to-5 converter 42 energize the record head 247 with signals of frequencies of 3000, 2000, and 1000 c.p.s. Also, signals appearing on the second and fourth output leads 232 and 234 cause signals of two frequencies, 3000 and 2000 c.p.s., respectively, to energize the second record head 257. Other circuits that cause energization of the record heads 247 and 257 include a lead 267 which is connected through a resistor 270 to the oscillator 261 and two more gated oscillators 271 and 272. Briefly, a signal appearing on the lead 267 causes a 1000 c.p.s. signal to be applied to the second common lead 252 and to energize the record head 257. Also, each of two oscillators 271 and 272 has an output lead connected to the first common lead 241, and each also has an output lead connected to the second common lead 252. The oscillator 272, when energized by circuits to be described more fully hereinafter, produces on the common leads 241 and 252 thereof signals at a frequency of 4000 c.p.s. Likewise, the oscillator 271, when energized, produces signals on the common leads 241 and 252 at a frequency of 5000 c.p.s. Since signals of each of these two frequencies are applied to the record heads 247 and 257, it can be seen that signals of five frequencies are applied to each of the record heads 247 and 257 to be placed on the magnetic tape 70. Consequently, it is obvious that a total of thirty-two ($2^5$) separate combinations of signals, including a signal and no signal, can be accommodated by the two record heads 247 and 257.

Referring again to the recording of the upper case "A," prior to the depression of the keylever associated with this character on the keyboard unit 40, an upper case switch 275 (FIG. 5) was first depressed. Like any shift keylever on a typewriter, the upper case switch 275 can be opened immediately by removing pressure from the keylever associated therewith on the keyboard unit 40, or the switch 275 can be locked in a closed position, depending upon the number of successive, upper case characters to be reproduced. In any event, when the switch 275 is closed to reproduce an upper case character, a second switch 276 is closed momentarily by a mechanical linkage (not shown) and remains closed for a predetermined time such as forty milliseconds. Likewise, when the upper case switch 275 is re-opened, the momentary switch 276 again closes for the predetermined period of time. Therefore, considering the instant when the upper case switch 275 is closed, +30 volts are applied to an upper case relay 277 to energize such relay. Two sets of normally-closed contacts 280—280 and 281—281 (FIGS. 5 and 7, respectively) are opened by the energization of the upper case relay 277, and two sets of normally-opened contacts 282—282 and 285—285 (FIG. 5 and 7, respectively) are closed thereby.

Figure 5:
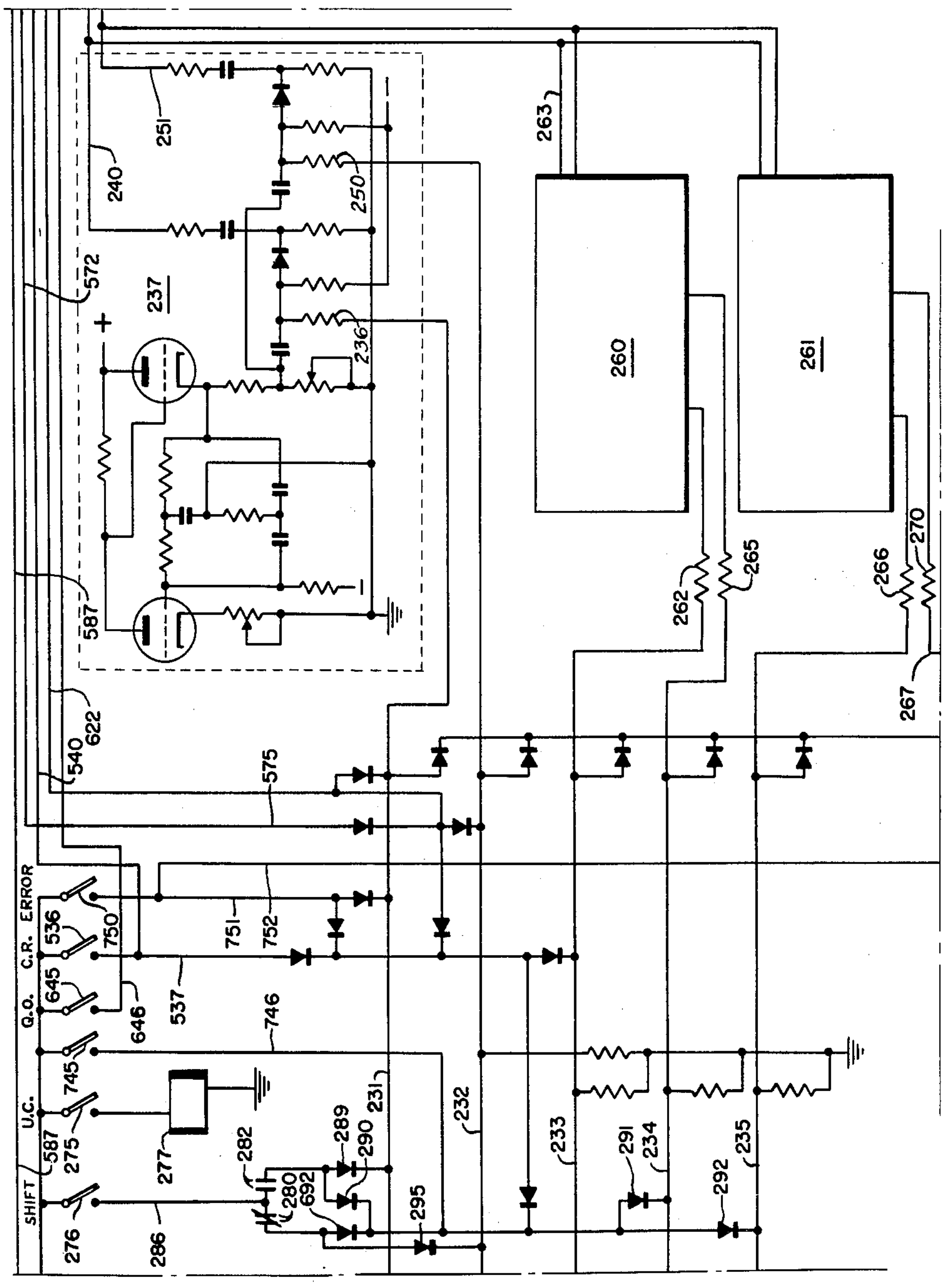
Figure 6:
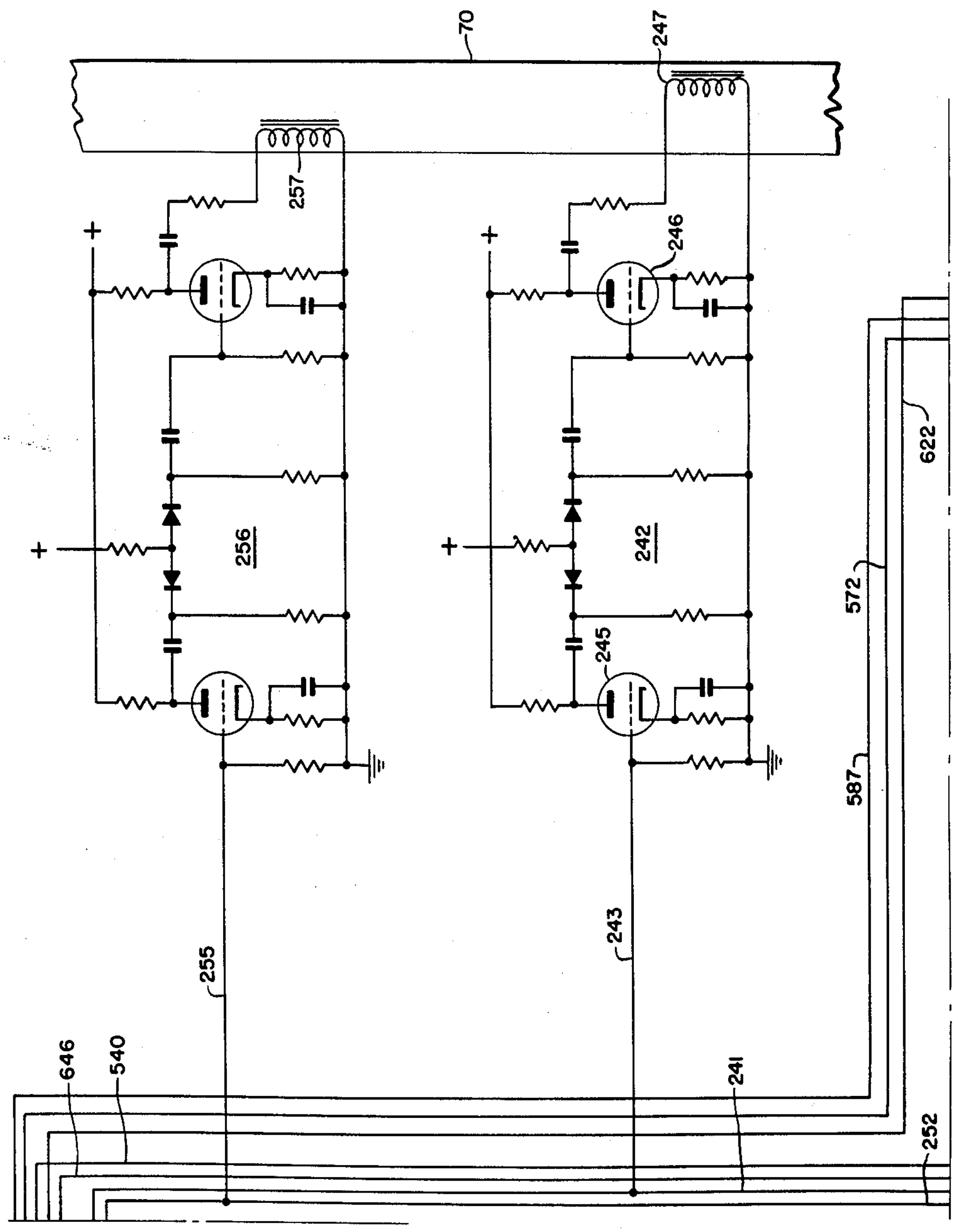

With the upper case relay 277 energized and the contacts 282—282 closed, and with the momentary switch 276 closed, +30 volts are applied through the momentary switch 276, over a lead 286, and through the now-closed contacts 282—282 to a plurality of diodes 289 to 292, inclusive. Therefore, the +30 volts will pass through the diode 289 and be applied to the output lead 231 of the 31-to-5 converter to energize the record head 247 with a 3000 c.p.s. signal from the oscillator 237. Also, the +30 volts pass through the diode 290 and the diode 291 to the fourth output lead 234 of the 31-to-5 converter 42 to energize the second recording head 257 with a 2000 c.p.s. signal. Also, the +30 volts impressed on the diode 290 also pass through the diode 292 to place on the fifth output lead 235 a signal which energizes the oscillator 261 to place a signal of a frequency of 1000 c.p.s. on the first record head 247. This combination of signals on the two record heads 247 and 257 will cause, in the printer, an upper case character to be reproduced. When a lower case character is to be reproduced at a subsequent time, the upper case switch 275 is opened to again close the contacts 280—280. Reference to FIG. 5 indicates that the only change in the circuit includes an additional diode 295. That is, the +30 volt signal renders the diode 295 conductive and is impressed on the second output lead 232 of the 31-to-5 converter 42. This signal causes a signal of a frequency of 3000 c.p.s. to be applied to the second record head 257. This additional signal, together with other signals being applied to the record heads 247 and 257, causes a lower case character to be reproduced in the printer, as will be described hereinbelow.

*Set Width Onto Tape*

As described hereinabove, when the key associated with the letter "A" on the keyboard and control unit 40 was depressed, +30 volts were applied through the diode 227 and to the lead 231 to place on the tape 70, by way of the recording head 247, a magnetic spot indicative of the chosen character. This positive potential is also impressed on a lead 296 and two diodes 297 and 300 connected thereto, to render the diodes 297 and 300 conductive. Consequently, +30 volts appear at an upper terminal 301 and an intermediate terminal 302 on a terminal board 303. The upper terminal 301, like all other upper terminals provided in the row in which the terminal 301 is located, is connected to one of a plurality of right-hand, lower terminals such as the terminal 305. The right-hand, lower terminals are designated as "Upper Case Widths" in FIG. 7, and the left-hand, lower terminals on the terminal board 303 are designated as "Lower Case Widths."

Each of the upper terminals, such as the terminal 301, is connected to one of the lower, right-hand terminals, such as the terminal 305. These connections are made by a set width insert such as that designated by the numeral 306 in FIG. 34. The insert 306 may be made of any non-conductive material such as vinyl, and a plurality of conductive paths 307—307 may be "printed" thereon by any known method in the printed-circuit art. The design of the conductive paths depends upon predetermined widths that are chosen for each character to be reproduced. For example, the widths of all characters to be reproduced are chosen with a certain relationship to the upper case "W." That is, when the upper case "W" is to have a height equal to its width, its "set width" is defined as 18 "units." All other characters will have a set width of some value less than 18. For example, the upper case "A" may have a set width of 12. Assuming that it does, a conductive path 307 exists in the set width insert 306 to connect the upper terminal 301, to which +30 volts are applied, to the lower, right-hand terminal 305.

Figure 7:
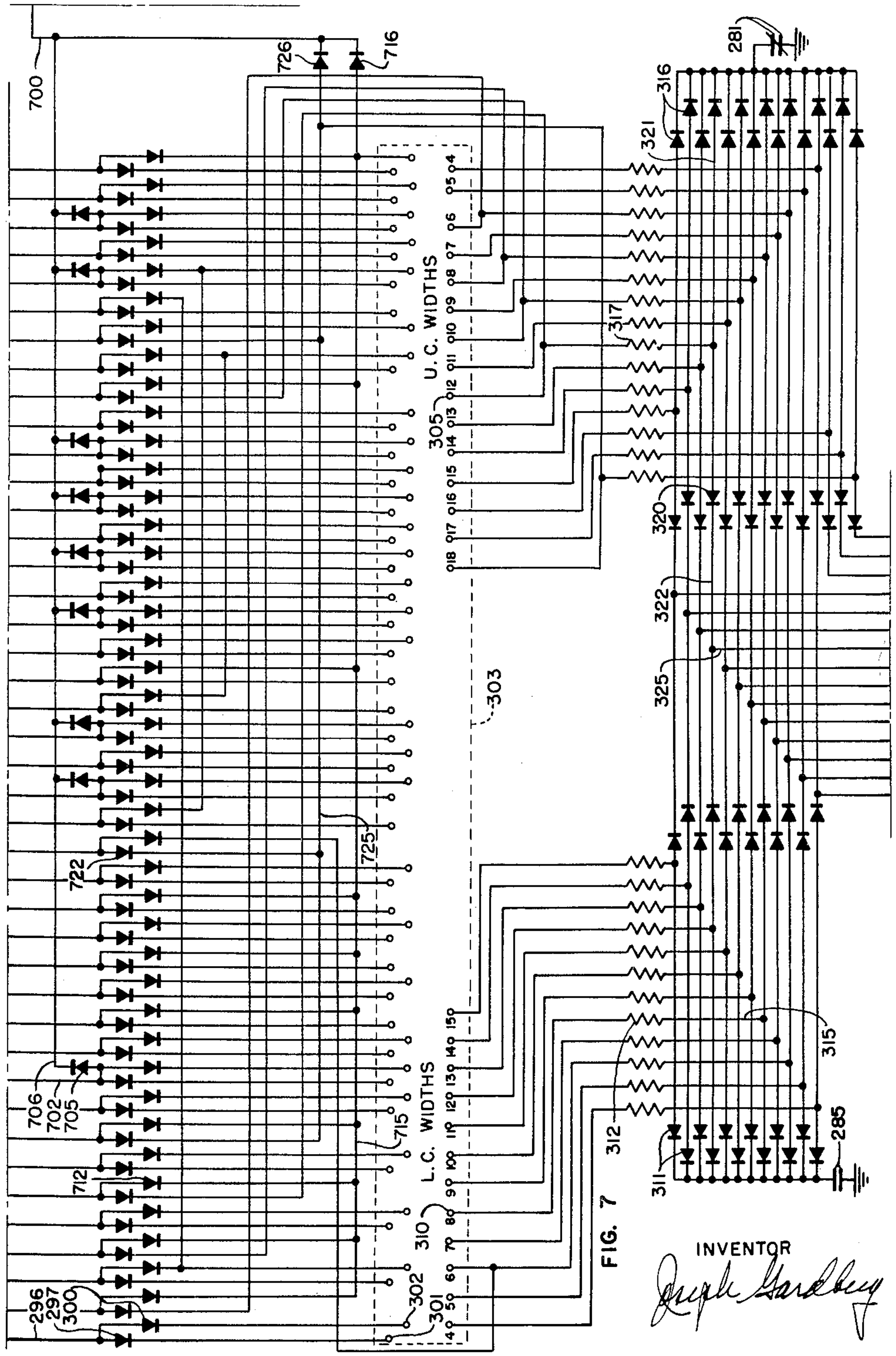

Assume, for the moment, that the lower case "a" has a set width of 8 units. In order to reproduce the lower case "a," the same keylever is depressed on the keyboard and control unit 40 to close the switch 226. Also, +30 volts are applied through the diode 300 to the intermediate terminal 302. If the shift keylever on the keyboard and control unit 40 were in the lower case position, the intermediate terminal 302 would be connected, through a conductive path 307 on the set width insert 306, to a lower, left-hand terminal 310. But, as described hereinabove, an upper case "A" is to be reproduced. Consequently, the upper case relay 277 is energized to close the contacts 285—285 and to open the contacts 281—281 (FIG. 7). When the contacts 285—285 are closed, ground potential is placed on the left side of each of a plurality of diodes 311—311. Therefore, the +30 volts that are applied to the intermediate terminal 302 and, through the set width insert 306, to the lower, left-hand terminal 310, pass through a current-limiting resistor 312, over a lead 315, through a diode 311 and through the now-closed contacts 285—285 to ground. Therefore, as will be understood more fully hereinafter, the lower case "a" cannot be reproduced at this time.

However, since an upper case "A" is to be reproduced, the contacts 281—281 are now open so that ground potential is not placed on the right-hand side of a plurality of diodes 316—316. Therefore, the +30 volts appearing on the upper terminal 301 and through the set width insert 306 to the lower, right-hand terminal 305 are also impressed across a resistor 317 and on a diode 320 to render the diode 320 conductive. Since the connection from the resistor 317 and over a lead 321 to the diode 316 is open-circuited by virtue of the now-open contacts 281—281, this latter circuit has no effect, thereby giving effect to the voltage rendering the diode 320 conductive. Consequently, the voltage rendering the diode 320 conductive is impressed upon a lead 322 and a lead 325, this latter lead forming one of fifteen input leads to the 15-to-4 converter 81. For the particular set width chosen, that is, 12 units, the +30 volts render two diodes 326 and 327 conductive. When the diode 326 is rendered conductive, the +30 volts are impressed on a lead 331. The lead 331 and three other leads 332, 333 and 334 form four output leads from the 15-to-4 converter 81. A signal appearing on the first lead 331 is impressed through a resistor 335 associated with the oscillator 271 to cause a signal, having a frequency of 5000 c.p.s. to be applied to the first common lead 241 and, hence, to energize the record head 247. In a similar manner, when the diode 327 is rendered conductive by the +30 volts on the lead 325, +30 volts are applied to the fourth output lead 334 of the 15-to-4 converter 81 and are applied to a resistor 336 associated with the oscillator 272. Consequently, a signal, having a frequency of 4000 c.p.s., is applied to the second common lead 252 to energize the second record head 257 with a 4000 c.p.s. signal. Therefore, the magnetic tape 70 has applied thereto an indication that a character having a set width of 12 units is to be reproduced.

*Set Width Control*

Figure 12:
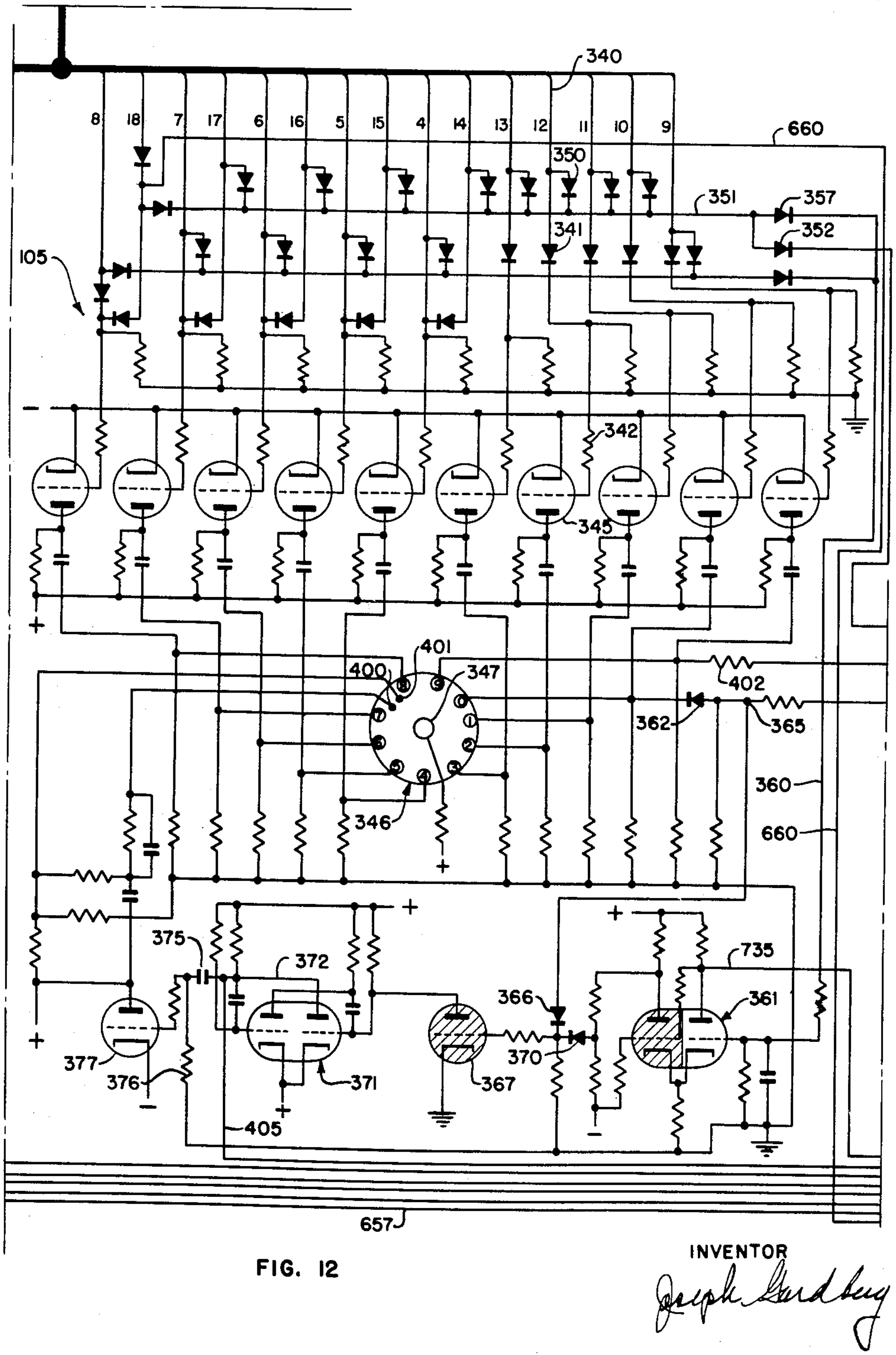

As described hereinabove when the block diagram of the recorder shown in FIG. 1 was described, it was stated that the line length indicator 101 is initially set to register a count equal to the total length of a line to be reproduced, that is, equal to the total number of "units" in such line. Each time a character, or a function such as a word space or indent, is chosen and recorded on the magnetic tape 70, a set width of such character must be subtracted from the count registered on the line length indicator 101. To reduce the line length indicator 101 by 12 units, the set width of the upper case "A," the set width drive circuit 105, shown in detail in FIG. 12, is provided. As described hereinabove, when the keylever for the upper case "A" was depressed on the keyboard and control unit 40, a signal was placed on the input lead 325 (FIG. 7) to the 15-to-4 binary converter 81. This signal is also applied to a junction point 337 and a lead 340 connected between the junction point 337 and an input to the set width drive circuit 105.

The +30 volt signal applied to the lead 340 performs three functions. First, it renders a diode 341 conductive and is impressed through a resistor 342 to the grid of a set tube 345. The set tube 345 thereupon conducts, and the anode voltage thereof drops. This decrease in voltage is applied to the "2" cathode of a set width counter 346. The set width counter 346 is a tube of the glow transfer counter type and will be described more fully hereinafter. For the present, it is only necessary to state that prior to the depression of the keylever associated with the upper case "A," a conductive beam was maintained between an anode 347 of the counter tube 346 and the "0" cathode thereof. Under this condition, the "0" cathode of the tube 346 is maintained at approximately +30 volts. When the set tube 345 was rendered conductive by selecting the upper case "A," its plate voltage is designed to drop from approximately +200 volts to —160 volts. When —160 volts is applied to the "2" cathode of the counter tube 346, the conductive beam switches from the "0" cathode to the "2" cathode.

Secondly, the voltage applied to the lead 340 passes through a diode 350, over a lead 351 and through another diode 352 to the control grid of a "teens" tube 355. The "teens" tube 355 is connected with a "units" tube 356 to form a flip-flop circuit, wherein the "units" tube 356 is normally conductive. Consequently, the positive voltage impressed through the diode 352 not only renders the "teens" tube 355 conductive, but also renders the "units" tube 356 nonconductive. Thirdly, the positive potential being applied to the lead 357 is impressed through anode diode 349, over a lead 360 and to the grid of the right-hand side of a trigger tube 361. The left-hand side of the trigger tube 361 is normally conductive, and the right side thereof is normally nonconductive. Consequently, the appearance of a positive pulse on the grid of the right-hand side of the tube 361 renders the right-hand side conductive for the forty millisecond period in which the +30 volts is applied thereto, this amount of time being determined by the time that the switch 226, associated with the upper case "A" on the keyboard and control unit, is closed.

As stated above, the normal condition of the set width drive circuit includes the "0" cathode of the glow tube 346 being conductive and the "units" tube 356 being conductive. With the "0" cathode of the glow tube 346 conducting, the +30 volts thereon render a diode 362 nonconductive. Consequently, the relatively-high cathode voltage of the normally-conductive "units" tube 356 (for example, +30 volts) is impressed through a junction point 365 and a diode 366 to maintain a multivibrator clamp tube 367 normally conductive. When the signal appearing over the lead 351 and through the diode 352 renders the "teens" tube 355 conductive and the "units" tube 356 nonconductive, the positive voltage at the junction point 365, holding the multivibrator clamp tube 367 conductive, is removed. However, the positive potential appearing on the lead 360 at the same time renders the right-hand side of the trigger tube 361 conductive and cuts off the left-hand side thereof. Consequently, the anode potential of the left-hand side increases, and this increased potential is impressed through a diode 370 and to the grid of the multivibrator clamp tube 367 to maintain the tube 367 conductive during the forty millisecond period in which the +30 volts are applied to the grid of the right-hand side of the trigger tube 361.

At the end of the forty millisecond period, the trigger tube 361 reverts to the condition shown in FIG. 12 to remove, from the anode of the left-hand side thereof, the positive potential which was maintaining the multivibrator clamp tube 367 conductive. Since the "0" cathode of the glow transfer tube 346 and the "units" tube 356 are not conducting, no positive potential exists on the junction point 365 to maintain a multivibrator clamp tube 367 conductive. Consequently, the clamp tube 367 cuts off, its anode potential rises and this increased potential is applied to the right-hand side of a multivibrator 371. When the right-hand side of the multivibrator 371 conducts, its anode potential drops, and this decrease in potential is applied to a lead 372, differentiated by a capacitor 375 and resistor 376, and applied to the grid of a normally-nonconductive driver tube 377. Since the driver tube 377 is normally nonconductive, the initial negative pulse being applied thereto, due to the right-hand side of the multivibrator 371 being rendered conductive, has no effect. However, the multivibrator 371 is connected as a free-running multivibrator and the two sides thereof will alternate between conduction and cut off as long as the clamp tube 367 is rendered nonconductive. Therefore, when the right-hand side of the multivibrator 371 is again rendered nonconductive, its anode potential increases, and this positive pulse is differentiated and applied to the grid to the driver tube 377 to render the driver tube conductive. The resistor 376 and the capacitor 375 are chosen to provide a series of negative pulses as long as the multivibrator 371 is operating.

To understand the operation of the glow transfer counter tube 346 in the set width drive circuit and the other counter tubes in the recorder and the printer, refer to FIG. 35 wherein are shown a glow transfer counter tube 380 and its associated driving circuit. The glow transfer counter tube 380 includes ten cathodes designated as "0" to "9," inclusive, and a centrally-located anode 381. Positioned between each of the cathodes are two guides designated 382 and 385. Similar guides 382—382 are connected together by a lead 386, and similar guides 385—385 are connected together by a second lead 387. The guides are connected to a voltage divider network including resistors 390 to 392, inclusive, and the anode of a driver tube 395 is connected to a junction point 396 located between the resistors 390 and 391. Also, a capacitor 397 is connected across the resistor 390.

Assuming that there is conduction between the "0" cathode and the anode 381 and assuming that a plurality of positive pulses are applied to the grid of the driver 395, a similar number of negative pulses will appear on the anode thereof and be applied to the junction point 396. Considering one of such negative pulses, the full negative amplitude thereof is coupled to the guides 382—382 through the capacitor 397. Also, because of voltage-divider action in the resistors 390 to 392, inclusive, approximately three-fourths of such full negative voltage is applied to the guides 385—385. Under these conditions, the glow, or conduction, which was maintained on the "0" cathode, is now switched to the guide 382 between the "0" and "1" cathodes. However, the resistor 390 is chosen to be of a high value and since the guides 382—382 are now connected directly to the pulse source at the junction point 396, the high-valued resistor 390 does not permit sufficient current to flow to maintain the glow on the guide 382 between the "0" and "1" cathodes. Therefore, the glow transfers to the guide 385 between these cathodes since this electrode is at three-fourths of the maximum negative potential, and the potential of the guides 382—382 is rising positive rapidly as the small capacitor 397 rapidly charges. Consequently, when the positive pulse being applied to the grid of the driver tube 395 ceases, the driver tube 395 is rendered nonconductive so that its anode potential rises. Assume that its anode potential rises to such a value that the voltage being placed on the now-conducting guide 385 is +60 volts. Since the potential of the cathode "1" of the glow transfer tube 380 is connected to ground through a resistor 398, and since a more positive voltage is being applied to the guide 385, the glow will transfer from the guide 385 to the cathode "1." In a similar manner, as negative pulses are applied successively to the junction point 396, the glow will transfer to successive cathodes and travel around the glow transfer tube 380 in a clockwise direction.

Referring again to the glow transfer tube 346 in the set width drive circuit, it was stated hereinabove that this counter tube had registered thereon a count of 12, that is, conduction was maintained between the "2" cathode and the anode 347, and the "teens" tube 355 was conducting. It was also stated that at the end of the forty millisecond period during which the keyboard contact associated with the upper case "A" was closed, the multivibrator clamp tube 367 was rendered nonconductive. The cutting off of the clamp tube 367 permitted the free running multivibrator 371 to operate and to provide a series of pulses which were differentiated by the resistor 376 and the capacitor 375 and applied to the grid of the driver tube 377. The driver tube 377 drives the glow transfer counter tube 346 in a manner similar to the circuit described in FIG. 35. Assuming that guides 400 and 401 are so connected between each of the cathodes "0" to "9," inclusive, that the glow is transferred around the counter tube in a counter-clockwise direction, negative pulses appearing on the anode of the driver tube 377 will transfer the glow, successively, to the "1" cathode and the "0" cathode.

When the glow is on the "0" cathode, this cathode has approximately +30 volts thereon. Since the "teens" tube 355 is conducting at this time and the "units" tube 356 is cut off, the cathode of the "units" tube is at some relatively low potential which is placed on the junction point 365. Consequently, the diode 366 cannot be rendered conductive at this time and the glow proceeds to the "9" cathode of the counter 346. When the "9" cathode conducts, +30 volts are applied through a resistor 402 and to the control grid of the "units" tube 356, thereby rendering the "units" tube conductive. When the "units" tube 356 conducts, the "teens" tube 355 is rendered nonconductive. Therefore, since the "units" tube 356 is conducting, a relatively high voltage such as +30 volts is applied to the junction point 365, and, when the glow proceeds around the counter 346 in a counter-clockwise direction and again is transferred to the "0" cathode, the diode 362 is rendered nonconductive to permit again the +30 volts on the junction point 365 to render the diode 366 conductive and to be applied to the grid of the multivibrator clamp tube 367 to render the clamp tube conductive. When the clamp tube 367 is rendered conductive, the multivibrator 371 is turned off to stop the application of positive pulses to the grid of the driver tube 377. As a result, the successive stepping of the glow around the counter tube 346 is stopped, and the glow remains on the "0" cathode.

*Line Length Indicator*

As mentioned above, the set width of each character or function which is applied to the magnetic tape 70 must be subtracted from the count registered on the line length indicator 101. It was stated that the count registered on the line length indicator 101 initially was equal to the total number of units in a line to be justified. Consequently, when the upper case "A" is to be reproduced, 12 units must be subtracted from the count on the line length indicator 101. To accomplish this subtraction, the pulses appearing on the anode of the right-hand side of the multivibrator 371, which pulses are differentiated and are applied to the grid of the driver tube 377, are impressed on a lead 405 and applied through a capacitor 406 and a resistor 407 to the grid of a driver tube 410 associated with a units counter 411 in the line length indicator 101. Also located in the line length indicator 101 are two other counters, a tens counter 412 and a hundreds counter 413 which have associated therewith driving tubes 415 and 416, respectively. Also associated with the three counters are three switches 420, 421 and 422 which can be set manually through terminals to any predetermined cathode in the counters.

Figure 13:
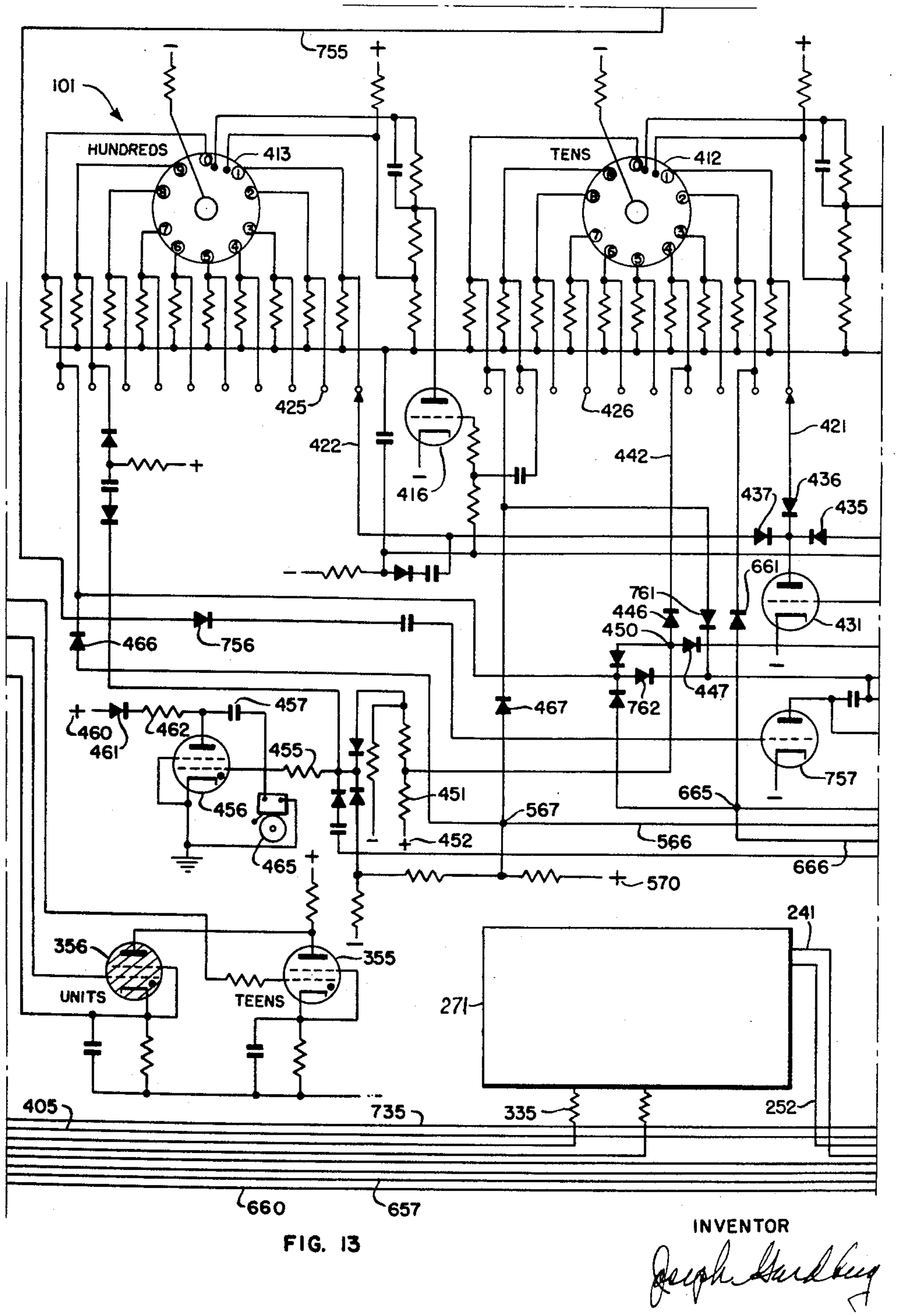
Figure 14:
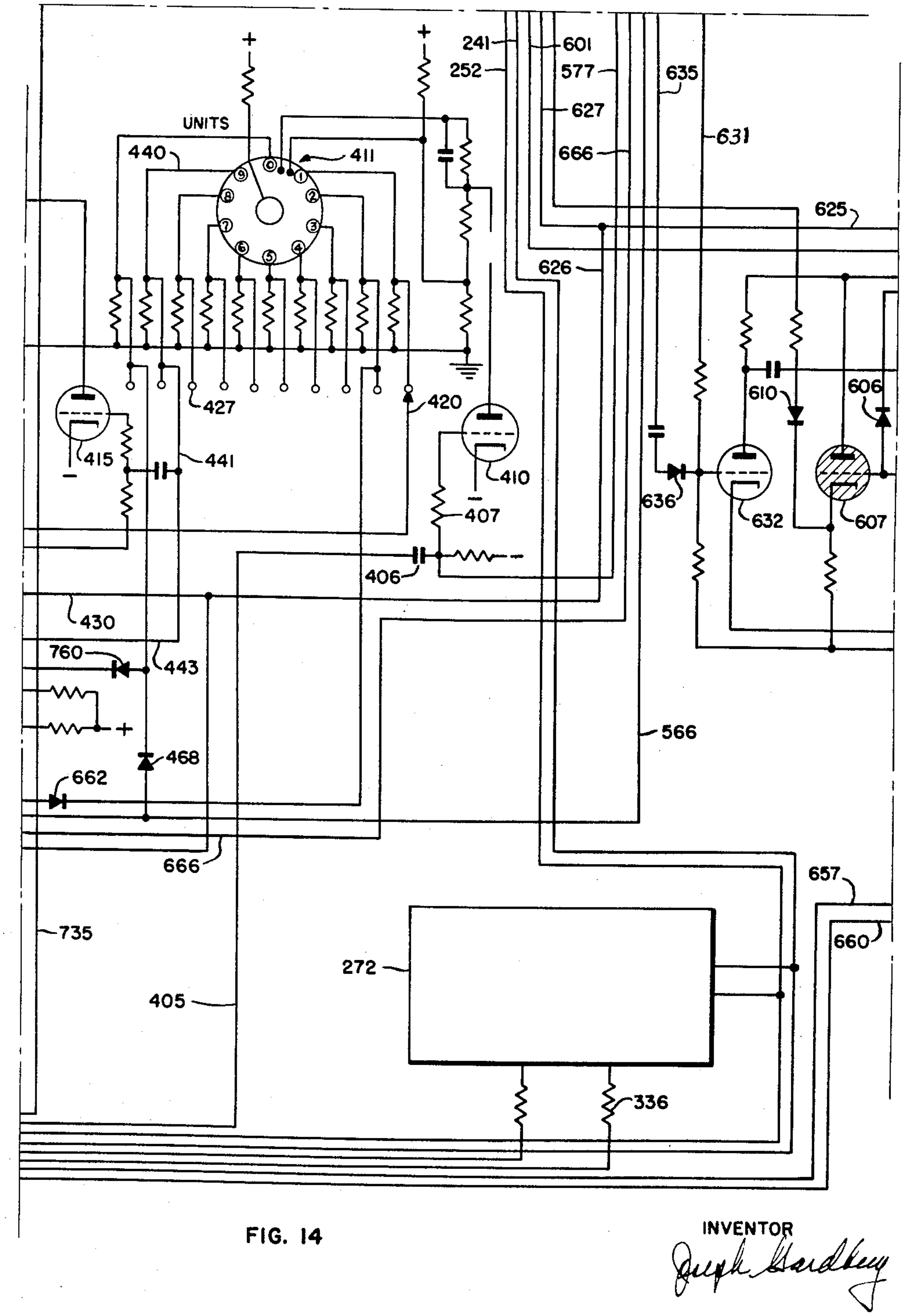

For example, assume that the total number of units in a given line to be reproduced is 278. In this case, the switch 422 would be connected to a terminal 425, the switch 421 would be connected to a terminal 426, and the switch 420 would be connected to a terminal 427. As will be described more fully hereinafter, at the correct time in the operation of the recorder, a positive pulse is applied over a lead 430 and to the grid of a re-set tube 431 (FIG. 13). The anode potential of the re-set tube 431 will drop to render conductive three diodes 435, 436 and 437 which are connected to the switches 420, 421 and 422, respectively. Consequently, negative pulses will be applied through these diodes and to the "2" cathode of the hundreds counter 413, the "7" cathode of the tens counter 412 and to the "8" cathode of the units counter 411. As a result, the glows of the counter tubes will transfer to these cathodes, and a count of 278 will be registered on the line length indicator 101.

It can be seen that as twelve positive pulses are applied over the lead 405 to the grid of the driver tube 410, the glow in the units counter 411 will be transferred from the "8" cathode and will move in a counter-clockwise direction around the counter tube, past the "8" cathode, and stop, after twelve transferrals, on the "6" cathode. As the glow of the units counter 411 passes the "9" cathode, a positive potential is developed on the "9" cathode and is applied to the leads 440 and 441 and to the grid of the driver tube 415 associated with the tens counter 412. Consequently, the tens coutner 412 will be driven down one count, and the glow will move from the "7" cathode to the "6" cathode. It can be seen that the count now registered on the line length indicator will be 266, the result of subtracting twelve units from 278. This process continues as the information in a line to be reproduced is placed on the magnetic tape 70. When the line length indicator registers a count of 49, that is, when the glows are on the "4" cathode of the tens counter 412 and on the "9" cathode of the units counter 411, positive potentials are applied over leads 442 and 443 to render diodes 446 and 447, respectively, nonconductive. Therefore, the potential of a junction point 450 which is connected through a resistor 451 to a positive source 452 is permitted to increase, and this increase in potential is applied through a resistor 455 to the grid of a normally-nonconductive thyratron 456, firing the thyratron. During the time that the thyratron 456 was cut off, a capacitor 457 was charged from a positive potential 460, through a diode 461 and a large resistor 462. When the thyratron 456 fires, the capacitor 457 discharges to energize a bell 465 and give an indication that the end of the line to be reproduced is near. A similar circuit is provided, including diodes 466, 467 and 468, to energize the bell 465 when the three counters in the line length indicator are on "0."

*Word Space Counter*

As mentioned hereinabove, it is a requirement of the printing trade that for normal prose composition, a right and left margin of a page be strictly adhered to. It is also a requirement of the trade, that, unlike the typewriter art, each character have a width which is pleasing to the eye and easy to read. The first requirement fixes the length of a line to close tolerances. The second requirement makes impractical predetermination of the amount of space that will be taken up by the composition of a given line, particularly in that there is often not sufficient flexibility in syllabification to permit hyphening in such a way as to hold the margins. It is, therefore, necessary to add or subtract certain spaces in a line so that the exact line length will be attained. This is most commonly done by increasing or decreasing the word spaces within the line and, if necessary, by increasing the spaces between the letters of one or more words to obtain the most pleasing, over-all appearance. In the present invention, word-space justification is used for the most part, and the operator is given the ability to add from one to three units of escapement to a character by manual switching. This latter feature will be described more fully herein below. From the above description, it can be seen that the number of word spaces that appear in a given line is of paramount importance, and how signals indicative of such word spaces are impressed on the magnetic tape 70 will now be described.

Figure 4:
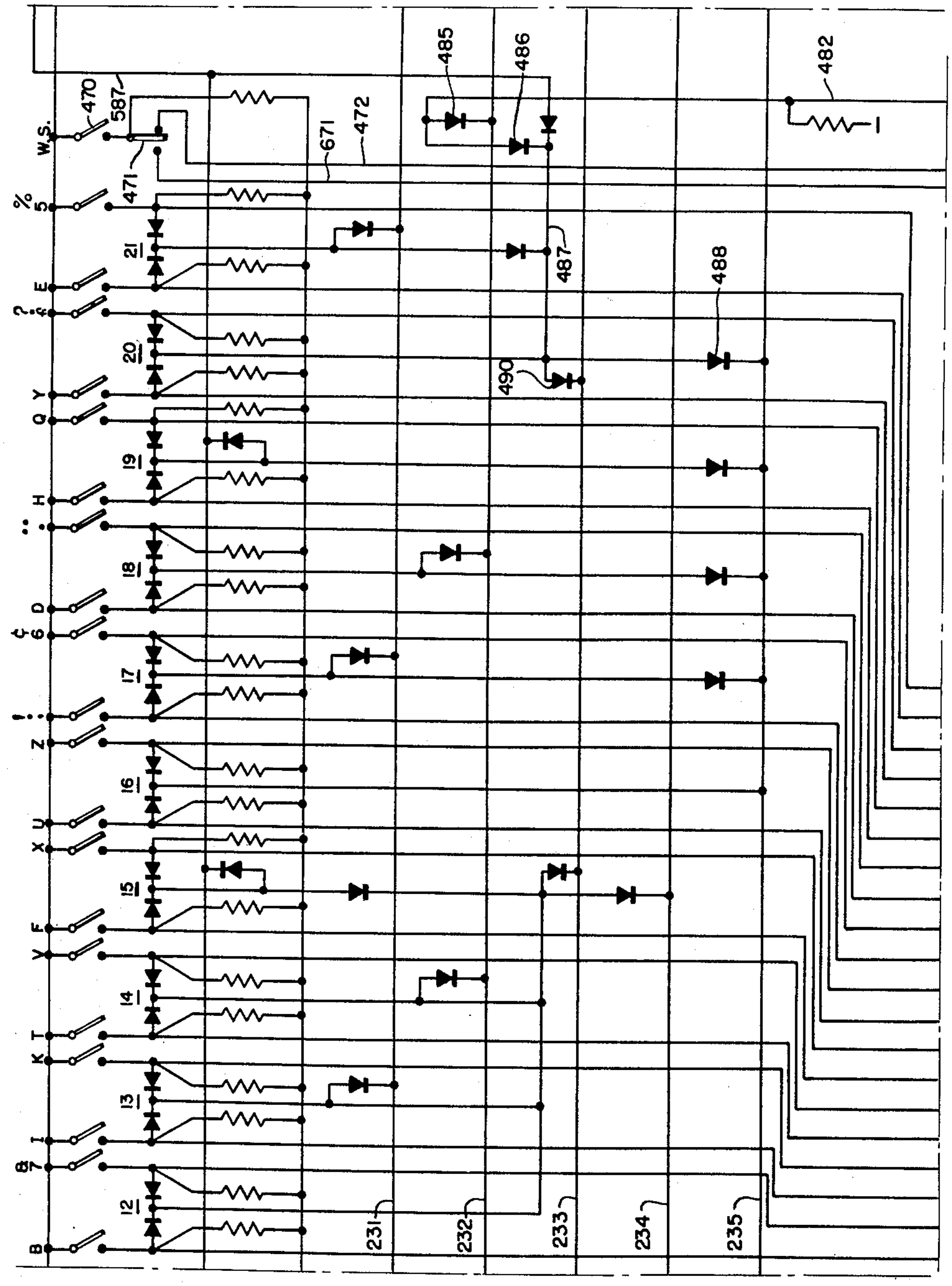
Figure 8:
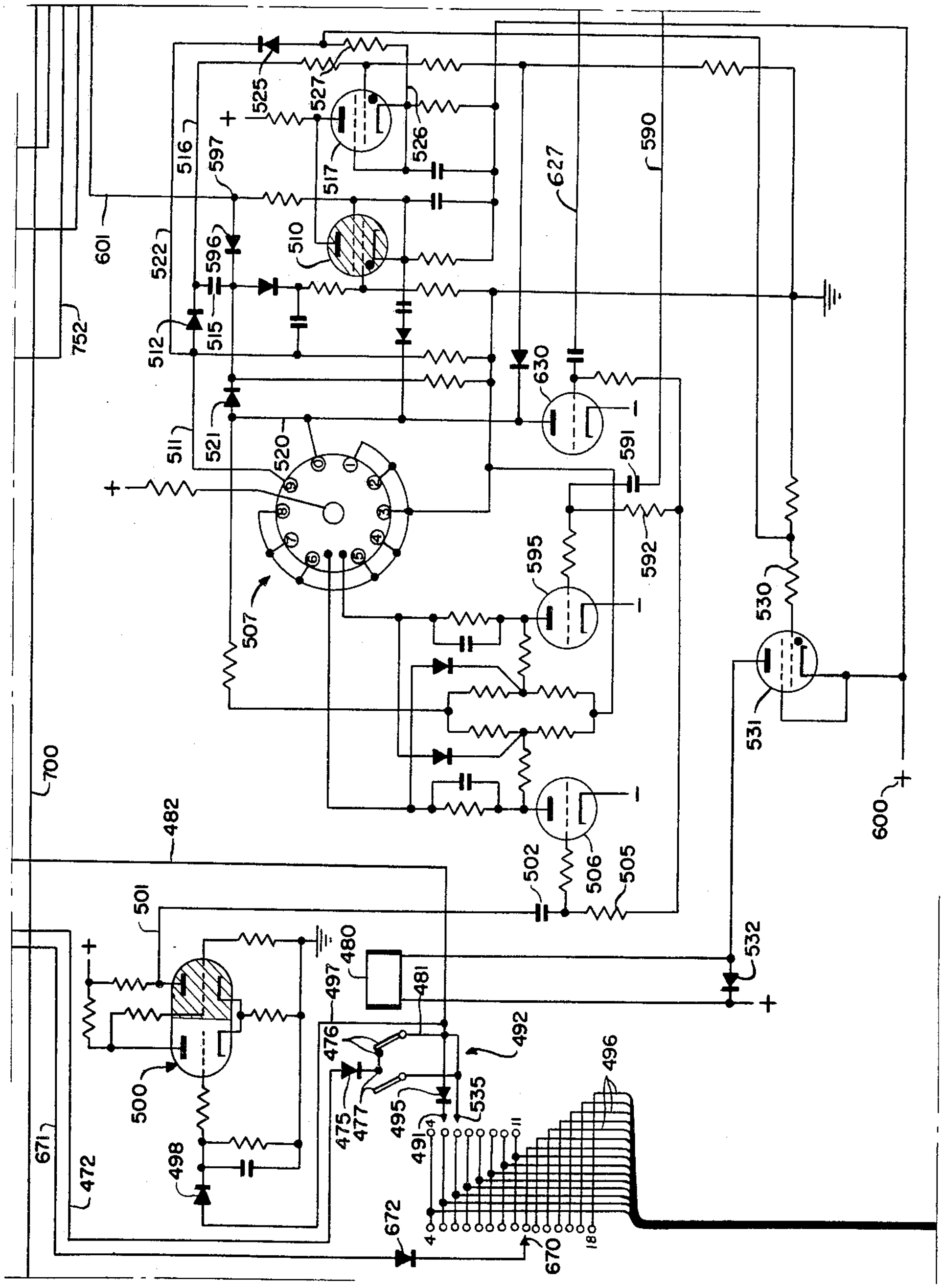

Referring to FIG. 4, each time a word space is to be placed between words or the like in a given line to be reproduced, a word space keylever is depressed on the keyboard and control unit 40. Striking this keylever will close a switch 470 to impress +30 volts through the switch 470 and through a switch 471 which is normally in the position shown in FIG. 4. The +30 volts are then applied to a lead 472 to render a diode 475 conductive. The lower end of the diode 475 is connected between two pairs of contacts 476—476 and 477—477 which are associated with a relay winding 480 (FIG. 8). The contacts 476—476 are normally closed and the contacts 477—477 are normally opened as shown in FIG. 8. Therefore, +30 volts are applied through the normally-closed contacts 476—476, over a lead 481 and on a lead 482. The lead 482 is, in effect, another input lead to the 31-to-5 converter 42. Consequently, certain of the output leads 231 to 235, inclusive, of the 31-to-5 converter 42 have positive voltages impressed thereon. In this case, the +30 volts on the lead 482 render conductive a diode 485 to place the +30 volts on the output lead 232. Also, the +30 volts render a diode 486 conductive, are impressed on a lead 487, render diodes 488 and 490 conductive and are impressed on the output leads 235 and 233, respectively. As described above, when +30 volts are placed on the lead 232, the oscillator 237 is energized to place a signal having a frequency of 3000 c.p.s. across the recording head 257. Also, +30 volts on the output lead 233 energize the oscillator 260 to place a 2000 c.p.s. signal on the recording head 247, and +30 volts on the lead 235 energize the oscillator 261 to place a 1000 c.p.s. signal on the head 247. When the recording heads 247 and 257 are so energized, magnetic spots indicative of a word space is impressed on the magnetic tape 70.

In any given line, the amount of space between words is arbitrary and can be determined beforehand. Such amount depends upon the particular kind of type to be reproduced, and a minimum amount of word space width is chosen to result in the most pleasing appearance of such type. After this determination is made, a word space width selector switch 491 (FIG. 8) is set on a chosen one of a plurality of terminals designated "4" to "11," inclusive, in a selector 492. The amount of word space chosen by the selector switch 491 will determine a minimum amount of word space, and this amount is normally less than the amount desired. That is, some justification is expected in most lines, but should none be required, all word spaces will be of a size determined by the setting of the selector switch 491. However, if justification is required, that is, if some number of units remains after the typing of a sufficiently-long line on the keyboard and control unit 40, the width of the word spaces will be increased, as will be described more fully hereinafter. For now, however, assume that the selector switch 491 is set on position "5," as shown in FIG. 8, to provide a minimum word space width of five units.

With the switch 491 on the position "5," when the word space switch 470 is closed by depressing the word space keylever on the keyboard and control unit 40, the +30 volts that are applied to the lead 472 through the diode 475 and through the contacts 476—476 to the lead 481 render a diode 495 conductive and are impressed on the selector switch 491. Each position of the selector switch 491 is connected to a corresponding one of a plurality of leads 496—496, connected to the terminals "4" to "11," inclusive. When a signal appears on any of these leads, input signals are applied to the 15-to-4 converter 81 and to the set width drive circuit 105. Depending upon the minimum word space chosen, as determined by the setting of the selector switch 491, output voltages will appear on certain ones of the output leads 331 to 334, inclusive, of the 15-to-4 binary converter 81, in a manner described hereinabove, to energize either or both of the oscillators 271 and 272. Therefore, signals indicative of the amount of minimum word space chosen will be derived from either or both of the oscillators 271 and 272 and will be applied to either or both of the recording heads 247 and 257. Also, when the signal indicative of the minimum word space chosen is applied to the input of the set width drive circuit 105, the set width counter 346 will register a count equivalent to the number of units in the minimum word space. As described hereinabove with respect to the character "A," the line length indicator 101 will be driven down a number of counts equal to the number of units in the minimum word space chosen, and the set width counter 346 will again be driven down to zero.

To count the number of word spaces in a given line, each time the word space keylever on the keyboard and control unit 40 is depressed and the switch 470 is closed, +30 volts appear on the lead 481, as described above. This voltage is impressed on a lead 497, renders a diode 498 conductive and is applied to the grid of the left-hand side of a trigger tube 500. The right-hand side of the trigger tube 500 is normally conductive, and the left-hand side thereof is normally nonconductive. Consequently, appearance of a positive potential on the grid of the left-hand side will render such side conductive and will cause the right-hand side to be cut off. When the right-hand side of the trigger tube 500 cuts off, a positive potential is applied over a lead 501, is differentiated by a capacitor 502 and a resistor 505 and is applied to the grid of a driver tube 506. The driver tube 506 is designed to drive a word space counter tube 507 in a clockwise direction in a manner similar to that described hereinabove with respect to the counter shown in FIG. 35. The word space counter 507, however, is also designed to be driven in a reverse direction, that is, in a counter-clockwise direction. How and when this is done will be described more fully hereinafter, but for the present purposes, consider only that each positive pulse being applied to the grid of the driver tube 506 will cause a corrseponding negative pulse to appear on the anode thereof to drive the word space counter 507 up one count in a manner similar to that described for the counter shown in FIG. 35. Considering only this much of the circuit shown for the word space counter 507, it is apparent that each word space that is chosen in a given line will cause the word space counter 507 to be driven up one count in a clockwise direction, and that the count registered on the word space counter 507, after a full line has been selected, will be equal to the number of word spaces in such line.

For practical and economical reasons, a limitation has been placed on the number of word spaces that will be justified in the apparatus embodying the present invention. This number has been chosen to be nineteen, but, it will be obvious that any predetermined number can be chosen. It is also apparent that the vast majority of text to be reproduced will have less than nineteen word spaces therein. Consequently, a choice of preventing more than nineteen word spaces from being counted and justified is practical. Generally speaking, to prevent more than nineteen word spaces from being counted, it is necessary to prevent the word space counter 507 from registering any more than nineteen counts, but it is obvious that the number of units in word spaces exceeding nineteen must still be applied to the 15-to-4 converter 81 to impress an indication of their set width on the magnetic tape 70. These word spaces must still be applied to the set width drive circuit 105 so that their width will be subtracted from the count registered on the line length indicator 101.

To accomplish these purposes, assume that the word space counter 507 is registering zero. Under this condition, the "0" cathode of the word space counter tube 507 will be conducting and a "units" tube 510 associated with the word space counter 507 will be conducting. Then, as each word space is chosen, +30 volts are applied to the lead 497 to cause the word space counter 507 to be driven up one count, as described hereinabove When the word space counter 507 registers a count of nine, that is, when the "9" cathode thereof is conducting, a positive potential is applied to a lead 511 and through a diode 512 to place a positive charge on a capacitor 515. This positive potential is applied over a lead 516 and to the grid of a "teens" tube 517 associated with the word space counter 507, but it is of insufficient magnitude to render the tube 517 conductive. Then, when the tenth word space is chosen, the "0" cathode of the word space counter 507 conducts to place a positive potential on a lead 520 and through a diode 521 to the lower side of the capacitor 515. The effect of this action is to double the positive potential on the upper side of the capacitor 515. This action causes a sufficiently-positive potential to be applied to the lead 516 and to the grid of the normally-nonconductive "teens" tube 517, thereby rendering the tube 517 conductive.

It is now said that the word space counter has registered thereon a count of ten. As additional word spaces are chosen, and as the word space counter tube 507 is driven up thereby, consider the situation when the "9" cathode of the counting tube 507 again conducts, that is, when a count of nineteen is registered on the word space counter 507. At this time, a positive potential is applied to the lead 511 and over a lead 522 to render a diode 525 nonconductive. When the diode 525 is cut off, the relatively-high, positive potential on the cathode of the now-conducting "teens" tube 517 is applied over a lead 526 and through resistors 527 and 530 to the control grid of a normally-nonconductive thyratron 531. This positive potential renders the thyratron 531 conductive and energizes the winding of the relay 480. A diode 532 aids in the half-wave operation of the relay 480. When the relay 480 is energized, the normally-closed contacts 476—476 are opened, and the normally-opened contacts 477—477 are closed.

When the contacts 476—476 are opened, any further word spaces that are chosen (in excess of nineteen) are no longer applied to the leads 481 and 497 and to the trigger tube 500. As a result, the word space counter will not be driven up for these word spaces. However, since the contacts 477—477 are now closed, the +30 volts are applied to a switch 535. The switch 535 is connected to a terminal in the minimum word space selector 492 which is one unit higher than the terminal to which the switch 491 is connected. Consequently, for all word spaces in excess of nineteen, a set width therefor will be one unit greater than the minmum word space chosen. Further, an additional unit will be registered on the set width counter 346 and subtracted from the line length indicator 101. The reasoning behind this particular structure is that when nineteen or more word spaces are chosen, the switch 491 will be set on the lowest-numbered terminal on the word space width selector 492 to give a minimum word space of four units. It is believed that this number of units is too small in any text to be pleasing and, therefore, an additional unit is added thereto.

*Justification*

As the operator types a line to be reproduced on the keyboard and control unit 40, and as the end of the line approaches, discretion must be used concerning when to stop a given line and to start a succeeding line. Assume, for example that the bell 465 has actuated when 49 units were left in a given line, but that the operator completed a given word in the line so that twenty-seven units were remaining when he realized that the succeeding word would not fit in the given line. The twenty-seven units will remain registered on the line length indicator 101, so that reference thereto will inform the operator that insufficient space is left in the line to type the next word. When this occurs, the operator depresses the carriage return keylever, on the keyboard and control unit 40. It will now be shown that when the carirage return keylever is depressed, the following takes place: signals indicative of each unit of justification are applied to the magnetic tape 70; the line length indicator 101 is driven to zero; signals indicative of the number of word spaces registered on the word space counter 507 are applied to the magnetic tape 70; the word space counter 507 is driven down from the number of word spaces registered thereon to zero; and a re-set pulse is placed on the magnetic tape 70. This re-set pulse resets the line length indicator 101 to the set line count, which is 270 units in the example under consideration.

Figure 9:
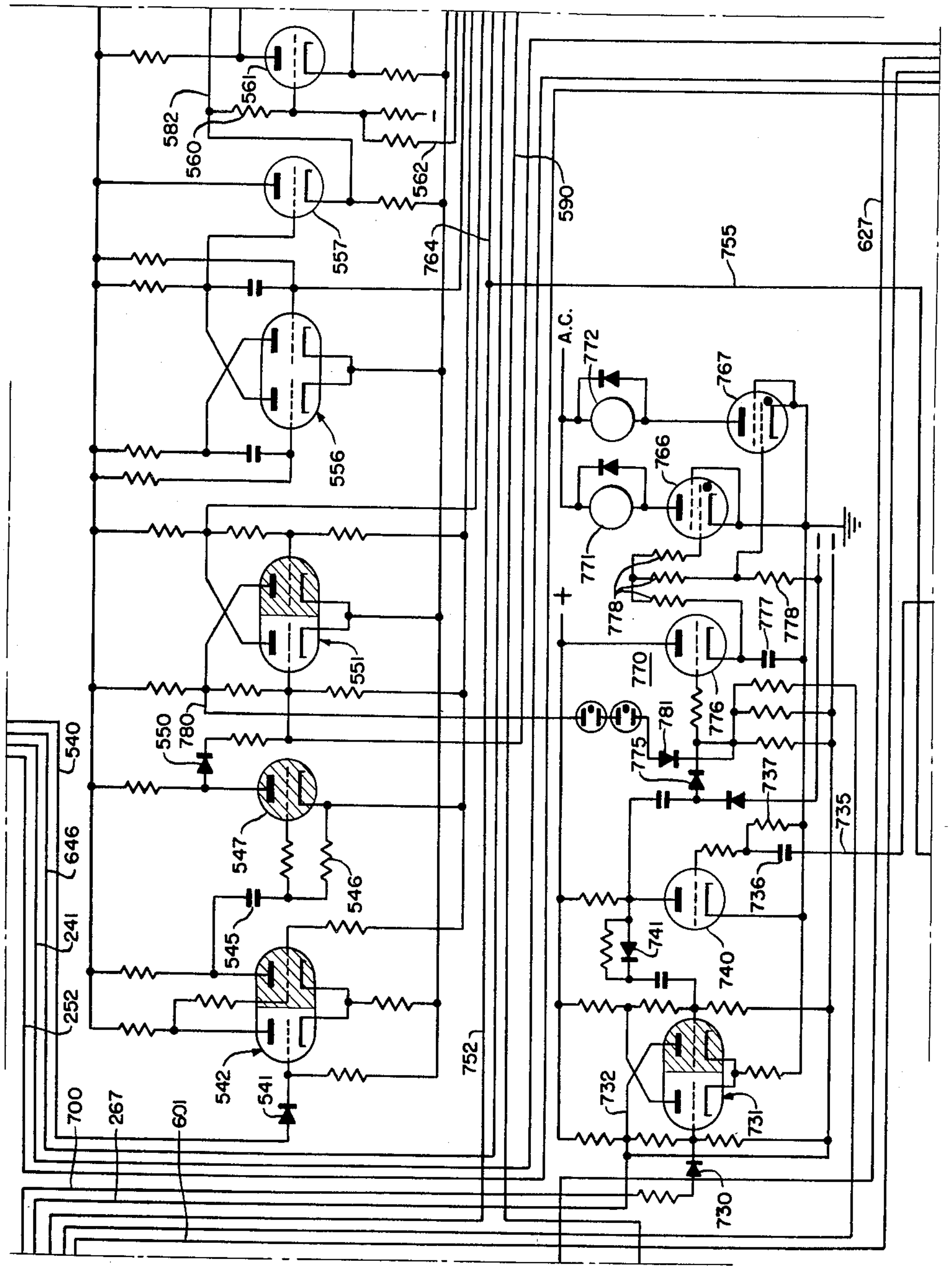

When the carriage return keylever is depressed, a switch 536 is closed and the +30 volt signal is applied to a lead 537 which is another input lead to the 31-to-5 converter 42. Outputs from the 31-to-5 converter 42 energize certain of the oscillators 237, 260 and 261 to place on the magnetic tape 70 a signal indicating that the carriage return function has been selected. Also, when the carriage return switch 536 is closed, the +30 volts are impressed on a lead 540 and applied through a diode 541 to the left-hand grid of a trigger tube 542 (FIG. 9). The right-hand side of the trigger tube 542 is normally conductive, and the anode thereof is coupled through a differentiating circuit including a capacitor 545 and a resistor 546 to the grid of an amplifying tube 547. The circuitry is such that even though the right-hand side of the trigger tube 542 is normally conductive, the amplifier 547 is also normally conductive.

When +30 volts are applied to the grid of the left-hand side of the trigger tube 542 by virtue of the closing of the carriage return switch 536, the left-hand side of the tube 542 is rendered conductive. The decreased voltage appearing on the anode of the left-hand side of the trigger tube 542 is impressed on the right-hand grid of this tube. Consequently, the right-hand side of the trigger tube 542 is rendered nonconductive, and its anode potential increases. This increased potential is applied through the capacitor 545, but, since the tube 547 is already conductive, the positive pulse has no effect. After forty milliseconds, the carriage return switch 536 is opened by mechanical instrumentalities (not shown) in the keyboard and control unit 40. At this time, the +30 volts are removed from the left-hand grid of the trigger tube 542. Consequently, the left-hand side of the trigger tube 542 is rendered nonconductive again, and the right-hand side thereof is again rendered conductive. When the right-hand side of the trigger tube 542 conducts, its anode potential drops, and this drop in potential is differentiated by the capacitor 545 and the resistor 546 and renders the amplifying tube 547 nonconductive. When the amplifier 547 is rendered nonconductive, its anode potential inincreases, and this increase in potential is passed through a diode 550 to the grid of a normally-nonconductive, left-hand side of a justification control tube 551, thereby rendering the left-hand side thereof conductive.

Prior to the rendering conductive of the left-hand side of the control tube 551, this side was nonconductive so that its anode potential was at a relatively-high value which rendered a diode 552 conductive. This relatively-high potential maintained a justification clamp tube 555 normally conductive. The anode of the clamp tube 555 is connected to the right-hand grid of a justification multivibrator tube 556. The multivibrator 556 is of the free-running type, and conduction of the clamp tube 555 prevents the operation thereof. Consequently, as the lefthand side of the control tube 551 is rendered conductive, its anode potential drops to cut off the diode 552 and to remove the positive potential from the grid of the clamp tube 555, which positive potential was maintaining the clamp tube conductive. Therefore, the clamp tube 555 is rendered nonconductive and "unclamps" the justification multivibrator 556 so that this multivibrator runs freely. A single output is taken from the left-hand anode of the multivibrator 556 and applied through a cathode follower 557 and a resistor 560 to the grid of a phase inverting tube 561. It can be seen, then, that alternate positive and negative pulses are applied to the grid of the phase inverter 561 from the justification multivibrator 556.

The circuit in which the phase inverter 561 is connected is such that positive potentials must be applied from the cathode of the cathode follower 557 and to a lead 562 in order that the phase inverter 561 may conduct. As described above, the cathode potential of the cathode follower 557 will be alternately positive and negative, depending upon which side of the free-running multivibrator 556 is conducting. With respect to the lead 562, this lead is connected to the anode of an inverter tube 565, the grid of which is connected over a lead 566 to a junction point 567. The junction point 567 is connected through the diode 466 to the "0" cathode of the hundreds counter 413 in the line length indicator 101, through the diode 467 to the "0" cathode of the tens counter 412, and through the diode 468 to the "0" cathode of the units counter 411. When all of the "0" cathodes of the counters 411, 412 and 413 are conducting, positive potentials render the diodes 468, 467 and 466, respectively, nonconductive so that a positive source 570 is applied over the lead 566 to render the amplifier-inverter tube 565 conductive and thereby cause its anode potential to drop. It can be seen, then, that this will occur only when the total count registered on the line length indicator 101 is zero. However, it was assumed that there was remaining on the line length indicator a count indicating that some units to be justified were remaining in the line to be reproduced. Consequently, all of the "0" cathodes of the counter tubes 411, 412 and 413 are not conducting and the amplifier-inverter tube 565 is held nonconductive. Since the amplifier-inverter 565 is not conducting, its anode potential is at some high value which is applied over the lead 562 to the grid of the phase inverter 561. Therefore, when the cathode of the cathode follower 557 is positive, the phase inverter 561 will be rendered conductive.

Each time the left-hand side of the justification multivibrator 556 is rendered nonconductive, a sufficiently-positive potential is applied to the cathode of the cathode follower 557 to render the phase inverter 561 conductive. Consequently, a plurality of positive pulses are obtained on the cathode of the phase inverter 561 and are passed through a cathode follower 571 to a lead 572 and to an input lead 575 of the 31-to-5 converter 42. These justification pulses develop, at the output of the 31-to-5 converter 42 and on the recording heads 247 and 257, pulses of predetermined frequencies to represent justification pulses. Also, each time the phase inverter 561 is rendered nonconductive (when the left-hand side of the justification multivibrator conducts), a positive pulse is obtained at the anode of the phase inverter 561 and passed over leads 576 and 577 to the grid of the driver tube 410 associated with the units counter 411 of the line length indicator 101. Each of these pulses will cause the line length indicator to be driven down one count. Eventually, when a number of pulses, equal to the number of units of justification remaining in a line to be reproduced, is derived from the justification multivibrator 556, the line length indicator 101 will be driven to zero. That is, the "0" cathodes of the counters of 411, 412 and 413 in the line length indicator 101 will be conducting.

As described above, when the "0" cathodes of the counters 411, 412 and 413 in the line length indicator 101 are conducting, the potential on the junction point 567 is permitted to rise, and this increased potential is applied over the lead 566 and to the grid of the amplifier-inverter tube 565 to render the tube conductive. When this tube is rendered conductive, its anode potential drops, thus removing from the lead 562 the positive potential that was necessary to permit conduction of the phase inverter tube 561. Thereafter, any positive pulses from the justification multivibrator 556 and through the cathode follower 557 will not render the phase inverter 561 conductive so that no further output pulses are applied to the lead 572 and to the recording heads 247 and 257 or to the lead 577 and to the grid of the driver tube 410. It is apparent that, at this juncture, a number of pulses have been applied to the magnetic tape 70 which are equal to the number of justification units remaining in a line to be reproduced and that the line length indicator 101 registers zero.

As described above in reference to the block diagram of the recorder shown in FIG. 1, after the justification information has been placed on the magnetic tape 70, a number of pulses equal to the number of word spaces remaining in a line must be applied to the tape. To accomplish this, a word space control circuit 580 (FIG. 10) is provided. An amplifier-inverter tube 581, similar to tube 561 described hereinabove, in the word space control circuit 580 is held nonconductive during the time that the justification information was being placed on the magnetic tape 70. To show this, it will be remembered that the cathode of the cathode follower 557 had positive and negative pulses alternately applied thereto. When negative pulses were being applied to the cathode of the cathode follower 557, a negative potential was applied to a lead 582 and to the grid of the control tube 581 to maintain the control tube nonconductive. Also, when a positive pulse appeared at the cathode of the cathode follower 557, the phase inverter tube 561 was rendered conductive and its anode potential dropped. This drop in potential was impressed over the lead 576 and through a diode 585 to maintain the control tube 581 nonconductive during these intervals. Consequently, the control tube 581 was held nonconductive during the complete time that the justification information was being applied to the magnetic tape 70.

When, however, the line length indicator 101 registered a zero count, it was shown that the inverter tube 565 was rendered conductive to prevent the phase inverter 561 from conducting. Therefore, the positive pulses on the cathode of the cathode follower 557 are not sufficient to render the phase inverter 561 conductive, and, therefore, no negative pulses appear on the anode of the phase inverter 561 after the justification information has been applied to the magnetic tape 70 and the line length indicator 101 has been set on zero. As a result, no negative pulses are impressed through the diode 585 to hold the amplifier-inverter tube 581 nonconductive. Consequently, the alternate positive and negative pulses being applied to the cathode of the cathode follower 557 are passed over the lead 582 to the grid of the control tube 581 to render this tube alternately conducting and nonconducting, respectively. This causes a plurality of pulses to appear on the cathode of the control tube 581, and these pulses are impressed through a cathode follower 586 and on a lead 587. The lead 587 is another input lead to the 31-to-5 converter 42, and the pulses thereon cause a similar number of pulses, of predetermined frequencies, to be applied to the magnetic tape 70. The number of pulses is indicative of the number of word spaces, and the frequencies chosen will drive a word space counter in the printer, as will be described more fully hereinafter.

Since the justification multivibrator 556 is now used to place pulses on the magnetic tape 70 indicative of word spaces, the multivibrator must generate a number of pulses equal to the number of word spaces used in a given line. To assure that the number of pulses derived from the multivibrator 556 is equal to the number of word spaces, an output lead 590 is connected to the anode of the word space control tube 581 so that each time the control tube 531 is rendered nonconductive, a positive pulse is applied on the lead 590, is differentiated by a capacitor 591 and a resistor 592 and is applied to the grid of a driver tube 595. The driver tube 595 is connected to the word space counter tube 507 such that the counter 507 is driven down thereby, that is, is driven in a counter-clockwise direction. Therefore, the word space counter 507 will eventually register zero, that is, the "0" cathode thereof will be rendered conductive. When the "0" cathode conducts, a positive potential is passed through the diode 521 to render a diode 596 nonconductive. When the diode 596 is rendered nonconductive, the potential of a junction point 597 will increase because of its connection to a positive source 600. This increased potential will be impressed over a lead 601 and to the grid of an inverter tube 602 to render the inverter conductive.

When the inverter 602 conducts, its anode potential drops, and this decreased potential is applied over a lead 605 and through a diode 606 to render a normally-conductive cathode follower 607 nonconductive. When the cathode follower 607 ceases to conduct, its cathode potential drops, and this drop in potential is passed through a diode 610 to the grid of the now-conducting, left-hand side of the justification control tube 551, thereby rendering this side nonconductive. Consequently, the anode potential of the left-hand side of the control tube 551 increases, and this increased potential is passed through the diode 552 to render the clamp tube 555 again conductive. As described above, when the clamp tube 555 is conducting, the free-running justification multivibrator 556 is rendered non-operative. Therefore, no further pulses appear on the anode of the word space control tube 581 and over the lead 590 to drive the word space counter 507 down farther. Since this action was started by the "0" cathode of the word space counter conducting, the desired result of stopping the application of pulses representing word spaces over the lead 587 is stopped when the word space counter is zeroed.

The positive pulse that rendered the diode 552 conductive to render the clamp tube 555 conductive is also applied over leads 611 and 612 and through a capacitor 615 to render the left-hand side of a re-set delay tube 616 conductive. The right-hand side of the delay tube 616 will be rendered nonconductive thereby, and, after a predetermined time, the left-hand side of the delay tube 616 will be rendered nonconductive again. At this time, the anode potential of the left-hand side of the delay tube 616 increases, and this increased potential is applied over a lead 617 and to the grid of the left-hand side of a re-set tube 620. The right-hand side of the re-set tube 620 is normally conductive, and, when the left-hand side thereof is rendered conductive, the right-hand side will be rendered nonconductive. Consequently, the anode potential of the right-hand side increases, and this increased potential is impressed through a cathode follower 621 to the cathode thereof and over a lead 622. The lead 622 is still another input lead to the 31-to-5 converter 42, and certain ones of the oscillators 237, 260 and 261 will be operated thereby to put a magnetic spot indicative of a re-set pulse on the magnetic tape 70.

When the right-hand side of the re-set tube 620 was rendered nonconductive, its anode potential increased, and this increased potential is passed over a lead 625 to a lead 626 and to the grid of the re-set tube 431. Consequently, the anode potential of the tube 431 drops to render the three diodes 435, 436 and 437 conductive. As described hereinabove, each of these diodes is connected to one of the switches 420, 421 and 422. Consequently, when the re-set tube 431 is rendered nonconductive and its anode potential drops, this decreased potential is applied to the terminals 425, 426 and 427. This negative potential on the terminal 425 will cause the "2" cathode of the hundreds counter 413 in the line length indicator 101 to be rendered conductive. Similarly, the negative pulse on the terminal 426 will cause the "7" cathode of the tens counter 412 to be rendered conductive, and the negative potential on the terminal 427 will cause the "8" cathode of the units counter 411 to be rendered conductive. It can be seen, therefore, that after a re-set pulse is applied to the magnetic tape 70, the pulse on the leads 625 and 626 will reset the line length indicator 101 to register a count equal to the total number of units (278) in a line to be reproduced. Likewise, the positive potential on the lead 625 is applied to a lead 627 and to the grid of a tube 630 to render the tube 630 conductive. When the anode potential of the tube 630 decreases, the "0" cathode of the word space counter 507 will conduct. This will assure that the word space counter is zeroed in preparation for counting the number of word spaces in the next line to be reproduced.

In the description above, it was assumed that a normal line of text was to be reproduced and that some space was left over at the end of such line to be justified. There are, however, two situations where no justification is needed. One such situation occurs when the length of a line to be reproduced happens to equal the count registered in the line length indicator. Obviously, when this situation occurs, no justification pulses need be applied to the magnetic tape 70, nor are any pulses necessary to drive the line length indicator 101 down since this indicator now registers zero. To accomplish these purposes, the justification multivibrator 556 is clamped off by the clamp tube 555 so that this multivibrator is not free-running during the time that justification pulses would normally be generated thereby.

To accomplish this purpose, it will be remembered that if units were remaining at the end of a line to be reproduced and the carriage return switch 536 were closed, the +30 volts appearing on the lead 540 passed through the tubes 542 and 547 and rendered the left-hand side of the justification control tube 551 conductive. When this occurs, the anode potential of the left-hand side of the control tube 551 is at a relatively-low value and is impressed over a lead 631 to the control grid of a gating tube 632. The circuit components are so chosen that when the left-hand side of the control tube 551 is conducting, the gating tube 632 is biased at a point far below cutoff. Consequently, the positive pulse appearing on the lead 566 when the line length indicator 101 was zeroed will be applied over a lead 635, through a diode 636 and to the grid of the gating tube 632. However, since the gating tube 632 is biased far below cutoff, this positive potential will be insufficient to render the gating tube 632 conductive. In the situation where the line length indicator is zeroed before the carriage return switch 536 is closed, the left-hand side of the control tube 551 will be cut off as shown in FIG. 9. In this latter case, the anode potential thereof is at an increased value which, when impressed on the grid of the gating tube 632, biases the gating tube to a point only slightly below cutoff. Therefore, when the positive pulse appears on the leads 566 and 635 by virtue of the line length indicator's being zeroed, the gating tube 632 is rendered conductive. When the gating tube 632 conducts, its plate potential drops, and this decreased potential cuts off the left-hand side of a nonjust tube 637 which is normally conducting. Therefore, the anode potential of the left-hand side of the tube 637 increases, and this increased potential is passed over a lead 639 and through a diode 640 to the grid of the clamp tube 555, rendering the clamp tube 555 conductive. As stated hereinabove, when the clamp tube 555 is rendered conductive, the operation of the justification multivibrator 556 will be prevented. It will be noted that the anode of the right-hand side of the tube 637, which is now conducting, is at some low potential which is passed through a diode 641 and to the grid of the cathode follower 607. A negative voltage will appear on the cathode of the cathode follower 607 and will be impressed through the diode 610 and to the grid of the left-hand side of the justification control tube 551, thereby maintaining this side of the tube 551 nonconductive.

It can be seen, then, that when no space remains to be justified after a given line is typed on the keyboard and control unit as determined by the zero settings in the line length indicator, no justification units are put on the magnetic tape 70 and no driving pulses are applied to the driver 410 associated with the units counter 411 in the line length indicator. Also, since the definition of justifying is to increase the width of word spaces, if no justification is required, the word spaces that will be reproduced will be the minimum word space at which the selector switch 491 is set. For this reason is it unnecessary to apply the number of the word spaces to the magnetic tape 70. Also, it is apparent that in the printer, this information will not be required since there will be no justifying of lines whose length is equal to the original count set into the line length indicator 101. As a result, after the last word to be reproduced in the line is applied to the magnetic tape, the next item to be put on the tape will be a re-set pulse.

Continuing with the assumption that the line length indicator 101 registers zero when the carriage return keylever is depressed and the carriage return switch 536 is closed, consider the anode potential of the right-hand side of the trigger tube 542 after forty milliseconds when the carriage return switch 536 again opens. At this time, the right-hand side of this tube reverts to its original, conductive condition as shown in FIG. 9. The negative pulse appearing on the anode thereof is differentiated by the capacitor 545 and the resistor 546 to render the amplifier 547 momentarily nonconductive. Consequently, a positive pulse of short duration is applied through the diode 550 and to the grid of the left-hand side of the justification control tube 551 to overcome, momentarily, the negative bias being applied to this grid by the cathode follower 607. The left-hand side of the control tube 551, therefore, conducts momentarily, and a short, negative pulse is developed on the anode thereof and is passed over the leads 611 and 612 and through the capacitor 615 to the grid of the left-hand side of the re-set delay tube 616. The capacitor 615 differentiates this rectangular, negative pulse, and a positive transition thereof renders the left-hand side of the re-set delay tube 616 conductive. As described hereinabove, after a predetermined delay, the re-set tube 620 is triggered thereby to place a re-set pulse on the magnetic tape 70 by way of the lead 622, to apply a positive potential on the lead 625 to reset the word space counter 597 to zero and to apply a positive potential on the lead 626 to set the predetermined measure on the line length indicator 101.

*Quad Out*

Figure 10:
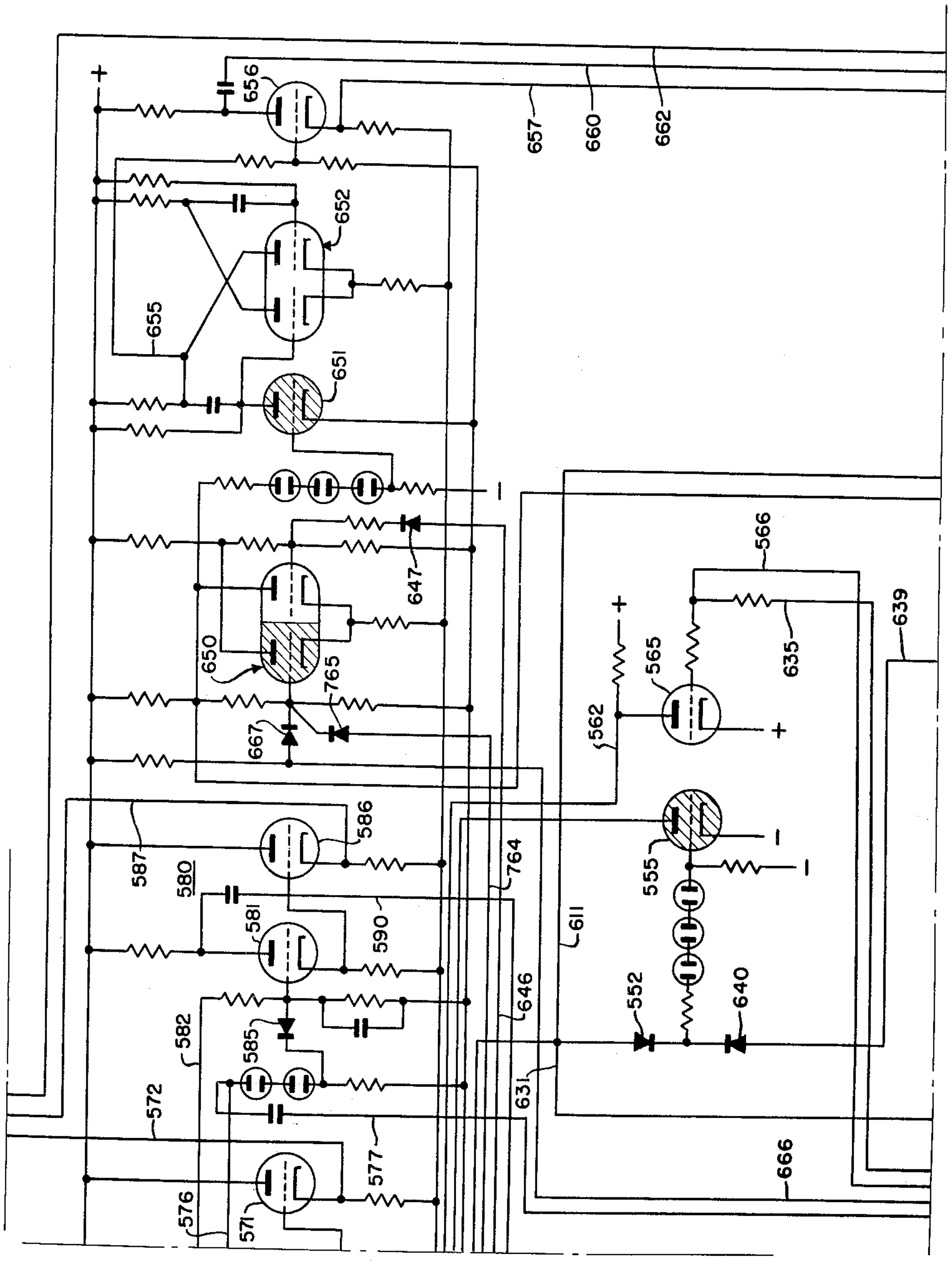
Figure 11:
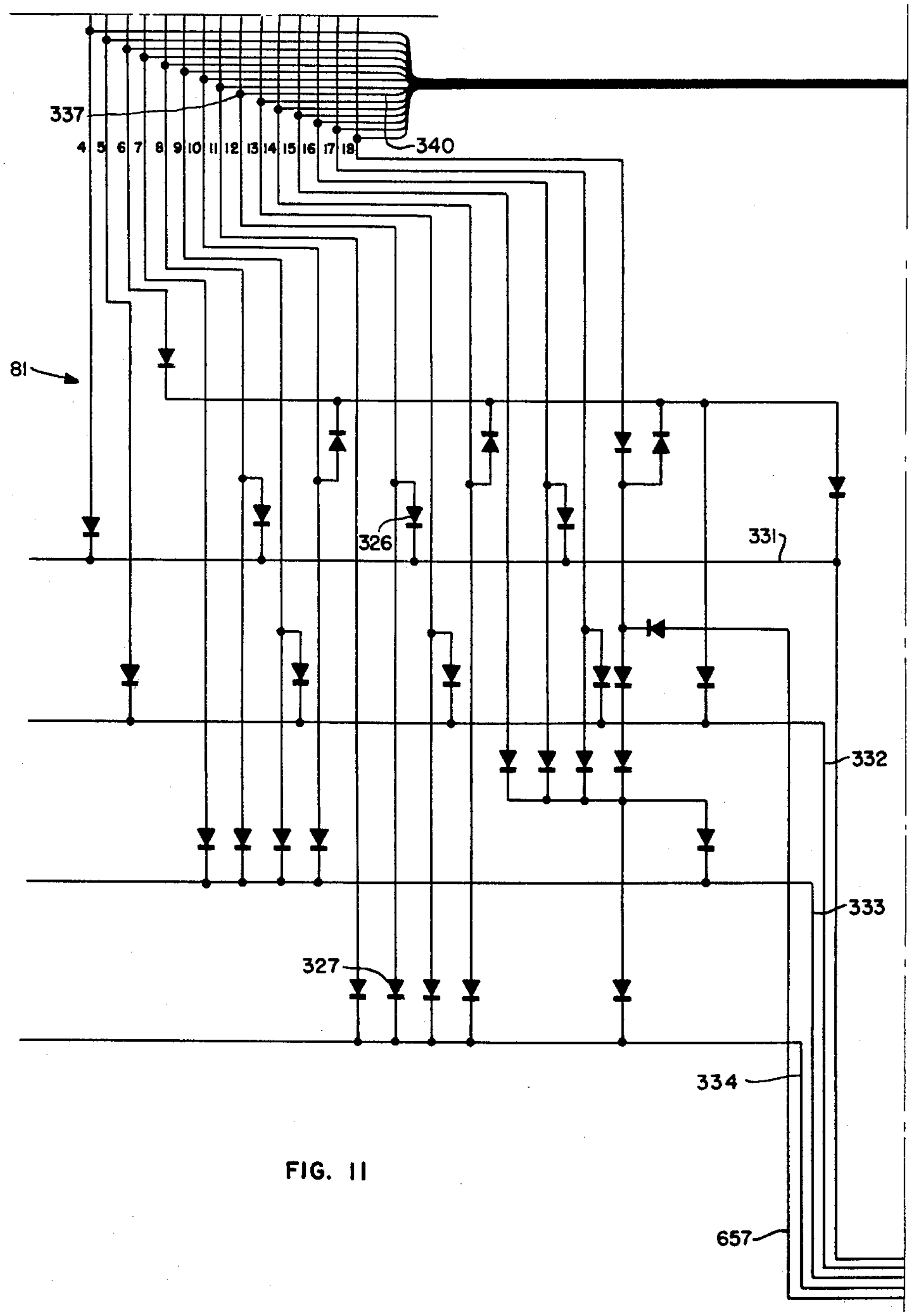

In some instances, it may be desirable to switch the apparatus from a point near the beginning of a line to the end of the line rapidly. Such instances occur when the paragraph ends near the beginning of a line. In this case, nothing is to appear in the line beyond the ending of the paragraph, and it is desirable to place all counters, etc., at the end of the line as rapidly as possible. This could be done, of course, by successively depressing the word space keylever, but this action is time consuming and onerous. Therefore, to feed out to the end of the line rapidly, a quad out circuit (FIG. 10) is provided. If a paragraph, for example, should end near the beginning of a line, a quad out switch 645 (FIG. 5) is closed by a corresponding keylever on the keyboard and control unit 40. Closure of the switch 645 places +30 volts on a lead 646, and this positive potential is passed through a diode 647 to the grid of the right-hand side of a quad out control tube 650. When the right-hand side of the control tube 650 is in its normally-nonconductive condition, as shown in FIG. 10, a relatively-high potential on the anode thereof is impressed on the grid of a clamp tube 651, thereby maintaining the clamp tube 651 normally conductive. When the clamp tube 651 is conducting, it prevents the operation of a free-running multivibrator 652.

Consequently, when the right-hand side of the control tube 650 is rendered conductive, by closure of the quad out switch 645, the anode potential thereof drops to render the clamp tube 651 nonconductive and thereby to permit the operation of the free-running multivibrator 652. During the operation of the multivibrator 652, when the right-hand side thereof is rendered nonconductive, its increased anode potential is impressed over a lead 655 and to a driver tube 656, and a positive potential appears on the cathode thereof. This positive potential is passed over a lead 657 which is an input lead to the 15-to-4 converter 81. As described hereinabove, output signals will appear on a predetermined number of the output leads 331 to 334, inclusive, to energize either or both of the oscillators 271 and 272, and to place, on the magnetic tape 70, magnetic spots indicative of a predetermined set width. In the present case, it may be decided to use a set width of 18 units for quadding out of a line. Therefore, an output signal will appear on each of the leads 331 to 334, inclusive, and a 4000 c.p.s. and a 5000 c.p.s. signal will be placed on each of the recording heads 247 and 257. Since the quad out multivibrator 652 will continue to operate as long as the clamp tube 651 is cut off, 18 units of set width will be placed on the magnetic tape 70 each time the right-hand side of the multivibrator 652 is rendered nonconductive. In this manner, the end of the line will be quickly approached.

When, during the operation of the multivibrator 652, the right-hand side thereof is rendered conductive, a negative potential on the anode of the right-hand side will render the driver 656 nonconductive so that positive pulses appear on the anode thereof. These positive pulses are passed over a lead 660 and to the set width drive circuit 105. As described hereinabove, each of these pulses will cause a particular count to be registered on the set width counter 346. In a present example, each positive pulse appearing on the lead 660 will cause the set width counter 346 to register a count of 18, corresponding to the set width set into the 15-to-4 converter 81. Such a count will cause the line length indicator 101 to decrease 18 units each time a pulse is applied to the lead 660.

Since it is desirable to stop this automatic, quad-out action before the actual end of a line is reached, when the line length indicator 101 registers a count of twenty-two, the automatic quadding out is stopped. Therefore, when the "2" cathode of the tens counter 412 and the "2" cathode of the units counter 411 in the line length indicator 101 are conducting, two diodes 661 and 662, respectively, are cut off, and the potential of a junction point 665 between these diodes is increased. This increased potential is passed over a lead 666 and through a diode 667 to render the left-hand side of the quad out control tube 650 again conductive. The right-hand side of the control tube 650 is thereby rendered nonconductive, its anode potential increases and this increase in potential again renders the clamp tube 651 conductive, thereby cutting off the operation of the quad out multivibrator 652. Any linage that remains in the line under consideration, and in the present example such linage will be between four and eighteen units as indicated on the line length indicator, can be disposed of by depressing the panel indent switch 471 (FIG. 4). Prior to closing the panel indent switch 471, an indent selector switch 670 is set on the exact number of units remaining in the line as indicated by the line length indicator 101. Then, when the panel indent switch 471 is closed and the word space keylever depressed, thereby closing the switch 470, +30 volts are applied over a lead 671, through a diode 672 and through the indent selector switch 670 to the 15-to-4 converter 81 and to the set width drive circuit 105. In the manner described above, the line length indicator 101 will be driven down to zero, at which time the carriage return switch 536 is depressed to complete the line.

*Upper Case—Lower Case*

Referring to FIG. 33, a detailed view of a typical type font is shown. The type font is shown on its side which is the position in which it is placed in the printer. Basically, the type font comprises five vertical, double rows of type designated 675 to 679, inclusive, and five horizontal double rows of type designated 685 to 689, inclusive. Considering that each vertical row has a left side and a right side, reference to FIG. 33 will show that all upper case characters are located on the left side of each vertical row, and all lower case characters are located on the right side thereof. Consequently, assuming that the lower case characters on the right sides of the columns 675 to 679, inclusive, are in alignment with the smaller lenses 175—175, in order to print an upper case character, it is only necessary to shift the font horizontally and to the right a distance of one-half row. Such shifting is caused by a solenoid 691 (FIG. 32) and is described more fully in the above-mentioned Friedman application, Serial No. 694,019, filed November 1, 1957.

Normally, the type font shown in FIG. 33 is in the lower-case position, that is, the lower case characters are in alignment with the smaller lenses 175—175. Referring to FIG. 5, the type font will be in the lower case position when the upper case switch 275 is open. Assuming that the upper case switch 275 is now closed, the upper case relay 277 will be energized and the contacts 282—282 will be closed thereby. Then, upon closure of the momentary switch 276, +30 volts are applied over the lead 286 and through the contacts 282—282. The lead 286 is, in effect, another input lead to the 31-to-5 converter 42, and a signal thereon will render conductive diodes 289, 290, 291 and 292 to place a signal on output leads 231, 234 and 235. Therefore, the oscillators 237, 260 and 261 will be energized to place on the recording heads 247 and 257 signals indicative of the upper case position of the type font. Consequently, the type font 177 will remain in this upper case position until the upper case switch 275 is opened.

When the upper case switch 275 is opened, the upper case relay 277 is de-energized to open the contacts 282—282 again and reclose the contacts 280—280. It will be remembered that, at this time, the momentary switch 276 also recloses momentarily so that +30 volts are impressed on the lead 286 and through the now-closed contacts 280—280 to the 31-to-5 converter 42. The lead 286 will act as another input lead to the 31-to-5 converter at this time, and the +30 volts thereon energize the diode 295, and, through a diode 692, the diodes 291 and 292. In this manner, signals are applied to each of the output leads, 232, 234 and 235 to place a signal, indicative of the lower case position of the type font, on the recording heads 247 and 257.

*Split-Shift Control*

Referring again to the type font depicted in FIG. 33, it will be noted that each of the horizontal rows 685 to 689, inclusive, contains an upper side and a lower side. The upper side of each of the rows, for example, the upper side containing the characters "O—o," "I—i" and "D—d," contains characters that are more commonly used than other characters. Also, the lower side of each of the rows 685 to 689, inclusive, contains the lesser-used characters. For this reason, the upper side of each of the horizontal rows will be referred to as the "common" row, and the lower side will be referred to as the "uncommon" row. Normally, the type font 177 is in the common position, that is, the upper rows containing the more-commonly used characters are normally in alignment with the smaller lenses 175—175. As is described in detail in the above-identified Friedman application (Serial No. 694,019), a solenoid 695 (FIG. 32) maintains the type font 177 in this normal, "common" position. When the solenoid 695 is energized, the type font 177 will be moved thereby vertically to place the uncommon rows in alignment with the lenses 175—175. In order to prevent constant upward and downward shifting of the type font 177, should a series of uncommon characters be chosen, the type font 177 will be shifted upwardly to the uncommon position and will remain in such position through the series of uncommon characters until another common character is chosen. In other words, if a series of uncommon characters is chosen, the solenoid 695 is energized and remains energized until the end of such series.

More particularly, the solenoid 695 normally maintains the type font 177 in the common position. When an uncommon character is chosen, a signal is derived from the 1000 c.p.s. oscillator 261 and applied to the recording head 257. This signal continues to be applied to the recording head 257 until another common character is chosen. When any uncommon character is chosen, a positive potential is impressed on a lead 700 (FIG. 7). To cite several illustrations, and referring to FIG. 3, assume that the lower case "j" is chosen. A switch 701 is closed therefor to place +30 volts on a lead 702. This positive potential renders a diode 705 conductive and is impressed on a lead 706 and on the lead 700. In a like manner, if the numeral "3" is chosen, a switch 710 is closed to impress +30 volts on a lead 711, through a diode 712, over a lead 715 and through a diode 716 to the lead 700. Finally, assume that a hyphen (-) is chosen. In this case, a switch 720 is closed to impress +30 volts on a lead 721, through a diode 722, over a lead 725 and through a diode 726 to the lead 700. Similar circuits can be traced for each of the uncommon characters in the lower side of the horizontal rows 685 to 689, inclusive.

Assume, therefore, that an uncommon character has been chosen to place a positive potential on the lead 700. This positive potential is applied through a diode 730 and to the grid of the lefthand side of a split shift control tube 731. The right-hand side of the tube 731 is cut off thereby, and the anode potential thereof rises. This increased potential is impressed on a lead 732, on the lead 267 and through the resistor 270 associated with the input circuit of the oscillator 261. Consequently, a 1000 c.p.s. signal is applied over the lead 252 and to the recording head 257. It can be seen that, if a series of "uncommon" characters are chosen, a continuous, positive potential will be applied to the lead 700 to maintain the right-hand side of the control tube 731 nonconductive. This will cause a continuous positive voltage to be applied over the lead 732 and through the resistor 270 to gate the output of the oscillator 261. Consequently, a continuous 1000 c.p.s. signal will be applied to the recording head 257.

It will be remembered that each time a character or a function having a set width was applied to the input of the 15-to-4 converter 81, a positive potential was applied over a corresponding one of the leads such as the lead 340 and to the input of the set width drive circuit 105. It will also be remembered that each time such a character or function having a set width was chosen, a positive potential was applied over the lead 360 to render the right-hand side of the trigger tube 361 conductive. Consequently, the anode potential of the right-hand side of the trigger tube 361 decreases each time a character or function having a set width is chosen. The negative pulse appearing on the right-hand anode of this tube is impressed over a lead 735, differentiated by a capacitor 736 and a resistor 737 and applied to the grid of a buffer tube 740. The differentiated, negative pulse on the grid of the buffer tube 740 causes a positive spike to appear on the anode thereof and this positive pulse of short duration is impressed through a diode 741 and applied to the grid of the right-hand side of the split-shift control tube 731. This positive pulse attempts to render the right-hand side of the control tube 731 conductive, but it cannot do so as long as a positive pulse is being applied to the lead 700 due to an uncommon character being chosen. If, however, a common character is chosen, no positive pulse appears on the lead 700 to prevent the right-hand side of the control tube 731 from conducting due to the positive pulse being applied to the grid thereof from the buffer tube 740. Consequently, the control tube 731 will revert to the condition shown in FIG. 9 when a common character is chosen, the positive pulse being applied to the lead 700 will be removed, and the gated oscillator 261 will no longer be energized. Therefore, the 1000 c.p.s. signal that was being applied to the recording head 257 due to uncommon characters being chosen will be removed, and the solenoid 695 will be de-energized to return the type font 177 to its normal position, the "common" position.

*Change-Font Signal*

Occasions arise when it is necessary to print different kinds of type in a given line or group of lines. With the present invention, this will necessitate a changing of the type font 177. As disclosed more fully in the above-identified Friedman Patent No. 3,044,374, the changing of the type font entails a simple operation, and provision is made to inform the operator of the printer that a changing of fonts is required. Referring to FIG. 5, to generate such a signal, a change switch 745 is closed. Closure of the change switch 745 will couple the +30 volts to a lead 746 which is still another input lead to the 31-to-5 converter 42. With a positive potential on the lead 746, diodes 291 and 292 only are rendered conductive to place signals on the output leads 234 and 235. Such signals energize the oscillators 260 and 261 to place a 2000 c.p.s. signal on the recording head 257 and a 1000 c.p.s. signal on the recording head 247. When these signals are received by the printer, instrumentalities will be actuated to notify the operator that a change of fonts is necessitated.

*Indent*

There are several situations where spaces must be provided in lines and where no justification of such spaces is desired. Such a situation exists each time a new paragraph is to be started in a line, so that such line must be indented a predetermined amount. Another situation arises where fixed columns of tabular matter are to be reproduced. Obviously, the spaces between the fixed columns must not be justified. To set up an indent for a new paragraph or to set up rows of tabular matter, the panel indent switch 471 is provided to cause the indenting, and the indent selector switch 670 is provided to cause a given amount of indenting. When a width indent button (not shown) is depressed, the switch 471, a part thereof, is moved to the left, and the word space switch 470 is then closed. Consequently, +30 volts are applied through the now-closed word space switch 470, the panel indent switch 471, over the lead 671 and through the indent selector switch 670 to the 15-to-4 converter 81. The output of the 15-to-4 converter 81 will place a given set width, as determined by the setting of the indent selector switch 670, into the reproduced line. However, since all of the structure for justifying such line is bypassed, no justification of the indented space will be made.

*Error*

It often happens that, as an operator is typing a given line on the keyboard and control unit 40, an error is made during the typing of the line. In order to do away with this line and prevent its reproduction in the printer, an error keylever is provided on the keyboard and control unit 40. When the error key is depressed, a special signal is applied to the magnetic tape 70. Since the tape moves in the printer in a direction opposite to that in which it moved when the information was placed thereon by the recorder, the printer will sense the error signal before it receives the erroneous line. Consequently, instrumentalities are provided in the printer, and will be described hereinafter, for by-passing such an erroneous line. Also, in the recorder, when the error keylever is depressed, it is necessary to zero all counters, and it is advisable to clamp off the justification multivibrator 556 and the quad out multivibrator 652. With respect to zeroing the counters, assume that an error switch 750 (FIG. 5) is closed when a corresponding error keylever on the keyboard and control unit 40 is depressed. Closure of the error switch 750 will impress the +30 volts on a lead 751 which is still another input lead to the 31-to-5 converter 42. Consequently, output signals are derived from the 31-to-5 converter 42 over certain ones of the leads 231 to 235, inclusive, to place on the heads 247 and 257 signals indicative of an error signal.

Also, closure of the error switch 750 places the +30 volts on leads 752 and 755, through a diode 756 and to the grid of a zero re-set tube 757, rendering the re-set tube 757 conductive. When the tube 757 is rendered conductive, its anode potential drops to render conductive three diodes 760, 761 and 762. These diodes are connected to the "0" cathodes of the units, tens, and hundreds counters, respectively, in the line length indicator 101. Negative potentials being applied to these "0" cathodes will cause the line length indicator to be zeroed. As described hereinabove, when the line length indicator 101 is zeroed, the diodes 466, 467 and 468 are rendered nonconductive so that the potential at the junction point 567 is increased. This increase in potential is applied over the leads 566 and 635 and through the diode 636 to render the gating tube 632 conductive. The anode potential of the gating tube 632 will drop, and this decreased potential cuts off the left-hand side of the nonjust tube 637. It will be remembered that when this side of the tube 637 was rendered nonconductive, the anode potential thereof increased, and this increased potential was applied through the diode 640 and to the grid of the clamp tube 555, rendering the clamp tube 555 conductive. When the clamp tube 555 is conducting, the justification multivibrator 556 is prevented from operating.

Finally, the positive potential appearing on the lead 752 is passed over a lead 764, through a diode 765 and is impressed on the grid of the left-hand side of the quad out control tube 650. The right-hand side of the control tube 650 is thereby rendered nonconductive, and its increased anode potential is impressed on the grid of the clamp tube 651 to maintain the clamp tube conductive. It will be remembered that when the clamp tube 651 is conductive, the quad out multivibrator 652 is prevented from operating. Operation of the tube 637 clamps the justification control tube 551, as in the case of nonjustified lines described hereinabove, and prevents any attempt to send justification information to the tape 70.

*Tape Saver*

If no typing operation is to be performed on the keyboard and control unit 40 for a predetermined length of time, it may be desirable to de-energize the motor driving the typewriter and the motor driving the magnetic tape 70. Such a tape-saving circuit is provided and, referring to FIG. 9, this circuit includes two thyratrons 766 and 767 and an integrator circuit 770. Connected in the anode lead of the thyratron 766 is a solenoid 771, and connected in the anode circuit of the thyratron 767 is another solenoid 772. An A.C. potential is applied across the series circuit including the solenoid 772 and the thyratron 767, and as long as the thyratron 767 is conducting, the typewriter motor will be energized thereby. Similarly, the A.C. potential is applied across the series combination of the solenoid 771 and the thyratron 766 to maintain a tape solenoid (not shown) energized when the thyratron 766 is conducting. The circuit is arranged so that if no character or function is chosen within a twelve second interval, the thyratrons 766 and 767 will be rendered nonconductive to de-energize the relays 771 and 772 and cut off the typewriter motor and the tape solenoid, respectively.

It will be remembered that each time a character or a function having a set width is chosen, the right-hand side of the trigger tube 361 (FIG. 12) is rendered conductive, so that the anode potential thereof decreases. This decrease in potential is applied over the lead 735 and to the grid of the buffer tube 740, thereby rendering the buffer tube 740 nonconductive. When the tube 740 is rendered nonconductive, its anode potential increases, and this increase in potential is impressed through a diode 775 and to the grid of a triode 776 in the integrator circuit 770. Consequently, this positive potential appears on the cathode of the tube 776 and charges a capacitor 777. It can be seen, that each time a set width occurs, a positive pulse appears on the cathode of the tube 776 to maintain this positive charge on the capacitor 777. This positive potential is impressed on the control grids of the thyratrons 766 and 767 to maintain the thyratrons in a normally-conductive condition. The circuitry including the capacitor 777 and resistors 778—778 is chosen so that if no character or function is chosen for a twelve second period, the capacitor 777 discharges, and, when it has discharged a predetermined amount, a sufficiently-negative pulse is applied to the control grids of the thyratrons 766 and 767. Consequently, the solenoids 771 and 772 are de-energized to deactivate, respectively, the typewriter motor and the tape drive solenoid. It will be noted that when a quading out operation is being performed, set widths are generated to maintain the solenoids 771 and 772 energized. Also, when justification operations are being performed, the justification control tube 551 is alternating in conduction to apply a series of positive pulses over a lead 780 and through a diode 781 to the control grid of the tube 776. Such pulses maintain the positive charge on the capacitor 777 to maintain the thyratrons 766 and 767 conductive. Therefore, during these times, the typewriter motor and the tape driving motor will be energized.

PRINTER

It will be remembered that each of the recording heads 247 and 257 in the recorder had signals of five frequencies impressed thereon. Magnetic spots representing each of these frequencies were placed on the tape 70 in two rows. Consequently, two sensing heads are necessary to sense these magnetic spots on the tape. To perform this sensing operation, two magnetic pick-up heads 800 and 801 are provided in the printer, shown in FIGS. 17 to 30, inclusive, and the outputs thereof are amplified in amplifiers 802 and 803, respectively. An output voltage, including all frequencies that existed in the magnetic spots on the magnetic tape 70, is obtained at the cathode of a cathode follower 805 in the amplifier 802 and is impressed over a lead 806 to the five filters 135 to 139, inclusive. Similarly, a second output pulse is obtained from the cathode of a cathode follower 809 in the amplifier 803 and is applied over a lead 810 to the five filters 130 to 134, inclusive. Each of the filters 130 to 134, inclusive, and 135 to 139, inclusive, is designed to pass voltages of a corresponding one of the frequencies of the oscillators in the recorder. The following chart indicates the relationship among the oscillators in the recorder, the recording heads 247 and 257 energized thereby and the corresponding filters in the printer, from the standpoint of the frequencies generated by the oscillators and the frequencies passed by the filters:

| Frequency, c.p.s. | Oscillator | Head energized | Passed by filter |
|---|---|---|---|
| 5,000 | 271 | 247 | 135 |
| | 271 | 257 | 130 |
| 4,000 | 272 | 247 | 136 |
| | 272 | 257 | 131 |
| 3,000 | 237 | 247 | 137 |
| | 237 | 257 | 132 |
| 2,000 | 260 | 247 | 138 |
| | 260 | 257 | 133 |
| 1,000 | 261 | 247 | 139 |
| | 261 | 257 | 134 |

For the present purposes, only the filter 137 will be described, and it is necessary only to state here that when a signal having a frequency of 3000 c.p.s. is applied to the lead 806, this signal is applied to the grid of the left-hand side of a tube 811 in the filter 137, and a voltage of a frequency of 3000 c.p.s. is obtained at the cathode of the right-hand side of the tube 811. To illustrate further the operation of the filter, it will be remembered that when the upper case "A" was to be reproduced, the gated oscillator 237 in the recorder was energized to place a 3000 c.p.s. signal on the recording head 247. This signal is picked up by the pick-up head 800, is amplified in the amplifier 802 and is applied to the lead 806. Consequently, a voltage having a frequency of 3000 c.p.s. is obtained on the cathode of the right-hand side of the tube 811. This voltage is demodulated by a diode 812, a diode 813 and a capacitor 815 and passed to the grid of the left-hand side of a trigger tube 816, rendering the left-hand side conductive. The right-hand side of the trigger tube 816 is rendered nonconductive, and its anode potential increases. This increased potential is passed over a lead 817 to the grid of a cathode follower 820.

In a similar manner, the anode of the now-conductive, left-hand side of the trigger tube 816 is connected to the grid of a second cathode follower 821 by a lead 822. Resistors 825—825, forming a voltage divider, are so designed that, under these conditions, +40 volts appear on the cathode of the first cathode follower 820, and —20 volts appear on the cathode of the second cathode follower 821 and on an input lead 824 of the 5-to-31 converter 140. Normally, the positive potential on the grid of the first cathode follower 820 would cause +40 volts to appear on the cathode thereof and be applied to an input lead 826 of the 5-to-31 converter 140. However, this is prevented at this time since the +40 volts being applied over the lead 817 to the grid of the first cathode follower 820 are also applied to the lower side of a diode 827. The upper side of the diode 827 is connected to a common lead 830, to the cathode of a normally-nonconductive cathode follower 832 and through a low-valued resistor 833 to negative source 834. As a result, no input signal is applied to the 5-to-31 converter 140 at this time.

The purpose of the diode 827, and all similar diodes, is to apply all signals of different frequencies to the 5-to-31 converter 140 simultaneously. It will be remembered that the filter 137 passes signals of 3000 c.p.s., the filter 138 passes signals of 2000 c.p.s. and the filter 139 passes signals of 1000 c.p.s. Since the rise time of each of these filters is inversely proportional to the frequency thereof, if these signals were applied directly to input leads of the 5-to-31 converter 140, the various input leads would obtain their signals at different times. More particularly, since the input leads 824 and 826 are connected to the plates of the trigger tube 816 through the cathode followers 821 and 820, respectively, signals of a given rise time will trigger the tube 816 sooner than one with a slower rise time. This can be seen more clearly by referring to FIG. 36*a*, wherein wave forms of the voltages derived from the filters 137, 138 and 139 are shown.

Obviously, the rise time of the 3000 c.p.s. signal being passed by the filter 137 will be faster than either of the other two signals. To prevent these voltages of differing rise times from energizing the 5-to-31 converter 140 at different time intervals, the diode 827 and all similar diodes are rendered nonconductive simultaneously. To accomplish this, each time a signal is applied to the grid of a left-hand side of a trigger tube such as the trigger tube 816, to render the normally-nonconductive left-hand side conductive and the right-hand side nonconductive, the positive potential appearing on the anode of the right-hand side is passed through a diode 835 to a common lead 836. The lead 836 is connected to the grid of the left-hand side of a delay tube 837. Therefore, the voltage having the highest frequency, and, consequently, the fastest rise time, which is applied to the common lead 836 will render the left-hand side of the tube 837 conductive (FIG. 36*b*). The right-hand side of the tube 837 is cut off thereby, its anode potential increases, and this increase in potential is applied to the grid of a normally-conducting, left-hand side of a univibrator 840.

Figure 18:
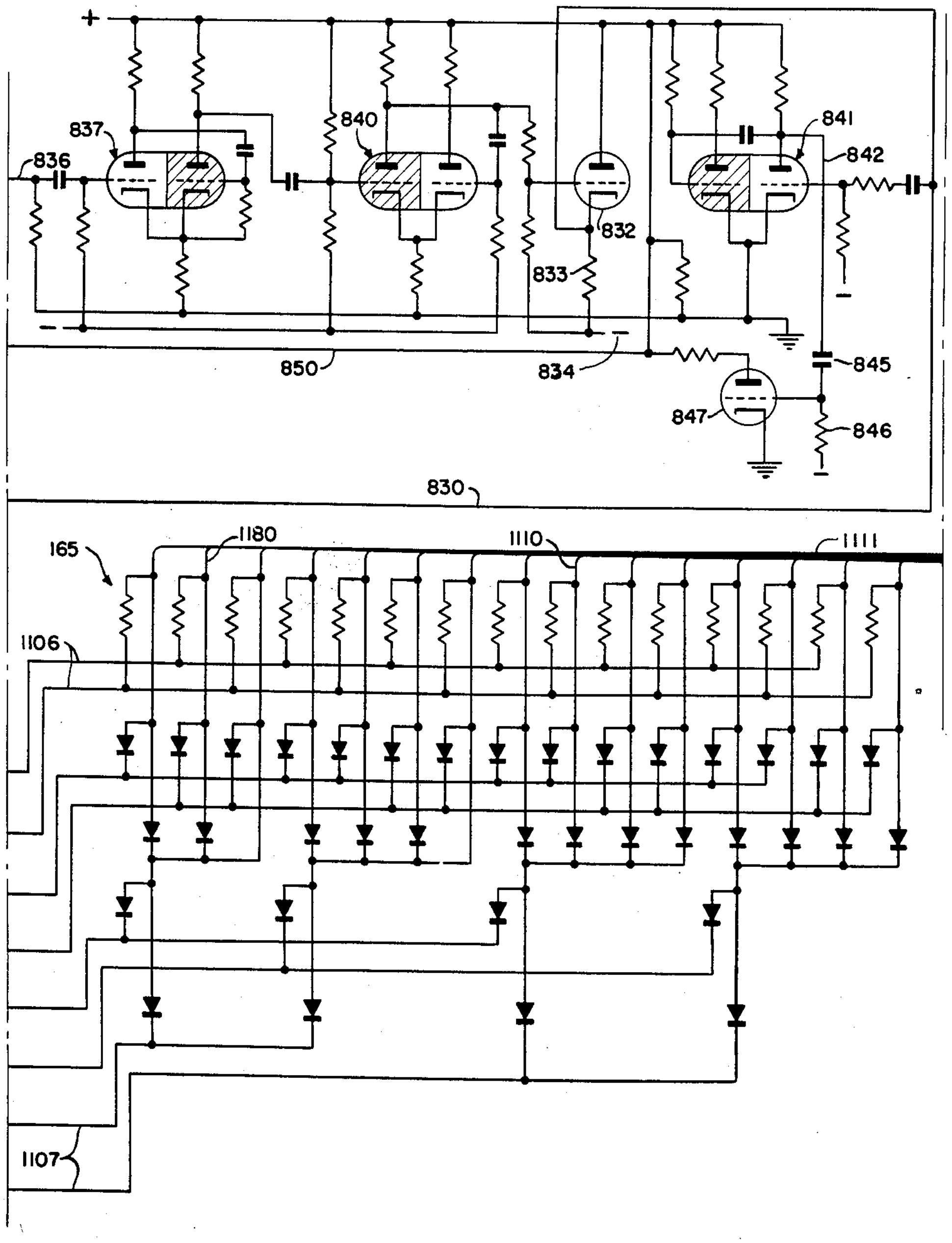
Figure 19:
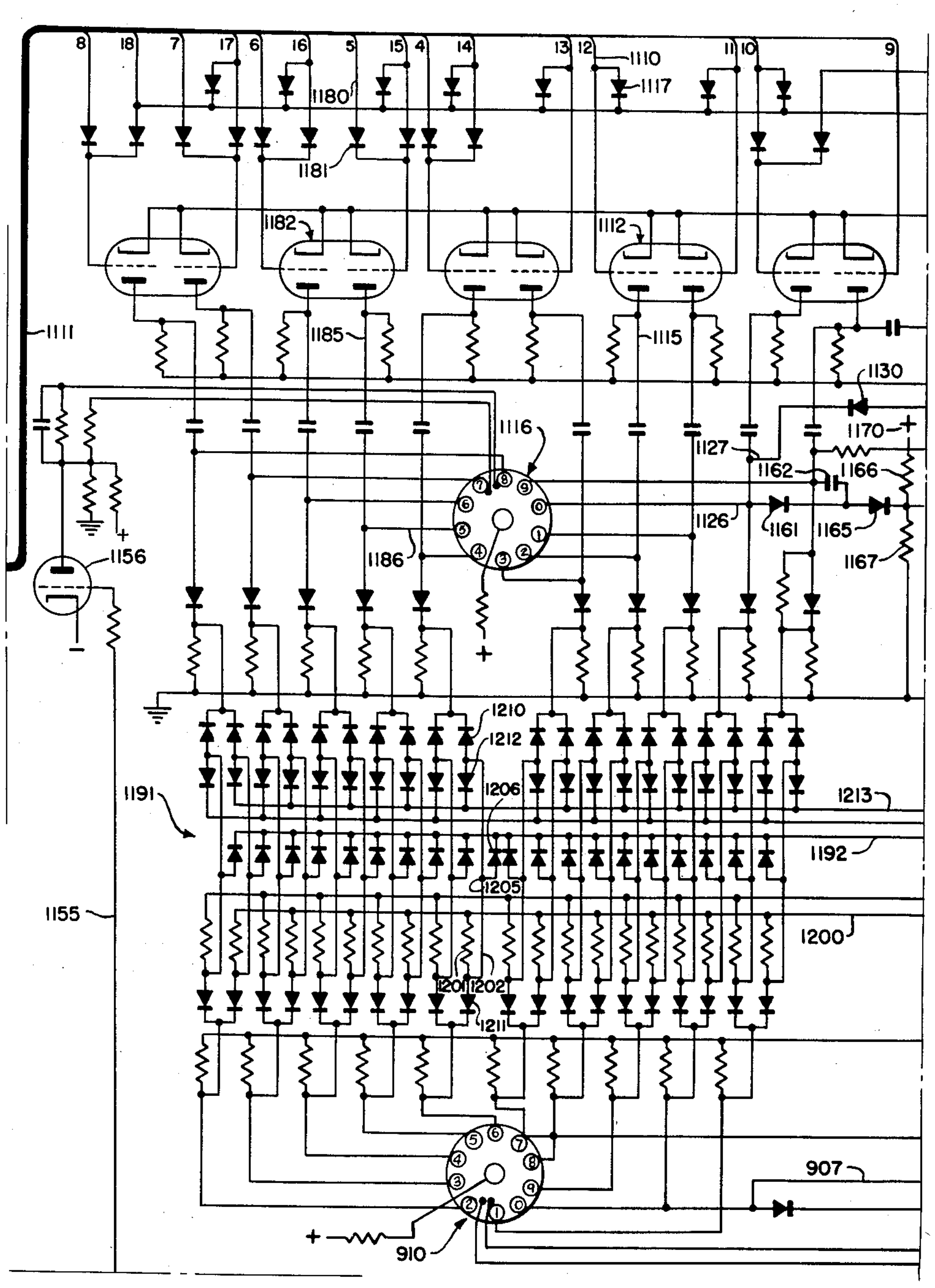
Figure 20:
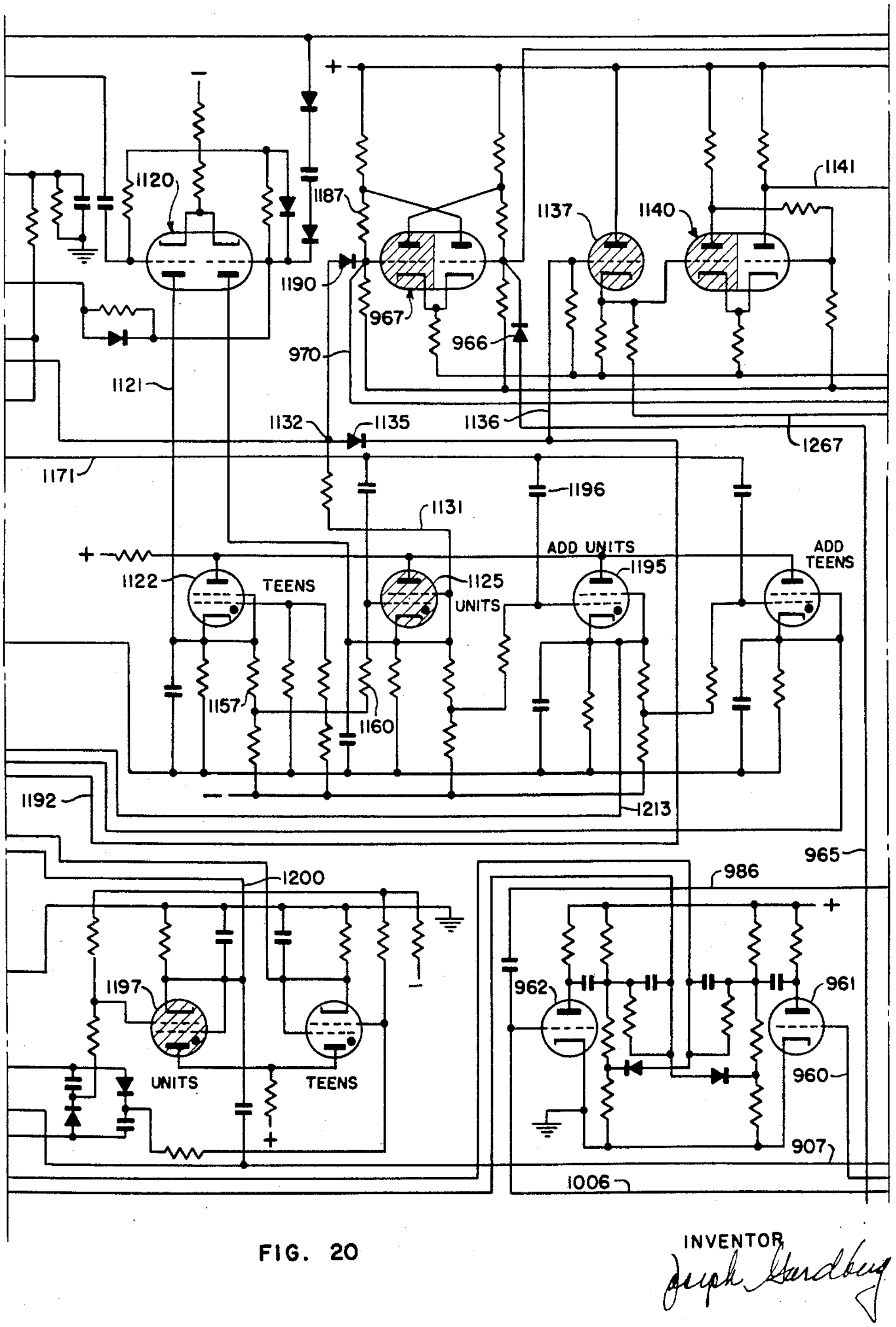
Figure 21:
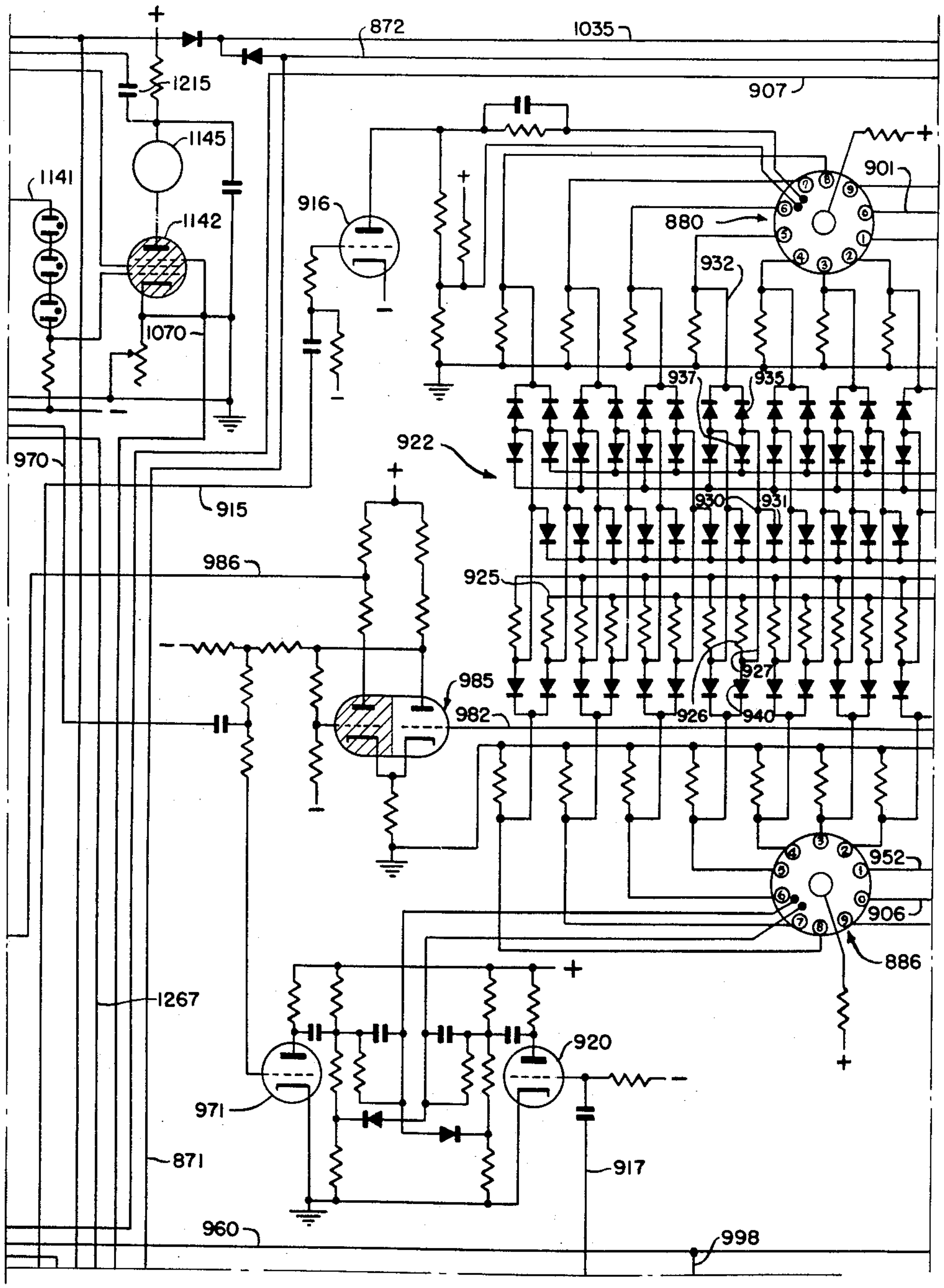
Figure 22:
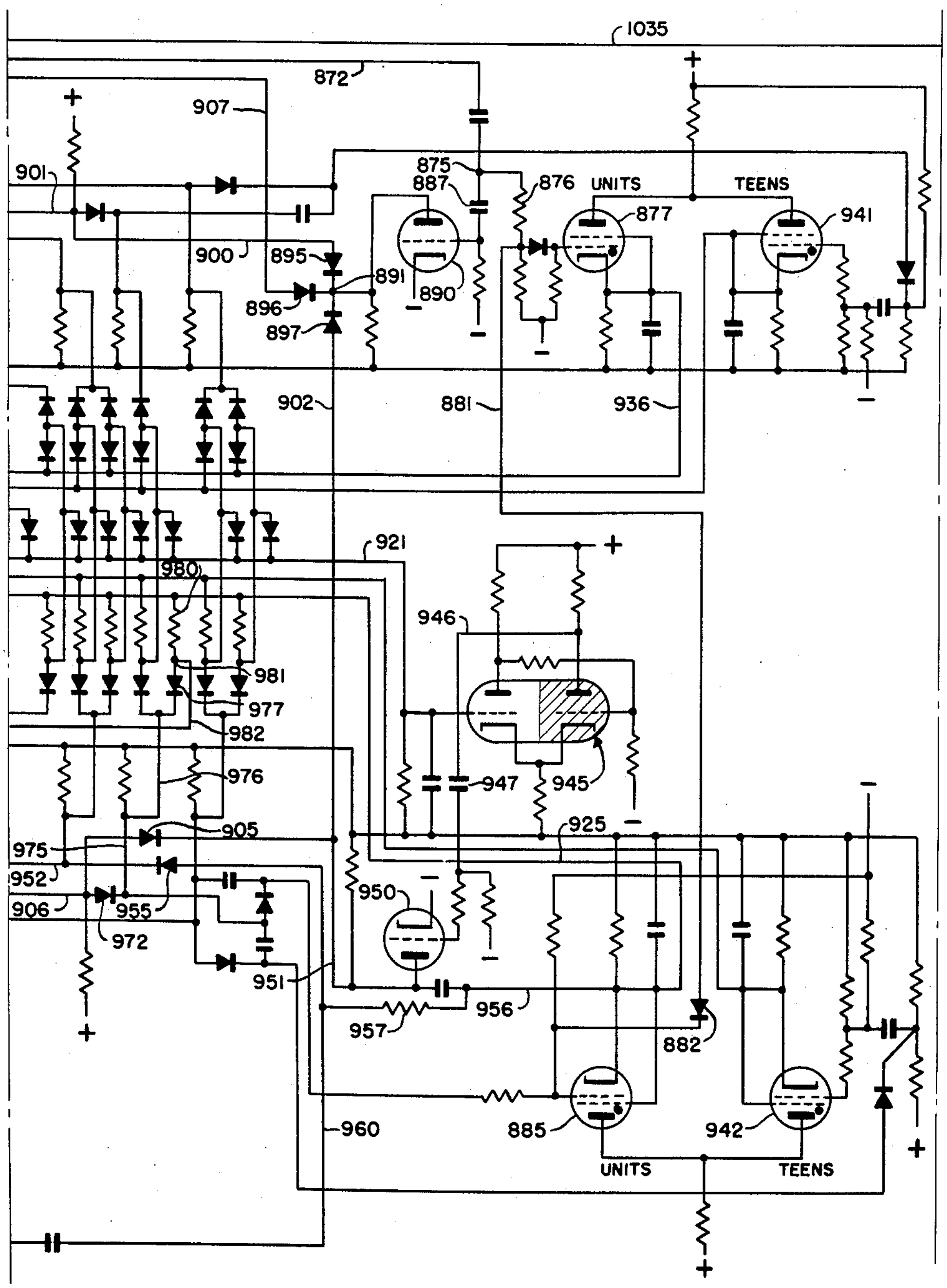
Figure 23:
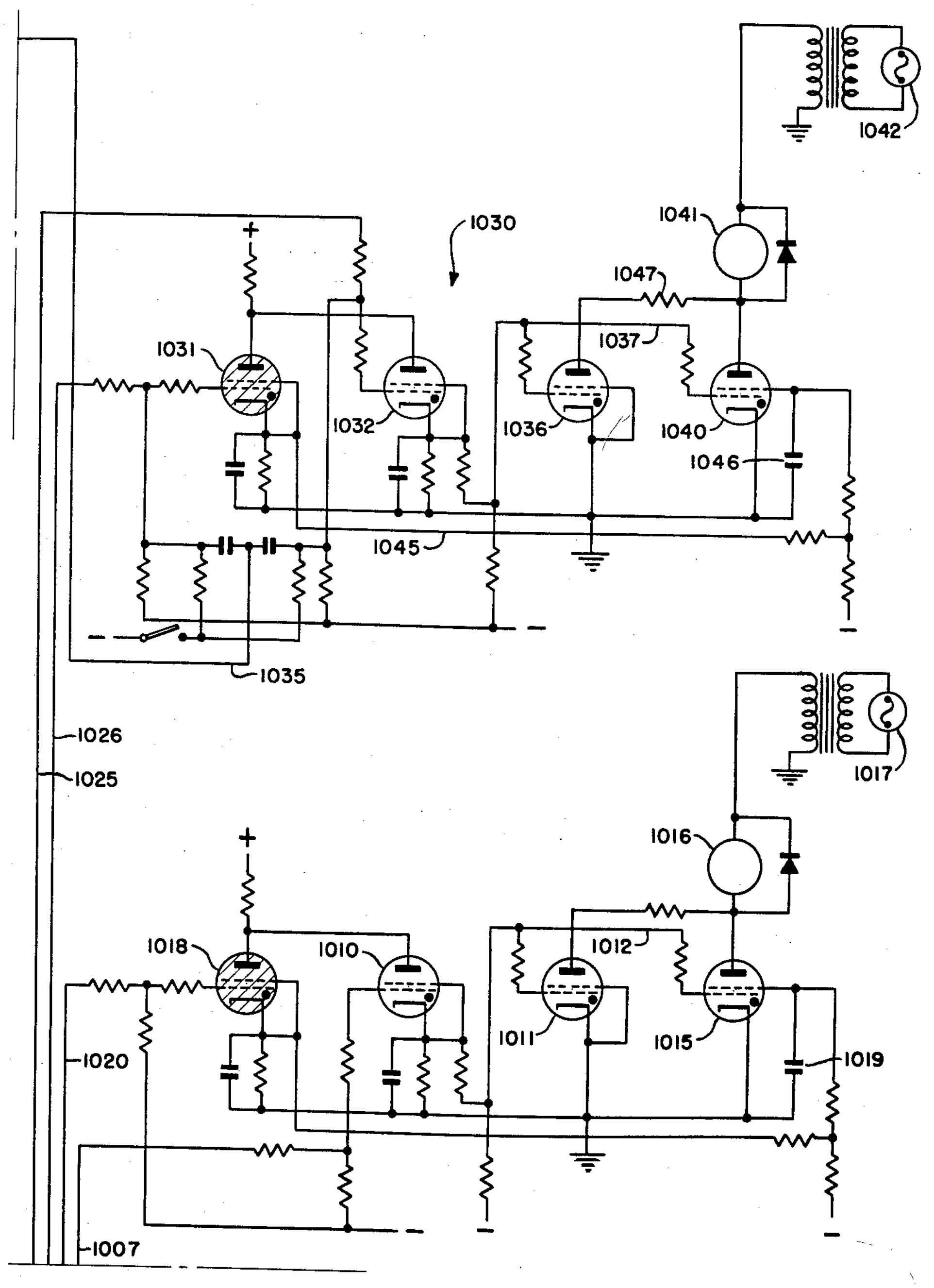
Figure 24:
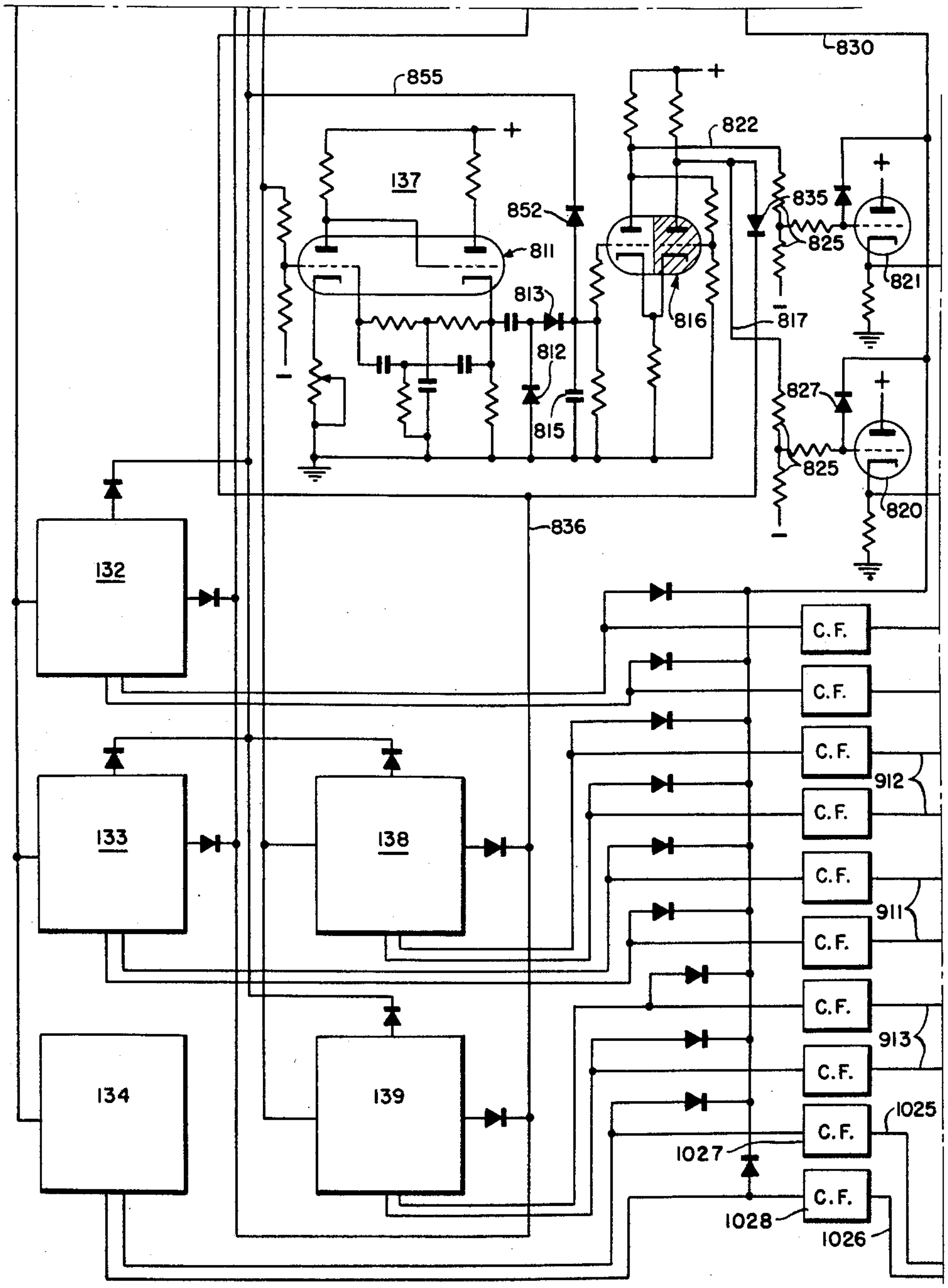

Obviously, the positive potential on the anode of the right-hand side of the delay tube 837 has no effect on the operation of the univibrator 840 at this time. However, the delay tube 837 and its associated circuitry are so designed that after a predetermined time, it will revert to its initial condition as shown in FIG. 18, that is, with the right-hand side conducting. When the right-hand side of the delay tube 837 again conducts, its anode potential drops, and this decreased potential renders the left-hand side of the univibrator 840 nonconductive. The univibrator will execute a single cycle of operation (FIG. 36*c*), and a short, positive pulse will appear on the anode of the left-hand side thereof. Referring to FIG. 36*d*, the relationship of this short, positive pulse with respect to the anode potential of the delay tube 837 and with respect to the original signals appearing at the output of the filters is shown. This positive pulse is applied to the grid of the cathode follower 832 and appears on the cathode thereof, is applied over the lead 830 and renders nonconductive the diode 827 and all similar diodes. When this occurs, the anode potentials of the trigger tube 816 and all similar trigger tubes in the filters 130 to 139, inclusive, will no longer be shunted, but, rather, will be impressed on the grids of the cathode followers and will be applied to the input leads of the 5-to-31 converter 140.

It will be remembered that the input signal to each of the filters such as the filter 137 appeared at the cathode of the right-hand side of the tube 811 and was demodulated by the diodes 812 and 813 and the capacitor 815. Since the discharge time constant of this demodulator may be longer than the typing period, it is necessary to discharge the demodulators at some time after the delay tube 837 has reverted to its initial condition, as shown in FIG. 18. To accomplish the discharge of the demodulators, the positive pulse appearing on the cathode of the cathode follower 832 is applied to the grid of the right-hand side of another delay tube 841. This positive pulse renders the right-hand side of the delay tube 841 conductive, so that a negative pulse appears at the anode thereof (FIG. 36*e*), is applied to a lead 842, is differentiated by a capacitor 845 and a resistor 846 (FIG. 36*f*) and is applied to the grid of a normally-nonconductive tube 847. This initial negative pulse will, of course, have no effect on the already-nonconductive tube 847. However, after a predetermined time, the delay tube 841 reverts to the condition shown in FIG. 18, wherein its right-hand side is nonconductive, and, at this time, a positive pulse appears on the anode of the right-hand side, is differentiated by the capacitor (FIG. 36*f*) and is applied to the grid of the tube 847 to render the tube 847 conductive. As a result, the anode potential of the tube 847 decreases (FIG. 36*g*), and this decreased potential is applied over a lead 850 and to a common lead 851.

The common lead 851 is connected to each of the diodes such as a diode 852 in the circuit associated with the filter 137. The negative pulse appearing on the common lead 851 is applied over a lead 855 to render the diode 852 conductive to discharge the capacitor 815 associated therewith. The wave form shown in FIG. 36*a* is similar to that passing through the diode 813, and the discharge shown at 856 is caused by the short negative pulse (FIG. 36*g*) which renders the diode 852 conductive. In a similar manner, the demodulator circuits associated with all other energized filters are discharged.

Referring again to the manner in which the signal indicative of the upper case "A" character is applied to the input of the 5-to-31 converter 140, when the diode 827 is cut off by the short, positive pulse appearing on the cathode of the cathode follower 832 (FIG. 18), +40 volts are applied to the input lead 826 to the 5-to-31 converter 140. This occurs since the right-hand side of the trigger tube 816 is cut off when the 3000 c.p.s filter 137 was energized. Also, since the left-hand side of the tube 816 is conducting, −20 volts are applied to the associated input lead 824 of the 5-to-31 converter 140. It can be seen, then, that the +40 volts are applied through a resistor 857, to a lead 858 and through diodes 860 and 861 to obtain two signals on leads 862 and 863. As will be described more fully hereinafter a signal on the lead 862 energizes a predetermined one of the flash lamps 188 to 192 inclusive, and a signal on the lead 863 energizes a predetermined one of the shutters 180 to 184, inclusive. The circuits in the 5-to-31 converter 140 can be traced to show that the frequencies representing any given character will energize a corresponding one of the output leads, such as the lead 858, in the 5-to-31 converter 140.

To illustrate further the operation of the 5-to-31 converter 140 it will be noted that there are five pairs of input leads thereto similar to the associated input leads 824 and 826 which are energized by the output of the filter 137. As stated hereinabove the upper lead 824 of the pair has −20 volts applied thereto and the lower lead 826 of the pair has +40 volts impressed thereon. The other four pairs of input leads are energized by outputs from the filters 132, 133, 138 and 139 which are not energized when the upper case "A" is to be reproduced. Consequently all of the upper leads of these four pairs will have +40 volts impressed thereon and all of the lower leads will have −20 volts applied thereto. Interconnected among these input leads and the thirty-one output leads of the converter 140 are a plurality of diodes 864—864. Generally speaking when the upper case "A" is to be reproduced the diodes 864—864 will shunt out all paths for the +40 volts on the lead 826 except the path through the resistor 857 and the diodes 860 and 861.

It will be noted that all odd-numbered resistors such as the resistor 857 in the converter 140 are connected to the lead 826 having +40 volts thereon and that all even-numbered resistors are connected to the −20 volts on the lead 824. Obviously the −20 volts on the lead 824 cannot pass through any diodes similar to the diodes 860 and 861. However the +40 volts on the lead 826 could pass through all diodes connected similarly as the diodes 860 and 861 if a shunt path for the +40 volts did not exist. When the upper case "A" is to be reproduced, no shunt path will exist for the voltage impressed across the resistor 857, but a shunt path through the diodes 864—864 to one of the lower leads (having −20 volts thereon) of the four pairs of input leads to the converter 140, which are immediately below the leads 824 and 826, will exist.

It can be seen, therefore, that, to reproduce the upper case "A," the output lead 858 only of the converter 140 is energized. It will be remembered that a code representing this character was placed on the magnetic tape 70 by the gated oscillator 137 which was energized by a signal on the output lead 231 only of the 31-to-5 converter in the recorder 42. It will also be remembered that the "value" accorded the output lead 231 was "1." Consequently since the output lead 858 of the 5-to-31 converter 140 corresponds to the input lead of the 31-to-5 converter 42 the output lead 858 has the numeral "1" shown adjacent thereto in FIG. 25. In a similar manner each of the thirty-one input leads to the 31-to-5 converter 42 in the recorder has a corresponding output lead in the thirty-one such output leads of the 5-to-31 converter 140 in the printer.

*Zeroing Counters*

When discussing the recorder, it was stated that the last signal placed on the magnetic tape 70 was a re-set pulse. Since the magnetic tape 70 is fed through the printer in a direction opposite to that in which it was moving in the recorder the re-set pulse is the first pulse sensed by the pick-up heads 800 and 801 in the printer. It will be remembered that the reset pulse energizes the recording head 247 in the recorder with 3000, 2000 and 1000 c.p.s. signals. This pulse also energizes the recording head 257 in the recorder with 3000 and 2000 c.p.s. signals. When these signals are sensed by the pick-up heads 800 and 801 the filters 132, 133 and 137 to 139, inclusive, will be energized. Consequently, all five pairs of input leads such as the leads 824 and 826 to the 5-to-31 converter 140 will be energized, and tracing the circuitry therein will show that a signal will appear on an output lead 865 only.

The signal appearing on the output lead 865, indicative of a re-set pulse, is applied to the grid of the left-hand side of a trigger tube 866, rendering this side conductive and the right-hand side nonconductive. The anode potential of the right-hand side will rise, and the increased potential is applied over leads 870, 871 and 872 to a junction point 875. The positive potential on the junction point 875 is impressed through a resistor 876 to the control grid of a "units" thyratron 877, associated with a word space counter 880, to render the "units" tube 877 conductive. Also, the positive potential on the control grid of the "units" tube 877 is applied over a lead 881 and through a diode 882 to the control grid of a "units" thyratron 885 associated with a justification counter 886. Further, the positive potential appearing on the junction point 875 is impressed through a capacitor 887 and to the grid of a triode 890, rendering the triode 890 conductive. When the triode 890 conducts, its anode potential drops, and this decreased potential is applied to a junction point 891 to which are connected three diodes 895, 896 and 897. The negative potential appearing on the junction point 891 will render the diode 895 conductive to impress a negative potential over leads 900 and 901 and to the "0" cathode of the word space counter 880, thereby zeroing this counter. In a similar manner, the diode 897 is rendered conductive, and a negative potential is applied over a lead 902, through a diode 905 and over a lead 906 to the "0" cathode of the justification counter 886, thereby zeroing this counter. Also, when the diode 896 is rendered conductive, a negative potential is applied over a lead 907 to the "0" cathode of a word space add counter 910, thereby zeroing this latter counter.

*Justification Control*

The next items of information sensed by the pick-up heads 800 and 801, after the re-set pulse, are the word space pulses. It will be remembered that each of these pulses included a frequency of 2000 c.p.s. from the oscillator 260 on the recording head 257 and frequencies of 2000 and 1000 c.p.s. from the oscillators 260 and 261, respectively, on the recording head 247. Consequently, the filters 133, 138 and 139 are energized to impress +40 and −20 volt combinations on certain input leads to the 5-to-31 converter 140, which leads are designated by the numerals 911—911, 912—912, and 913—913, respectively. When these input leads are energized, a series of pulses, equal in number to the number of word spaces in a given line and appearing on the magnetic tape 70, is applied to an output lead 915 of the 5-to-31 converter 140. These pulses are applied to the grid of a driver tube 916 associated with the word space counter 880. The driving circuit for this counter is similar to that described for the counter shown in FIG. 35, and each positive pulse appearing on the grid of the driver tube 916 will drive the word space counter 880 up one count. Assume, for example, that five pulses are applied to the lead 915 to represent five word spaces that appeared in a line to be reproduced. These five pulses will drive the word space counter up until the "5" cathode thereof is conducting.

The next items of information sensed by the pick-up heads 800 and 801 are pulses representing the number of justification units remaining in the line to be reproduced. These pulses energize the filters 132, 133, 138 and 139 to cause a signal to be applied on an output lead 917 of the 5-to-31 converter 140. The signal appearing on the output lead 917 will be a number of pulses equal to the number of units remaining in the line to be reproduced. These pulses are applied to the grid of a driver tube 920 associated with the justification counter 886, to drive this counter up one count for each pulse. In the case of the justification counter 886, however, each time the count is registered on this counter which is equal to the count registered on the word space counter 880, the justification counter 886 is zeroed, and the word space add counter 910 is driven up one count. The effect of such zeroing is to divide the number of justification units remaining in a line by the number of word spaces in such line and to register the result of each dividing on the word space add counter 910. Obviously, this is a result which is desired to provide a perfectly-justified line.

As an illustrative example, assume that five word spaces appear in a line to be reproduced. The minimum number of units in these word spaces is determined by the setting of the word space width selector switch 491 in the recorder. If there were no units left over in the line, each word space reproduced by the printer would be this minimum number of units. If, however, a certain number of units were remaining in the line to be reproduced, these remaining units must be divided among the various word spaces to justify the line properly. Should the dividing of the number of justification units by the number of word spaces result in an integral number, each word space in the reproduced line would be the sum of the original number of units of minimum word space, as selected by the word space width selector switch 491, and the number of units resulting from the division. Obviously, this situation does not occur too often. The more common situation results in an uneven number when the number of justification units is divided by the number of word spaces. In this latter case, one of the number of units remaining after the division is applied to a predetermined number of word spaces until such number is exhausted.

Assume, for example, that five word spaces exist in a line to be reproduced and that twenty-seven units remain in the line to be justified. In this case, the result of dividing the number of justification units by the number of word spaces is five with two units remaining. Therefore, if it is assumed that each word space which was selected by the word space width selector switch 491 is five units, the first and second word spaces in the reproduced line will be eleven units and the remaining three word spaces will be ten units each. It can be seen, then, that the total number of units of word spaces will be fifty-two units (11+11+10+10+10), and this number results from adding twenty-seven units remaining to the original twenty-five units of minimum word space chosen (five word spaces of five units each).

To illustrate the circuitry to obtain this result, assume that pulses representing five word spaces were applied over the lead 915 to cause a count of five to be registered on the word space counter 880, in the manner deescribed hereinabove. Assume further that a signal representing twenty-seven units of justification is applied to the lead 917 and to the justification counter driver tube 920. As described hereinabove, these pulses will cause the justification counter 886 to be driven in a counter-clockwise direction. Since the justification counter 886 had been zeroed, after five such pulses are received, the "5" cathode of the justification counter will be conducting. At this time, a pulse is impressed on a lead 921 at the output of a coincidence circuit 922 to cause again the zeroing of the justification counter 886.

The operation of the coincidence circuit 922 will be illustrated by utilizing the conditions assumed above, that is, that five word spaces are registered on the word space counter 880 and that the justification counter 886 is driven from zero to five. Under these conditions, the "units" tube 877 associated with the word space counter 880 and the "units" tube 885 associated with the justification counter 886 will be conducting. With the "units" tube 885 conducting, a positive potential appearing on the cathode thereof will be impressed over a lead 925, through a resistor 926, over a lead 927 and through a junction point 930 and a diode 931 to the output lead 921. This path will exist only if counts of five are registered on the word space counter 880 and the justification counter 886, that is, when the "5" cathodes of these counters are conducting. If they are not, one or more paths will exist to shunt the positive potential on the cathode of the "units" tube 885 so that it cannot be applied to the output lead 921. For example, when the "5" cathode of the word space counter 880 is conducting, a positive potential is developed thereon and applied over a lead 932 to render a diode 935 nonconductive. With the diode 935 nonconducting, a shunt for the potential on the junction point 930 is prevented from existing.

Also, as stated above, when the "5" cathode of the word space counter 880 is conducting, the "units" tube 877 associated therewith is also conducting. Consequently, a positive potential appears on the cathode thereof and is applied over a lead 936 and to a diode 937 to render such diode nonconductive. This action precludes the existence of a second shunt path for the positive potential on the junction point 930. If the "units" tube 877 were not conducting, its cathode would be at some low value which would permit the diode 937 to conduct and to shunt the positive potential at the junction point 930 to ground. Finally, when the "5" cathode of the justification counter 886 conducts, a diode 940 is rendered nonconductive to prevent the existence of a third possible shunt path for the positive potential on the junction point 930. When any other cathode of the justification counter 886 is conducting, the potential on the "5" cathode of the justification counter 886 is at a negative value so that the diode 940 conducts to shunt the positive potential on the junction point 930 therethrough. To recapitulate, a path for the positive potential on the cathode of the "units" tube 885 to the output lead 921 exists only when the counts registered on the word space counter 880 and on the justification counter 886 are equal. If they are not, no output signal is obtained on the output lead 921 of the coincidence circuit 922. The same operation as above can be traced when the counters have registered thereon counts greater than ten. At this time, "teens" tubes 941 and 942 are conducting so that their cathodes are at elevated potentials.

Assuming that five word spaces are registered on the word space counter 880 and that the justification counter 886 has been driven to a count of five, a pulse appears on the output lead 921 of the coincidence circuit 922. This output pulse renders the left-hand side of a tube 945 conductive so that the right-hand side thereof is rendered nonconductive. When the right-hand side ceases to conduct, its anode potential increases, and this increase in potential is impressed over a lead 946, through a capacitor 947 and to the grid of a triode 950. A negative pulse is developed on the anode thereof and is applied over a lead 951, through the diode 905 and over the lead 906 to the "0" cathode of the justification counter 886. This negative pulse on the "0" cathode of this counter causes the "0" cathode thereof to conduct and the counter to be zeroed. It can be seen that if twenty-seven pulses drive the justification counter 886 up, this counter will be zeroed five times, and, when such pulses cease, a count of two will remain on the justification counter 886, that is, the "2" cathode thereof will be conducting.

Before describing the importance of this, however, it will first be noted that each time the "1" cathode of the justification counter 886 is rendered conductive, a positive potential is impressed on a lead 952 and renders a diode 955 nonconductive. As a result, the positive potential on the cathode of the "units" tube 885 is impressed over a lead 956, through a resistor 957 and over a lead 960 to the grid of a driving tube 961 associated with the word space add counter 910. This counter, like the word space counter 507 in the recorder, can be driven in either of two directions. For the present purposes, it is only necessary to state that positive pulses on the grid of the driver 961 will cause the word space add counter 910 to be driven in a clockwise direction, and positive pulses applied to the grid of a second driver tube 962 will cause the word space add counter to be driven in a counter-clockwise direction. Consequently, each time the "1" cathode of the justification counter 886 conducts, the positive pulse on the lead 960 drives the word space add counter 910 in a clockwise direction to increase the count registered thereon.

In the present example, since the justification counter 886 is zeroed five times and ceases counting when the "2" cathode thereof is conducting, the "1" cathode of the justification counter 886 has conducted six times to produce six pulses on the lead 960 and to cause a count of six to be registered on the word space add counter 910. Consequently, the "6" cathode of the word space add counter 910 will be maintained conductive to register a count of six thereon. Thereafter, as will be described more fully herein below, the first word space to be reproduced will have a width equal to the minimum value chosen by the word space width selector switch 491 in the recorder, plus the six units registered on the word space add counter 910. Also, a positive pulse representing this first word space, appearing on an output lead 965 of the 5-to-31 converter 140, in a similar manner as described hereinabove for other pulses, is applied through a diode 966 and to the grid of the right-hand side of a tube 967 to render this side conductive. The anode potential of the right-hand side of the tube 967 decreases, and this decreased potential is passed over a lead 970 and to the grid of a driver tube 971 associated with the justification counter 886. The driver tube 971 is connected to the justification counter 886 oppositely as the driver tube 920, and it drives the justification counter in a clockwise or downward direction on positive pulses only. Consequently, the first word space received by the printer renders the "2" cathode of the justification counter non-conductive and the "1" cathode thereof conductive.

In a similar manner, the second word space received by the printer causes the justification counter 886 to be driven down one more count so that the "0" cathode thereof is rendered conductive. Since the "6" cathode of the word space add counter is still conducting at this time, six units will be added to the width of the second word space. When, however, the "0" cathode of the justification counter 886 conducts, a positive potential is developed thereon and is impressed through a diode 972 and over leads 975 and 976 to a diode 977 to render this latter diode nonconductive. As a consequence, the positive potential on the cathode of the "units" tube 885 is impressed over the lead 925 and through a resistor 980 to a junction point 981. Since the diode 977 is now cut off, this positive potential is applied over a lead 982 and to the grid of the right-hand side of a tube 985 to render this side conductive. The left-hand side thereof is rendered nonconductive, and its increased anode potential is applied over a lead 986 and to the grid of the driver tube 962, which, as described previously, will drive the word space add counter in a counter-clockwise direction. Therefore, this pulse causes the glow to switch from the "6" cathode to the "5" cathode of the word space add counter 910 so that this latter cathode is rendered conductive. Consequently, the remaining three word spaces in the line to be reproduced will each have a width increased by only five units. It can be seen that, in the assumed line to be justified wherein there were five word spaces and twenty-seven units of justification remaining, the widths of the first two word spaces were increased by six units (when the word space add counter 910 registered a count of six) and the widths of the last three word spaces were increased by only five units (when the counter 910 registered a count of five). The sum of these increased widths (6+6+5+5+5) equals the twenty-seven units of justification remaining in the line.

Figure 28:
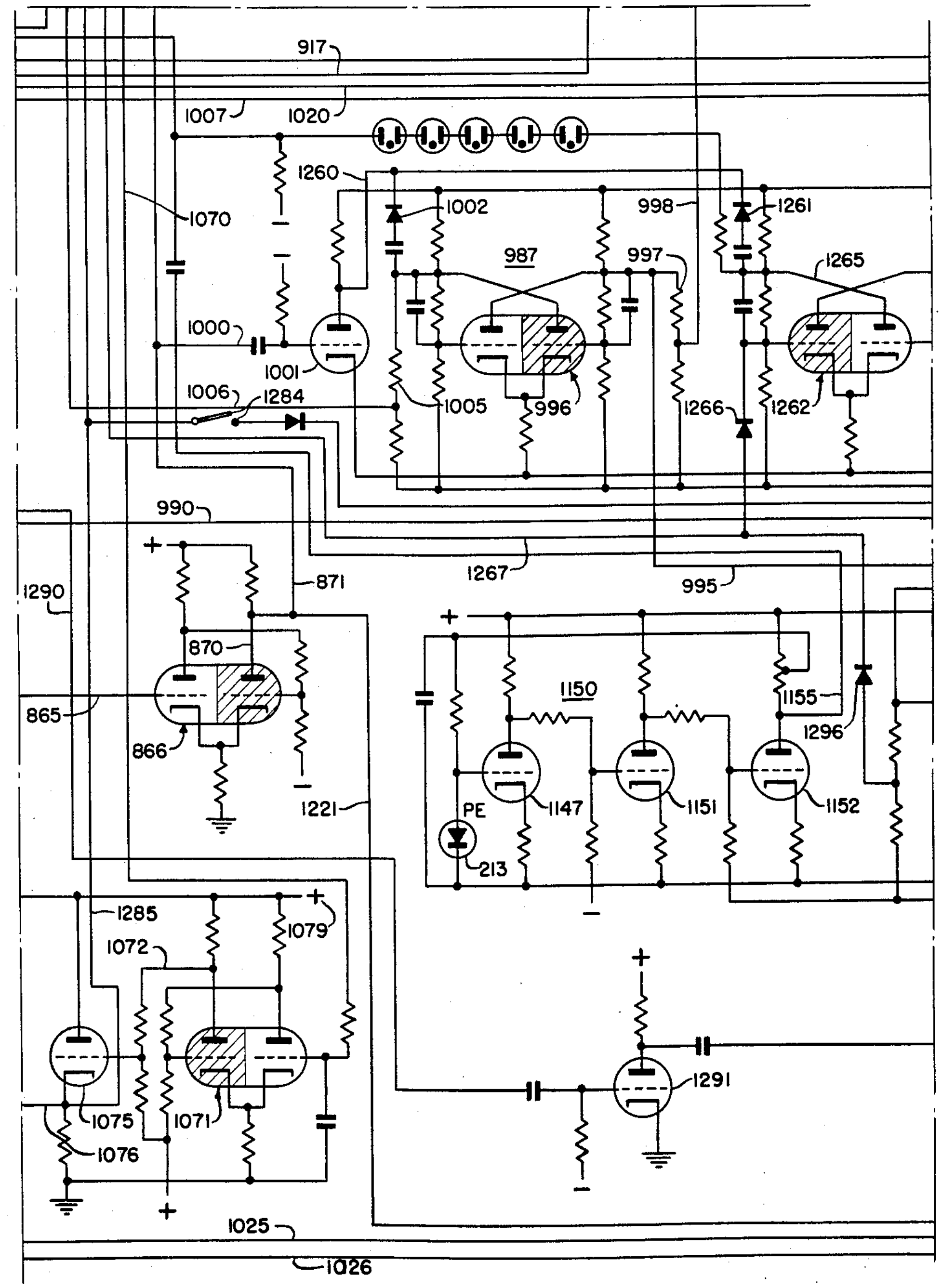

As described hereinabove, during the justification cycle, each time the "1" cathode of the justification counter 886 conducts, the word space add counter 910 was driven up one count. Thereafter, it was described how the justification counter is driven from the count of two, where it remained after the justification units were registered therein, to the count of zero. As the justification counter 886 passes a count of one and the "1" cathode thereof conducts, it is obviously necessary to prevent the word space add counter 910 from being driven up one count. This is accomplished by a justification period control circuit 987 (FIG. 28). Each time a carriage return pulse is sensed by the printer, a pulse indicative thereof appears on an output lead 990 of the 5-to-31 converter 140 and is impressed on the grid of an inverter tube 991. A negative pulse is developed on the anode of the inverter tube 991 and is impressed through a diode 992 and over a lead 995 to the grid of the right-hand side of a control tube 996 in the justification period control circuit 987. This negative pulse causes the normally-nonconducting, left-hand side of the tube 996 to conduct. The negative potential on the anode thereof is impressed through a resistor 997 and over a lead 998 and the lead 960 to the grid of the driver tube 961 to prevent conduction of this tube when pulsed during the printing cycle. Consequently, as the "1" cathode of the justification counter 886 conducts, the positive potential which is applied from the cathode of the "units" tube 885 and over the lead 960 is ineffective to render the driver tube 961 conductive, so that the word space add counter 910 cannot be driven up one count when the "1" cathode of the justification counter 886 is conducting during the time that any remainder thereon is being dispensed with during the printing cycle.

It was also described hereinabove that when the "0" cathode of the justification counter 886 and the units tube 885 associated therewith conduct during the printing cycle, the word space add counter 910 is driven down one count. However, since the justification counter 886 is zeroed each time coincidence is sensed with the word space counter 880 by the coincidence circuit 922, it is necessary to prevent this zero condition from driving the word space add counter 910 down one count. To prevent this, each time a re-set pulse is received over the lead 865, as described hereinabove, a positive pulse it is applied over the lead 871 and a lead 1000 to the grid of an inverter tube 1001 in the justification period control circuit 987. A negative pulse is developed on the anode of the inverter tube 1001 and is applied through a diode 1002 and to the grid of the left-hand side of the control tube 996, rendering this conducting side nonconductive. Consequently, the right-hand side of the control tube 996 is rendered conductive, its anode potential drops, and this decreased potential is applied through a resistor 1005 and over a lead 1006 to the grid of the driver tube 962. This negative potential prevents any positive pulse from the zero sense circuit of the justification counter 886 over the lead 986 from rendering the driver tube 962 conductive. This prevents the driving down of the word space add counter 910 during the justification computation period.

*Printing of Character*

In describing the printing of a character, it will be assumed that signals representing the upper case "A" are sensed by the pick-up heads 800 and 801. When discussing the recorder, it was stated that when the upper case switch 275 was closed, a signal indicative of the upper case position was placed on the magnetic tape 70 by outputs from the 3000 c.p.s. oscillator 237 and the 1000 c.p.s. oscillator 261 being applied to the recording head 247 and the 2000 c.p.s. output from the oscillator 260 being applied to the recording head 257. Also, if a lower case character has been chosen, 3000 c.p.s. and 2000 c.p.s. signals would energize the recording head 257 and a 1000 c.p.s. signal would energize the recording head 247. These signals are passed by the associated ones of the filters 130 to 139, inclusive, in the printer and are utilized to position the type font 177 in a horizontal direction. However, since the magnetic tape 70 is moving in the printer in a direction opposite to that in which it moved in the recorder, an upper case signal must position the type font 177 in its lower case position, and a lower case signal must position the type font in its upper case position. This can be seen by referring to FIG. 37, wherein an upper case signal is first placed on the magnetic tape 70 prior to the placing thereon of the upper case "Q." Thereafter, a lower case "u" was to be placed on the magnetic tape. Consequently, prior to placing this latter character on the magnetic tape 70, the lower case signal was placed thereon. It is obvious that when the magnetic tape 70 moves in an opposite direction in the printer, the lower case signal will be sensed prior to the desired reproduction of the upper case "Q." For this reason, this lower case signal must position the type font 177 in its upper case position.

Under these conditions, when the signal is received by virtue of the recorder's being put in the lower case position, the filters 132, 133 and 139 are energized to energize certain of the input leads of the 5-to-31 converter 140. By tracing the circuitry within the 5-to-31 converter 140, as described heerinabove, it will be seen that a signal is derived at an output lead 1007 thereof and is impressed on the grid of a tube 1010 to render this tube conductive. When the tube 1010 is rendered conductive, its cathode potential increases, and this increase in potential is impressed on the grid of a tube 1011, and, over a lead 1012, to the grid of a tube 1015. The tubes 1011 and 1015 are rendered conductive to complete an initial energizing circuit for a solenoid 1016 from an A.C. source 1017 through the conducting tubes. When the solenoid 1016 is energized, the type font 177 is moved from its normal position to the left (as viewed in FIG. 33) to place the upper case "A" in print position.

Also, prior to the receipt of the upper case signal over the lead 1007, a tube 1018 was conducting, and this tube is extinguished when the tube 1010 is rendered conductive. While the tube 1018 is conducting, its positive cathode potential maintains a charge on a capacitor 1019 in the screen grid circuit of the tube 1015. Consequently, this charge dissipates a predetermined time after the tube 1015 is rendered conductive and eventually renders the tube 1015 nonconductive. Thereafter, an energizing circuit of decreased energizing current remains for the solenoid 1016 through the still-conducting tube 1011. When a subsequent character of the lower case is received, a signal appears on an output lead 1020 of the 5-to-31 converter 140 and is impressed on the grid of the tube 1018, thereby rendering this tube conductive. Conductance of the tube 1018 and the attendant decrease of its anode potential render the tube 1010 nonconductive, which causes the tubes 1011 and 1015 to be rendered nonconductive. When these latter two tubes are cut off, the solenoid 1016 is de-energized to return the type font 177 to its normal, lower case position.

Also, when describing the recorder hereinabove, it was stated that the type font 177 is moved vertically depending upon whether a common or an uncommon character was to be reproduced. It was stated that the oscillator 261, having a frequency of 1000 c.p.s., energizes the recording head 257 as soon as an uncommon character is chosen and maintains such energization as long as succeeding uncommon characters are chosen. Consequently, any uncommon character causes a 1000 c.p.s. signal to be applied continuously on the recording head 257 by the oscillator 261 as long as uncommon characters are being chosen. This 1000 c.p.s. signal is sensed by the pick-up head 801 and passed by the filter 134 to apply a continuous positive potential on a lead 1025 and —20 volts on a lead 1026 in a manner similar to the outputs of the filter 137, described hereinabove. These voltages are applied through cathode followers 1027 and 1028 and to a split-shift control circuit 1030. The —20 volts on the lead 1026 are applied to the grid of a normally-conducting thyratron 1031 and have no effect on its conduction. The positive potential on the lead 1025, however, is applied to the control grid of a thyratron 1032 and conditions this thyratron for conduction. Thereafter, when the brake 286 is set, it will be shown herein below that a positive potential is applied to a lead 1035 and to the control grid of the conditioned thyratron 1032, rendering the thyratron 1032 conductive. The positive potential then on the cathode of the thyratron 1032 is impressed on the grid of a thyratron 1036, and, over a lead 1037, on the grid of a thyratron 1040. When the thyratron 1040 conducts, a split-shift solenoid 1041, in the anode circuit thereof, is energized since a circuit is completed from an A.C. source 1042 through the thyratron 1040.

When the thyratron 1032 was rendered conductive, the decreased anode potential thereof extinguished the normally-conducting thyratron 1031. While the thyratron 1031 was conducting, the positive potential on the cathode thereof was impressed over a lead 1045 and to a capacitor 1046 to maintain a charge on the capacitor. Then, when the thyratron 1031 is extinguished and the thyratrons 1036 and 1040 rendered conductive, the charge on the capacitor 1046 dissipates so that the screen grid potential of the thyratron 1040 drops, rendering the thyratron 1040 nonconductive after a predetermined time, dictated by the values of the capacitor 1046 and the various resistors in the circuit. When the thyratron 1040 cuts off, an energizing circuit for the split-shift solenoid 1041 continues through a resistor 1047 and the thyratron 1036. A decreased current will flow through this latter energizing circuit, but it will be sufficient to maintain energization of the split-shift solenoid 1041 until the signals on the leads 1025 and 1026 are reversed upon receipt of a common character. At this time, a positive potential on the lead 1026 renders the tube 1031 conductive and the tubes 1032, 1036 and 1040 nonconductive to de-energize the split-shift solenoid 1041 and place the font 177 in the common position.

Figure 25:
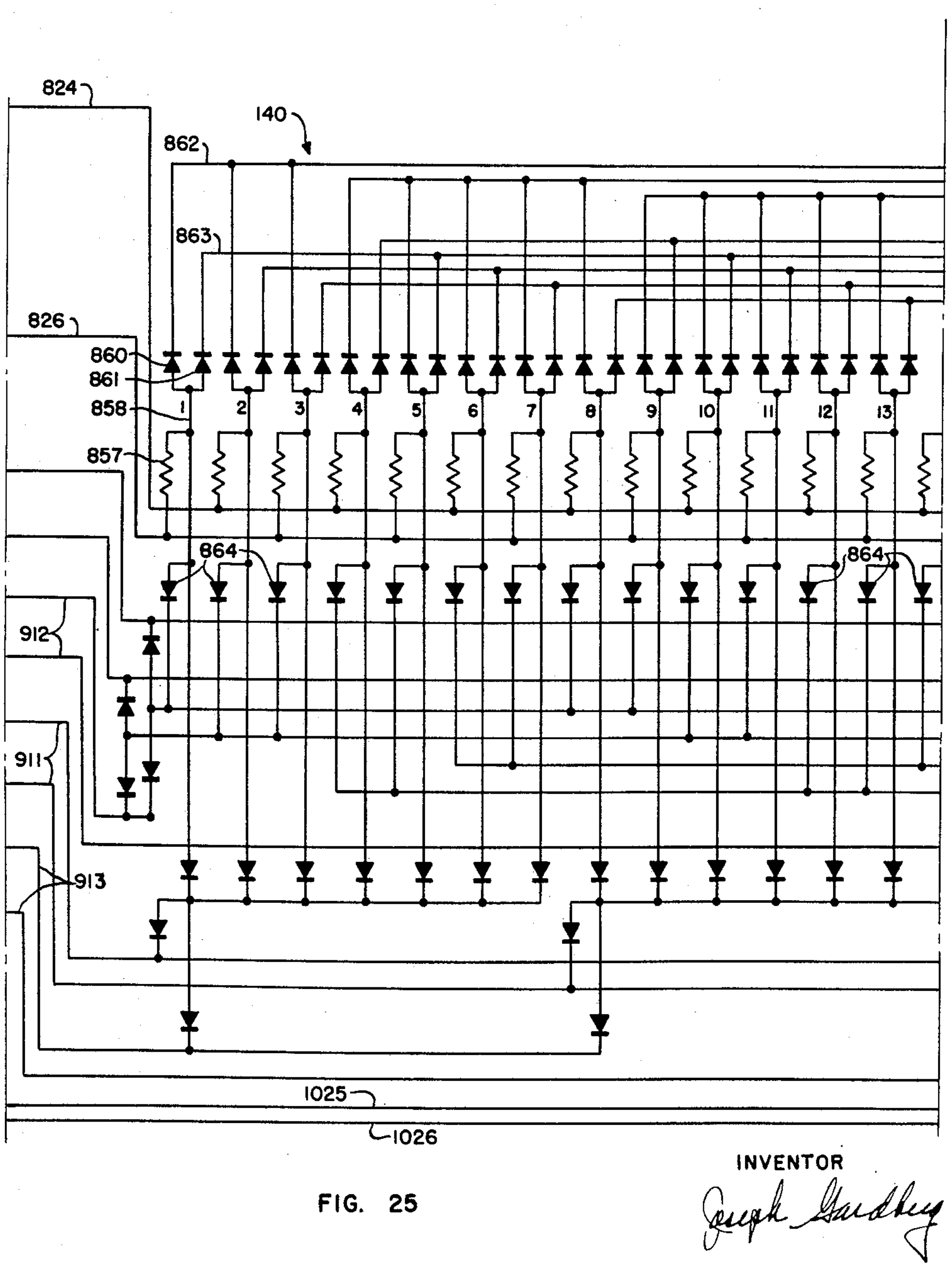
Figure 26:
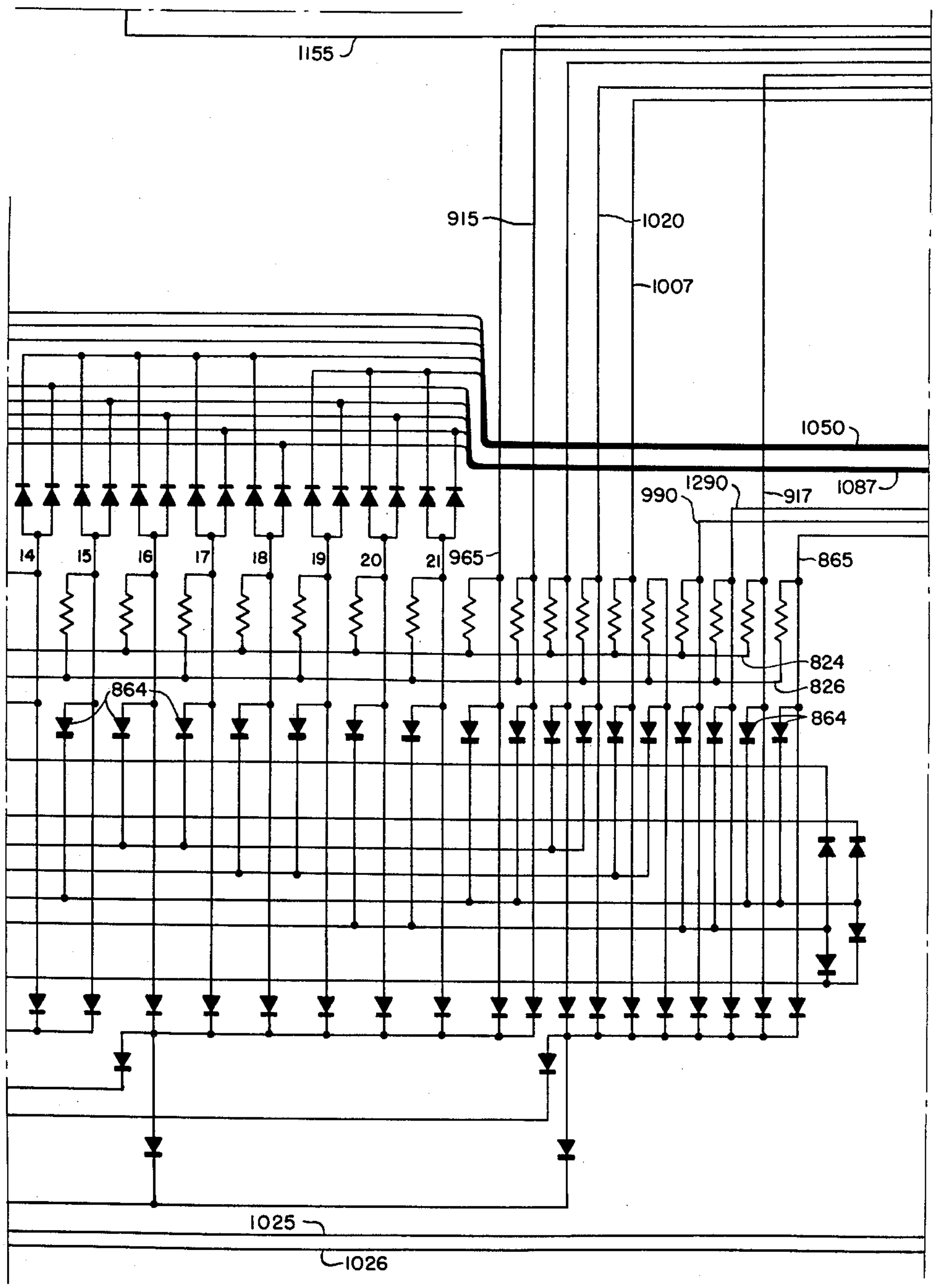
Figure 27:
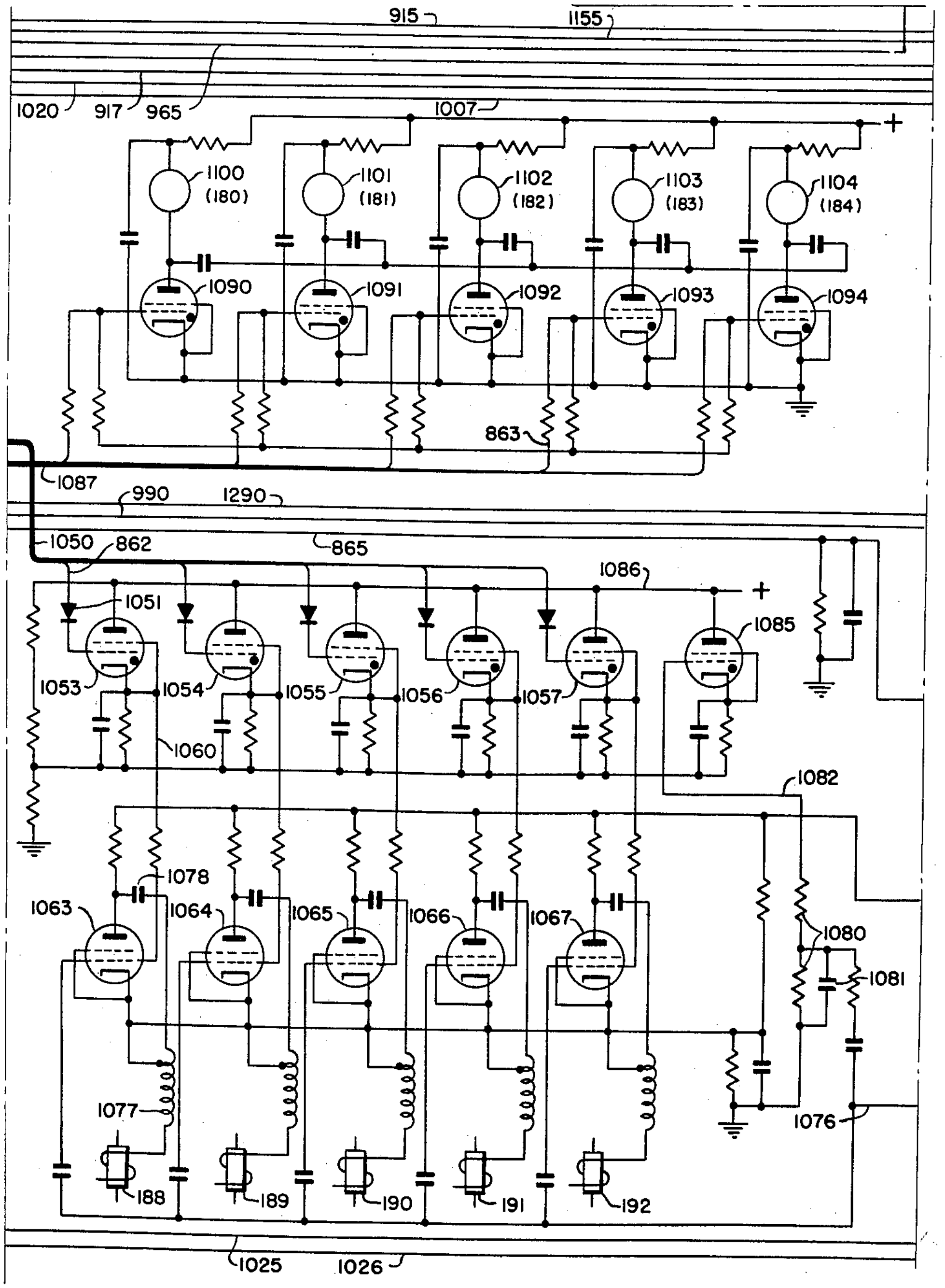

When describing the recorder, it was shown that when the upper case "A" is chosen, a 3000 c.p.s. signal and a 5000 c.p.s. signal from the oscillators 237 and 271, respectively, energize the recording head 247 and a 4000 c.p.s. signal from the oscillator 272 energizes the recording head 257. Referring to the chart hereinabove, the 3000 c.p.s. signal from the oscillator 237 on the lead 247 will be passed by the filter 137. This signal will serve to energize the correct one of the flash lamps 188 to 192, inclusive, and to actuate the correct one of the shutters 180 to 184, inclusive. Referring to FIG. 25, when the 3000 c.p.s. signal is passed through the filter 137, input leads 824 and 826 of the 5-to-31 converter 140 are energized. As described hereinabove, such energization includes +40 volts on the lead 826 and —20 volts on the lead 824. The +40 volts on the lead 826 is impressed through the resistor 857 and on the lead 858 to render the two diodes 860 and 861 conductive.

Referring first to the flash lamp circuit, when the diode 860 is rendered conductive, a positive potential is applied to the lead 862, to a cable 1050 in which the lead 862 is located and through a diode 1051 to the grid of a flash storage tube 1053 which is one of five such tubes 1053 to 1057, inclusive. This positive pulse renders the tube 1053 conductive so that its cathode potential increases, and this increase in potential is applied over a lead 1060 to the control grid of a flash control tube 1063, thereby conditioning the tube 1063 for conduction. The flash control tube 1063 and four other such tubes 1064 to 1067, inclusive, are associated with the flash lamps 188 to 192, inclusive and respectively. Thereafter, as will be described more fully hereinafter, when the brake 286 controlling the rotation of the drum 170 is energized, a positive potential is applied over a lead 1070 (FIGS. 21 and 28), and to the grid of the right-hand side of the delay tube 1071, rendering this side of the delay tube conductive. This causes the normally-conductive left-hand side of the tube 1071 to be rendered nonconductive so that its anode potential increases, and this increase in potential is impressed on a lead 1072 and to the grid of a cathode follower 1075, rendering this tube conductive. The positive potential appearing on the cathode of the cathode follower 1075 is impressed on a lead 1076 and on the grids of the flash control tubes 1063 to 1067, inclusive. Since only the flash control tube 1063 had been conditioned for conduction, this positive potential will render the tube 1063 conductive and energize a coil 1077 associated with the flash lamp 188, thereby energizing this lamp. Since none of the tubes 1064 to 1067, inclusive, had been conditioned for conduction, the lamps 189 to 192, inclusive, will not be energized. Prior to the tube 1063 being rendered conductive, a capacitor 1078 had been charged by a source 1079. When the tube 1063 conducts, the capacitor 1078 discharges, the anode potential of the tube 1063 drops below that of the cathode thereof, and the tube 1063 is extinguished.

The positive potential appearing on the cathode of the cathode follower 1075 is also applied through a resistor-capacitor combination including the resistors 1080—1080 and the capacitor 1081, wherein this pulse is delayed for a predetermined time, and is applied to a lead 1082. Consequently, a predetermined time after the flash lamp 188 is energized, a positive potential is applied to the lead 1082 and the control grid of a restoring tube 1085, to render this latter tube conductive. When the restoring tube 1085 conducts, its anode potential drops, and this decreased potential is impressed on a common lead 1086 to which are connected the anodes of the flash storage tubes 1053 to 1057, inclusive, thereby extinguishing the tube 1053, the only conducting one of this group.

With respect to the actuation of the correct one of the shutters 180 to 184, inclusive, the positive potential appearing on the output lead 858 of the 5-to-31 converter 140 is impressed through the diode 861 and on the lead 863. The lead 863 is connected through a cable 1087 to the grid of a shutter control tube 1093, one of a group of such tubes 1090 to 1094, inclusive. Solenoids 1100 to 1104, inclusive, are connected in the anode circuits of these tubes and are energized when the associated control tube is rendered conductive. Further, the solenoids 1100 to 1104, inclusive, are connected to the shutters 180 to 184, inclusive and respectively, and open the associated shutter when energized. Consequently, the positive pulse on the lead 863 is impressed on the control grid of the shutter control tube 1093 to render this tube conductive.

When the tube 1093 conducts, the solenoid 1103 in the anode circuit thereof is energized to open the shutter 183. Referring now to FIG. 33, and keeping in mind that the type font 177 is in its upper case and its common positions, that the shutter 183 was opened and that the flash lamp 188 was energized, it can be seen that the upper case "A" is located at the intersection of the opened shutter 183 and the energized flash lamp 188 and is directly in line with one of the smaller lenses 175—175. Such positioning and actuation of the proper shutter and flash lamp, causes the upper case "A" to be reproduced on the sensitized sheet 171 on the drum 170.

The predetermined set width of the upper case "A" is utilized to rotate the drum 170 the correct amount for such set width. To accomplish the proper rotation of the drum 170, the 5000 c.p.s. and the 4000 c.p.s. signals placed on the magnetic tape 70 by the oscillators 271 and 272 being energized are utilized. More specifically, it was stated hereinabove that when the upper case "A" was chosen, a 3000 c.p.s. signal from the oscillator 237 energized the recording head 247, a 5000 c.p.s. signal from the oscillator 271 energized this same recording head 247 and a 4000 c.p.s. signal from the oscillator 272 energized the recording head 257. It was shown that the 3000 c.p.s. signal placed on the magnetic tape 70 by the recording head 247 opened the proper shutter and energized the proper flash lamp. The remaining two signals, that is, the 5000 c.p.s. signal from the oscillator 271 on the recording head 247 and the 4000 c.p.s. signal from the oscillator 272 on the recording head 257 serve to rotate the drum 170 the proper amount to position the upper case "A" correctly. In the assumed example, the set width of the upper case "A" was 12 units. Therefore, the drum 170 must be rotated the distance corresponding to this particular set width.

Reference to the chart hereinabove will show that a 5000 c.p.s. signal from the oscillator 271 on the recording head 247 is sensed by the pick-up head 800 and energizes the filter 135. Also, the 4000 c.p.s. signal from the oscillator 272 on the recording head 257 will be sensed by the pick-up head 801 and will energize the filter 131. Therefore, outputs of these filters are applied to input leads 1106—1106 and 1107—1107, respectively, of the 4-to-15 converter 165 (FIG. 18). This converter operates in the same manner described hereinabove with reference to the 5-to-31 converter 140, and energization of the input leads 1106—1106 and 1107—1107 will place +40 volts on the upper and −20 volts on the lower of these pairs of leads to cause a signal to appear on an output lead 1110 of the 4-to-15 converter 165. This signal causes two things to happen. First, it is applied over a cable 1111 to the control grid of the left-hand side of a tube 1112 to render this side conductive. When the left-hand side of the tube 1112 conducts, the anode potential thereof drops, and this decreased potential is passed over a lead 1115 to the "2" cathode of a set width counter 1116, causing the glow thereof to switch to this cathode, that is, causing this cathode to conduct. Also, the positive potential on the lead 1110 is impressed through a diode 1117 and to the control grid of the left-hand side of a tube 1120, rendering this side conductive. The anode potential of the left-hand side of the tube 1120 will drop, and this decreased potential is applied over a lead 1121 and to the cathode of a "teens" tube 1122 associated with the set width counter 1116, rendering the "teens" tube 1122 conductive. Conduction of the "teens" tube 1122 and the "2" cathode of the set width counter 1116 registers a count of twelve in the set width counter, and, as described previously, this is the exact amount of set width of the upper case "A."

Prior to the registering of a count of twelve on the set width counter, the "0" cathode of this counter had been conducting, and a "units" tube 1125 associated with this counter had been conducting. When the "0" cathode of the set width counter 1116 is conducting, a positive potential is applied to leads 1126 and 1127 and to a diode 1130, thereby rendering this diode nonconductive. Since the diode 1130 is rendered nonconductive, the positive potential appearing on the cathode of the conducting "units" tube is impressed over a lead 1131 and to a junction point 1132, placing this junction point at a positive potential. The positive potential on the junction point 1132 renders a diode 1135 conductive to impress a positive potential on a lead 1136 and on the control grid of a triode 1137, maintaining the triode 1137 normally conductive. When the triode 1137 conducts, its cathode potential is at some relatively-high value which is impressed on the control grid of the left-hand side of a tube 1140 to maintain this side of the tube 1140 normally conductive. Consequently, the right-hand side of the tube 1140 is held normally nonconductive so that its anode potential is at some high value which is applied over a lead 1141 and to the control grid of a tube 1142, thereby rendering the tube 1142 normally conductive. A brake solenoid 1145, associated with the brake 206 for controlling the rotation of the drum 170, is connected in the anode circuit of the tube 1142, and when this tube is rendered conductive, the brake solenoid 1145 is energized to set the brake and prevent rotation of the drum 170.

It can be seen from the above discussion that a positive potential appearing on the junction point 1132 will maintain the brake 206 in its set condition, preventing movement of the drum 170. This positive potential had been applied to the junction point 1132 by the conductance of the "0" cathode of the set width counter 1116. Then, when signals representing a character or a function are received by the printer, its set width is registered by the set width counter 1116. More specifically, referring again to the illustrative example of the upper case "A," a count of twelve was registered on the set width counter 1116 when signals indicative of this character were received by the printer. As stated above, the "2" cathode of the set width counter 1116 and the "teens" tube 1122 associated with this counter are thereby rendered conductive. Since the "0" cathode of the set width counter is no longer conducting, the positive potential that appeared on this cathode no longer exists, and the diode 1130 is rendered conductive to prevent the positive potential from being applied to the junction point 1132. As a result, the triode 1137 and the left-hand side of the tube 1140 are rendered nonconductive, and the right-hand side of the tube 1140 is rendered conductive. When the right-hand side of the tube 1140 conducts, its anode potential drops, and this decreased potential is applied to the control grid of the tube 1142 to render this tube nonconductive. When the tube 1142 is rendered nonconductive, the brake solenoid 1145 is de-energized, and the brake is released so that the motor 207 associated therewith rotates the drum 170.

Referring to FIG. 32, as the drum 170 rotates, the disk 210 rotates therewith. As stated hereinabove, when the block diagram of the printer as shown in FIG. 2 was described, the disk 210 has a plurality of translucent windows 212—212 spaced radially therearound. The distances apart that these windows are located depends upon the shape of the type to be reproduced. Relatively-narrow type would require that the windows 212—212 be spaced closely as compared to the spacing required of wider type. In any event, the construction of the disk 210 is determined beforehand, the disk is merely secured to the drum 170 with the windows 212—212 placed adjacent to the photocell 213, and a source of light (not shown) is positioned so that it can pass through the windows 212—212. Obviously, in lieu of the single row of windows 212—212, a plurality of windows can be formed at different radii of the disk 210 to accommodate various sizes of type. In this case, some means for moving the photocell 213 along the radius of the disk 210 would be necessary. As the drum 170 rotates, and the disk 210 rotates therewith, each window 212 on the disk causes the energization of the photocell 213 (FIGS. 28 and 32) to apply a positive potential on the control grid of a first amplifier tube 1147 in an escapement pick-up amplifier 1150. Consequently, a series of pulses is amplified by the tube 1147 and by tubes 1151 and 1152. These pulses are impressed on an output lead 1155 of the amplifier 1150 and are applied to the grid of a set width driver tube 1156. The driver tube 1156 operates in a manner similar to the driver tube 395 in FIG. 35 and serves to reduce the count registered on the set width counter 1116. Consequently, a series of twelve such pulses will reduce the count on the set width counter from twelve to zero.

As stated above, when a signal appeared on the lead 1110, at the input of the set width counter 1116, due to the selection of the upper case "A," the "2" cathode of the set width counter 1116 and the "teens" tube 1122 associated therewith were rendered conductive. When the "teens" tube 1122 is rendered conductive, its cathode potential increases, and this increase in potential is impressed through resistors 1157 and 1160 to the control grid of the "units" tube 1125, thereby conditioning this latter tube for conduction. As the count on the set width counter 1116 is reduced by the series of pulses appearing on the lead 1155 and applied to the driver tube 1156, the glow of the set width counter rotates in a counter-clockwise direction. In other words, the first pulse in the series of pulses will cause the "2" cathode of the set width counter to be rendered nonconductive and the "1" cathode thereof to be rendered conductive. Similarly, the second pulse in the series will render the "1" cathode nonconductive and will render the "0" cathode conductive. When the "0" cathode of the set width counter 1116 is rendered conductive, the positive potential appearing thereon again renders the diode 1130 nonconductive. However, since the "units" tube 1125 is nonconductive at this time, no positive potential appears on the lead 1131 and at the junction point 1132 to energize the brake solenoid 1145 and set the brake.

The positive potential appearing on the "0" cathode of the set width counter 1116 is also impressed through a diode 1161 to place a charge on a capacitor 1162. This positive charge is also applied to a diode 1165, but the diode 1165 is so connected to resistors 1166 and 1167 and a source 1170 of positive potential that the charge appearing on the capacitor 1162 is insufficient to render the diode 1165 conductive. When the third pulse in the series of pulses being applied to the lead 1155 renders the "0" cathode of the set width counter 1116 nonconductive and the "9" cathode thereof conductive, the positive pulse appearing on this latter cathode causes the charge on the capacitor 1162 to be doubled. Consequently, the positive voltage being applied to the diode 1165 is also doubled and is now sufficient to render the diode 1165 conductive. When the diode 1165 conducts, a sufficiently-positive potential is applied over a lead 1171 and to the control grid of the conditioned "units" tube 1125 to render this tube conductive. Now, with the "units" tube 1125 conductive, as the set width counter 1116 steps around in a counter-clockwise direction and again reaches zero, the conduction of the "0" cathode thereof renders the diode 1130 nonconductive, and, since the "units" tube 1125 is also conducting at this time, the positive potential on the cathode thereof is impressed on the lead 1131 and on the junction point 1132 to cause the energization of the brake solenoid 1145 and the setting of the brake 206. It can be seen, then, that the brake 206 was released and the drum 170 rotated during the time that it took for the set width counter 1116 to be driven from a count of twelve to zero. This will cause the drum 170 to rotate exactly twelve units of set width, the set width of the upper case "A." Also, as described hereinabove, the energization of the brake solenoid 1145 is caused by the tube 1142 being rendered conductive. When the tube 1142 is rendered conductive, its increased cathode potential, being applied over the lead 1070 to the grid of the cathode follower 1075, renders this latter tube conductive to place a positive potential on the cathode thereof. This positive potential is impressed over the lead 1076 to energize the conditioned one of the flash control tubes 1063 to 1067, inclusive, at a predetermined time after the setting of the brake, and, after a further delay, to cause the restoring tube 1085 to conduct to extinguish the conducting one of the flash storage tubes 1053 to 1057, inclusive.

*Word Space Reproduction*

To show how the word spaces appearing in the line to be reproduced are increased to result in a perfectly-justified line, the examples used hereinabove will again be assumed. That is, it will be assumed that five word spaces appear in a line to be reproduced and that twenty-seven units remain to be justified in such line. Also, it will be assumed that the minimum word space chosen by the setting of the minimum word space selector switch 491 in the recorder is five units, that is, if no units happen to remain in a line to be reproduced, all of the word spaces appearing in such line will have a set width of five units. However, it will be assumed that twenty-seven units remain in the line to be justified so that these twenty-seven units must be divided and apportioned to predetermined word spaces to enlarge such spaces.

It will be remembered that, as far as the minimum set width of each word space in a line to be justified is concerned, this value was determined by which input lead to the 15-to-4 converter 81 in the recorder was energized, in a manner similar to the set width of any character. Therefore, assuming that the minimum word space selector switch 491 is set on the number "5" position, signals representing five units of set width will appear at the output of the 15-to-4 converter 81 in the recorder, will be passed by the corresponding ones of the filters 130 to 139, inclusive, in the printer and will be applied to the associated input leads of the 4-to-15 converter 165 in printer. Consequently, a signal indicative of five units of set width will appear on an output lead 1180 of the 4-to-15 converter 165 and will be applied to the input circuit of the set width counter 1116. This signal will render conductive a diode 1181 to place a positive potential on the grid of the right-hand side of a tube 1182 and to render this side conductive. When the right-hand side of the tube 1182 conducts, its anode potential drops, and this decreased potential is passed over a lead 1185 and a lead 1186 to render conductive the "5" cathode of the set width counter 1116. Since the "teens" tube 1122 is not rendered conductive at this time, a count of five only is registered on the set width counter 1116.

Again, the "0" cathode of the set width counter 1116 had been conducting before a signal indicative of a set width of five was applied to the lead 1180. As described with reference to the upper case "A", when the "0" cathode of the set width counter is conducting, a positive potential appears on the junction point 1132 to maintain energization of the brake solenoid 1145 and to maintain the brake 206 in its set condition. It can be seen, then, that when the set width counter 1116 registers the count of five, the amount of minimum word space, the "0" cathode thereof is rendered nonconductive to remove the positive potential from the junction point 1132 and to de-energize the brake solenoid 1145 which causes the brake 206 to release and the drum 170 to rotate. Consequently, pulses will again be generated by the rotation of the multi-windowed disk 210, and the set width counter 1116 will again be driven in a counter-clockwise direction, as in the case of the printing of the upper case "A." However, since twenty-seven units remained in the line, and since the justification of the line is caused by dividing this number of units and adding them to the minimum word space units, it is necessary to prevent the brake 206 from being set when the set width counter is driven to zero. In other words, the brake 206 must not be set after only five units of rotation of the drum 170 since the word space width must be increased over the five units of minimum word space.

It will be remembered, when describing the justification control hereinabove, that the word space counter 880 was driven to a count of five and that twenty-seven pulses were applied to the driving circuit for the justification counter 886. It was described how the justification counter will be driven up to a count of five, at which time coincidence between the word space counter 880 and the justification counter 886 is sensed by the coincidence circuit 922 to cause the justification counter to be reset to zero. It will also be remembered that each time the "1" cathode of the justification counter 886 conducted, the word space add counter 910 was driven up one count. Since, in the examples used, the "1" cathode of the justification counter conducted six times, a count of six was registered on the word space add counter 910, that is, the "6" cathode thereof was rendered conductive after the justification computation period ended. Also, it might be mentioned again that, under these assumed conditions, the first two word spaces in the line to be reproduced have a set width of eleven units and the last three word spaces in such line have a set width of ten units.

Referring again to the set width counter 1116, under the assumption that the minimum word space contains five units of set width, a signal on the lead 1180 energizes this counter so that a count of five is registered thereon. Also, a series of five pulses generated by the photocell 213 will drive the set width counter to zero. However, when the word space was chosen in the recorder, not only were signals indicative of its minimum set width set into the 15-to-4 converter 81 in the recorder, but also signals indicative of its being a word space were set into the 31-to-5 converter 42. It was shown that these signals energized certain of the oscillators 237, 260 and 261 to place predetermined frequencies on the magnetic tape 70. When these frequencies are sensed by the pick-up heads 800 and 801, output signals indicative of a word space are applied to the 5-to-31 converter 140 and tracing the circuitry therein will show that a pulse for each word space will appear on the output lead 965 of the 5-to-31 converter 140.

The pulse on the lead 965 is passed through the diode 966 and applied to the grid of the right-hand side of the coincidence control tube 967, rendering this side conductive. When the right-hand side of the tube 967 is rendered conductive, its anode potential drops, and this decrease in potential is passed through a resistor 1187 and a diode 1190 to the junction point 1132. Consequently, this negative potential on the junction point 1132 prevents the junction point from going sufficiently positive to set the brake 206 when the "0" cathode of the set width counter 1116 again conducts by virtue of this counter's being driven down from five to zero. Therefore, when units remain to be justified in a line to be reproduced, the brake 206 will not be set after only the minimum word space units have been counted down on the set width counter 1116, the minimum word space being five units in the example being described. As a result, the set width counter 1116 will not be stopped when the "0" cathode thereof conducts, but the cathodes thereof will continue to be rendered conductive successively in a counterclockwise direction. Keeping in mind that, under the assumed conditions, six units of set width are to be added to the first word space, these six units are so added when coincidence is sensed between the set width counter 1116 and the word space add counter 910 by a coincidence circuit 1191.

The coincidence circuit 1191 operates in a similar manner as the coincidence circuit 922 located between the word space counter 880 and the justification counter 886. When coincidence is sensed thereby, a positive potential is applied to a lead 1192 and to the lead 1136 which, as described above, is the input to the brake control tube 1142. Consequently, when such coincidence is sensed, the brake solenoid 1145 will be energized and the brake 206 will be set, and not when the set width counter 1116 reaches zero, as in the case of characters. More particularly, during the time that the set width counter 1116 was driven down from a count of five to zero, the "units" tube 1125 associated therewith was conducting. Conduction of this tube and the positive potential on the cathode thereof condition an "add units" tube 1195 for conduction. When the "0" cathode of the set width counter 1116 conducts, the capacitor 1162 is charged to a positive voltage which is insufficient to render the diode 1165 conductive, and, when the "9" cathode of this counter conducts, the diode 1165 is rendered conductive to apply a positive potential over the lead 1171 and through a capacitor 1196 to the control grid of the "add units" tube 1195, rendering this tube conductive. With the "add units" tube 1195 associated with the set width counter 1116 conductive and with a "units" tube 1197 associated with the word space add counter 910 conductive, a positive potential will be applied to the output lead 1192 to set the brake 206 only when coincidence exists between the set width counter 1116 and the word space add counter 910. Such coincidence will be caused after the set width counter 1116 has been driven six units past its zero position, that is, when the "4" cathode thereof is conducting. As in the case of the coincidence circuit 922, three paths can possibly exist to shunt the positive voltage from the lead 1192 in the coincidence circuit 1191. If all of these shunt paths are blocked, the positive potential on the cathode of the now-conducting "units" tube 1197 will be impressed over a lead 1200, through a resistor 1201, over a lead 1202 and through a junction point 1205 and a diode 1206 to the output lead 1192.

The three paths that can exist to shunt the positive voltage on the cathode of the "units" tube 1197 from the output lead 1192 include diodes 1210, 1211 and 1212. However, when the "4" cathode of the set width counter 1116 is conducting, the positive potential thereon prevents the diode 1210 from conducting. When the "6" cathode of the word space add counter 910 is conducting, the diode 1211 is prevented from conducting. And, finally, when the "add units" tube 1195 is conducting, the positive potential on the cathode thereof is impressed on a lead 1213 and to the diode 1212 to prevent the conductance of this latter diode. Consequently, no shunt exists for the positive voltage on the cathode of the "units" tube 1197 when the set width counter 1116 has counted six units past its zero position to cause coincidence with the set width add counter 910, and such voltage will be impressed on the leads 1192 and 1136 to energize the tube 1142 and the brake 206 after six additional units of escapement have been added to the five units of set width in the minimum word space to provide the first word space in the line to be reproduced with eleven units of set width. It will be noted that when the tube 1142 conducts, the decreased anode potential thereof is impressed through a capacitor 1215 to render the right-hand side of the tube 967 nonconductive. The increased anode potential thereof cuts off the diode 1190 to remove the negative potential therethrough from the junction point 1132.

The second word space to be received by the printer will be treated in the same manner as the first since the word space add counter 910 will still be registering a count of six. However, it will be remembered that the remainder of the two counts remaining in the justification counter 886 will be driven down one count by each of the first two word spaces and that, when the justification counter is again zeroed, a positive pulse is impressed on the lead 986 to drive the word space add counter 910 down one count. Consequently, the word space add counter 910 will register a count of only five for the remaining three word spaces in the line to be reproduced. When the word space add counter 910 registers a count of five, and with the "add units" tube 1195 and the "units" tube 1197 conducting, coincidence will be sensed by the coincidence circuit 1191 to apply a brake-setting positive potential on the lead 1192 when the set width counter 1116 has stepped in a counter-clockwise direction only five counts after zero. Consequently, the brake 206 is set after only five additional units of escapement have been added to the minimum set width of each of the last three word spaces. It can be seen that, since the total twenty-seven units remaining in the line to be reproduced have been expended by adding six units to the first two word spaces in the line and five units to the last three word spaces, the line will be perfectly justified.

*Line Feed*

Referring to FIG. 32, since the sheet 171 is secured to the drum 170 on its side, it can be seen that line feed can be caused by moving the drum 170 longitudinally of its axis. Such movement is obtained by a lead screw 1216 which moves a threaded arm 1217 connected to the drum 170. A motor 1220 is provided, and energization thereof will cause the lead screw 1216 to rotate. As will be described more fully hereinafter, certain increments of a revolution of the lead screw 1216 are equivalent to, for example, one-half point counts. Obviously, the amount that the lead screw 1216 is rotated can be set arbitrarily to any predetermined magnitude as determined by the setting in one-half points for the line spacing. For the present purposes, however, it is only necessary to describe how the lead screw 1216 is rotated to cause the line feed function and how long it is permitted to operate.

It will be remembered, when discussing the recorder hereinabove, that the operator types the line on the keyboard and control unit 40 until he realizes that insufficient room remains in the line to place the next-succeeding word therein. At this time, it was explained, the operator depresses the carriage return keylever. The actuation of this keylever places on the magnetic tape 70 a carriage return signal, signals representing the number of word spaces that appear in the line and the number of units to be justified remaining in the line and a re-set pulse. Since the magnetic tape 70 moves, in the printer, in a direction opposite to that in which it was moving in the recorder, the printer senses this information oppositely with respect to the direction in which it was placed on the tape. Consequently, the printer senses the re-set pulse first, and, as described hereinabove, this re-set pulse is applied to the output lead 865, of the 5-to-31 converter 140, to the re-set tube 866 and to the lead 870. This pulse is then applied over a lead 1221 and to the grid of a triode 1222, rendering the triode conductive.

The anode of the triode 1222 is connected through two diodes 1225 and 1226 to two switches 1227 and 1230, respectively. The switches 1227 and 1230 are associated with a "teens" counting tube 1231 and a "units" counting tube 1232, respectively, in a line feed counter 1235. Also, the switches 1227 and 1230 are connected to predetermined ones of a plurality of switch contacts 1236—1236 and 1237—1237, respectively, depending upon the amount of line feed desired. Each of the switch contacts 1236—1236 is connected to a corresponding cathode in the "teens" counter 1231, and each of the contacts 1237—1237 is connected to a corresponding one of the cathodes in the "units" counter 1232. Consequently, assuming that eighteen-point type is to be reproduced, a typical amount of line feed corresponds to twelve points. Since, as mentioned above and as will be described more fully hereinafter, the lead screw 1216 is rotated in increments which move the drum 170 longitudinally a distance equivalent to one-half point, the lead screw 1216 must rotate sufficiently to provide twenty-four one-half points of line feed for the drum 170. This information is determined beforehand, and the switches 1227 and 1230 are set to the desired number of one-half points, which number is registered in the counters 1231 and 1232 of the line feed counter 1235. Consequently, the switch 1227 will be placed on the contact 1236 connected to the "2" cathode of the "teens" counter 1231, and the switch 1230 will be connected to the contact 1237 associated with the "4" cathode of the "units" counter 1232.

Normally, the triode 1222 is nonconductive so that its anode potential is at some relatively-high value which prevents conduction of the diodes 1225 and 1226. However, when the re-set pulse is applied over the lead 1221 and to the grid of the triode 1222, the triode 1222 is rendered conductive, its anode potential drops, and this decreased potential renders the diodes 1225 and 1226 conductive. Consequently, a negative potential is applied through the diode 1225 to the "2" cathode of the counter 1231, and a negative potential is applied through the diode 1226 to the "4" cathode of the counter 1232. Also, prior to the receipt of the re-set pulse over the lead 865, the "0" cathodes of the counters 1231 and 1232 were conducting. When the "0" cathode of the counter 1231 is conducting, a positive potential is applied over the leads 1240 and 1241 to a junction point 1242. Also, when the "0" cathode of the counter 1232 is conducting, a positive potential is applied over a lead 1245 to render a diode 1246 nonconductive. Nonconduction of the diode 1246 permits the positive potential appearing on the "0" cathode of the counter 1231 to be applied through the junction point 1242 and to the grid of a thyratron 1247 to maintain the thyratron normally conductive. With the thyratron 1247 normally conductive, a relay 1250, connected in the anode circuit thereof, is normally held energized. When the relay 1250 is energized, contacts 1251—1251 associated therewith and energized thereby are held normally open. Therefore, when the count of twenty-four is set into the line feed counter 1235, the "0" cathodes of the counters 1231 and 1232 no longer conduct, thereby removing the positive potential from the grid of the thyratron 1247, rendering this tube nonconductive and de-energizing the relay 1250. When the relay 1250 de-energizes, the contacts 1251—1251 are closed to energize the line feed motor 1220 and thereby rotate the lead screw 1216.

A multi-lobed cam 1252 is secured fixedly to one end of the lead screw 1216 and adjacent thereto is a switch 1253. Valleys and peaks on the cam 1252 cause the switch 1253 to close and to open alternately during the rotation of the lead screw 1216. The distance between corresponding points on the lobes of the cam 1252 are such that, at a predetermined speed of the line feed motor 1220, the lead screw 1216 is rotated to move the drum 170 longitudinally of its axis a distance of one-half point. Consequently, twenty-four such closures will cause the drum 170 to move the desired twelve points along its axis. Referring to FIG. 30, each time the switch 1253 closes, the left-hand side of a trigger tube 1255 is rendered conductive, and the right-hand side thereof cuts off to place a positive pulse on the grid of a driver tube 1256 associated with the counter 1232. The tube 1255 then reverts to its condition as shown in FIG. 30 in preparation for the next closure of the switch 1253. The operation of the line feed counter 1235 is similar to the operation of the line length indicator 101 in the recorder in that each pulse being applied to the grid of the driver tube 1256 drives the counter tube 1232 down one count. After twenty-four of such pulses, the "0" cathodes of the counters 1231 and 1232 will again conduct so that a positive potential is again applied to the junction point 1242 and to the control grid of the thyratron 1247, thereby rendering this thyratron conductive. When the thyratron 1247 is again rendered conductive, the relay 1250 is again energized to open the contacts 1251—1251 and to de-energize the line feed motor 1220. It can be seen that the line feed motor 1220 has rotated the lead screw 1216 the correct amount to provide twenty-four one-half points of line feed for the drum 170.

*Right Margin*

It was stated hereinabove that the information concerning the reproduction of a page is placed on the magnetic tape 70 in a one direction and is sensed by the printer in the opposite direction. Consequently, the printer starts such a page at the lower, right-hand side thereof and proceeds to reproduce the bottom line from right to left. Since the rotation of the drum 170 causes this right-to-left reproduction of the line, and since the drum 170 will terminate at the end of the reproduction of each line at the left side of such line, it is obvious that the drum must be returned to the right margin of the next-succeeding line to be reproduced. It is also obvious that a line feed is necessary since the next-succeeding line to be reproduced will be, on the final, reproduced page, the line immediately above the line which was just reproduced. The line feed feature was described hereinabove, and the structure for returning the drum 170 to the right margin so that it will be in the correct position at the start of the next-succeeding line, will now be described.

It will be remembered that the printer senses a re-set pulse first, and then senses the word spaces in the line, the units to be justified and the carriage return signal. The first signal received, the re-set pulse, is instrumental in returning the drum 170 to the right margin position, the starting position of all printing. As described above, the re-set pulse is received over the lead 865, renders the left-hand side of the tube 866 conductive and the right-hand side nonconductive and causes a positive potential to be applied over leads 870, 871 and 1000 and to the grid of the triode 1001, rendering this triode conductive. When the triode 1001 conducts, its anode potential drops, and this decreased potential is applied over a lead 1260 and through a diode 1261 to the grid of the left-hand side of a brake-holdoff tube 1262, rendering this side of the tube 1262 nonconductive. The right-hand of the tube 1262 is thereby rendered conductive so that its anode potential drops, and this drop in potential is impressed on a lead 1265, through a diode 1266 and on a lead 1267 to the grid of the left-hand side of the tube 1140, thereby rendering this side nonconductive. As was described hereinabove, the right-hand side of the tube 1140 will be rendered conductive, its anode potential will drop, and this decreased potential is impressed on the grid of the tube 1142 to render the tube 1142 nonconductive, to de-energize the brake solenoid 1145 and to release the brake 206. As a result, the drum 170 will be rotated until a projecting lug 1270 (FIG. 32) connected thereto strikes and closes a right margin switch 1271 (FIGS. 29 and 32). When the right margin switch 1271 is closed, ground potential is applied to the grid of the right-hand side of the brake-holdoff tube 1262 to again render this side nonconductive and to remove the negative potential from the leads 1265 and 1267 and from the left-hand side of the tube 1140. Consequently, the right-hand side thereof is again rendered nonconductive, and its increased anode potential is applied to the grid of the tube 1142 to again energize the brake solenoid 1145, set the brake 206 and stop the drum 170 from rotating.

After the drum 170 is so set at the right margin position, the justification information, including the number of units remaining in a line to be justified and the number of word spaces therein, is received. Thereafter, the carriage return signal is received. Should, for any reason, the carriage return signal be received before the line feed and right margin operations have been completed, another feature of the invention includes stopping the magnetic tape 70 to prevent the sensing of any printing pulses before the printer is in the correct position to print, that is, before the drum 170 has been rotated to its right margin position and moved longitudinally to its correct line feed position. To accomplish this result, the carriage return signal, which is applied to the lead 990 (FIG. 26), is applied to the grid of the inverter 991, thereby rendering this tube conductive. The anode potential of the tube 991 decreases, and the decreased potential is impressed through a diode 1275 and to the right-hand side of a trigger tube 1276 in a tape circuit 1277, rendering this side nonconductive and rendering the left-hand side thereof of conductive. When the left-hand side of the tube 1276 conducts, its anode potential drops, and a decreased potential is applied over a lead 1280 and to the grid of a normally-conducting triode 1281, thereby rendering the triode 1281 nonconductive. A tape relay solenoid 1282 is connected in the anode circuit of the triode 1281, and the normal conduction of the triode 1281 maintains this solenoid normally energized. When the triode 1281 is rendered nonconductive, the tape solenoid 1282 is de-energized, contacts 1283—1283 associated therewith are opened to de-energize instrumentalities (not shown) which cause the stopping of the feeding of the tape. Such instrumentalities may include, for example, a pair of pressure rollers between which the magnetic tape 70 is located and by which the tape is moved. These rollers may be maintained against each other normally when the tape relay solenoid 1282 is in its normally-energized position. When this solenoid is de-energized, one of the pressure rollers may be actuated to move away from the other roller so that the feeding of the tape is prevented.

Obviously, if the right-margin positioning and the line feed positioning of the drum 170 have been completed before the carriage return signal is sensed, no stopping of the magnetic tape 70 is desirable. Consequently, a second set of contacts 1284—1284 (FIG. 28) is provided to be energized by the line feed relay 1250. As described hereinabove, when the line feed function has ceased, that is, when the counters 1231 and 1232 are zeroed, the line feed relay 1250 is again energized. Such energization of the line feed relay 1250 causes the contacts 1284—1284 to be closed. Thereafter, when the drum 170 is placed at its right-margin posoition and the brake 206 is set, the tube 1075 is conducting so that its cathode is at some relatively-high potential which is impressed over the lead 1285 and through the contacts 1284—1284 to the grid of the right-hand side of the trigger tube 1276 in the tape circuit 1277. Consequently, the right-hand side of the tube 1276 will be maintained conductive, and such conduction will prevent the stopping of the tape 70 by preventing the carriage return signal from rendering the left-hand side of the trigger tube 1276 conductive. As described hereinabove, when the left-hand side of the trigger tube 1276 is rendered conductive, the tape is stopped. Consequently, it can be seen that if the carriage return signal is received at its proper time, that is, after the right-margin and line-feed functions have been completed, there can be no stopping of the magnetic tape 70.

*Error*

Referring to FIG. 37, assume that a correct line is put on the magnetic tape 70 and that the carriage return keylever was depressed. The carriage return signal will be placed on the magnetic tape, the justification information will be placed thereon and a re-set pulse will be also impressed on the tape. As described hereinabove this re-set pulse will cause the right-margin and line-feed functions to occur. Then, assume that during the typing of the next-succeeding line, an error is made therein. To prevent this erroneous line from being reproduced, the operator depresses an error keylever on the keyboard unit 40, and, thereafter, the carriage return keylever. This second actuation of the carriage return keylever places another re-set pulse on the magnetic tape 70. As the magnetic tape 70 moves through the printer, it senses this second re-set pulse first, it then senses the error signal and senses the first reset pulse last. The effect of the reception of these signals in this order by the printer will now be described.

The receipt of the first re-set pulse will cause the right-margin and line-feed functions to occur, as described hereinabove. The sensing of the error signal will energize predetermined ones of the filters 130 to 139, inclusive, to energize the 5-to-31 converter 140 such that a positive pulse is applied to an output lead 1290 of the converter 140. This positive pulse is impressed on the grid of an error amplifier 1291, and a negative pulse on the anode thereof is applied to the grid of the normally-conducting, right-hand side of an error tube 1292, thereby rendering this side nonconductive and the left-hand side conductive. When the left-hand side of the error tube 1292 is rendered conductive, its anode potential drops, and this drop is impressed on a lead 1295. The lead 1295 is connected to a predetermined section of the power supply (not shown) which normally provides a biasing voltage of −20 volts to the control grids of certain tubes in the circuit. Such tubes include the triode 1222 (FIG. 30) in the line feed counter circuit 1235 and the cathode followers associated with the filter circuits 130, 131, 135 and 136. It will be remembered that the signals passed by these filters were instrumental in providing the proper set width of characters and functions. The effect of the decreased anode potential of the left-hand side of the error tube 1292 is to drop the −20 volts of the power supply to −50 volts. Consequently, the triode 1222 in the line feed counter circuit 1235 can no longer conduct, nor can the output of the filters 130, 131, 135 and 136 be applied to the 4-to-15 converter 165.

When the first re-set pulse was received by the printer over the lead 865, it was impressed through the trigger tube 866 and over the leads 870 and 1221 to the grid of the triode 1222 in the line feed counter 1235. Conduction of the triode 1222 caused the proper line feed to occur and permitted the drum 170 to be moved longitudinally the proper amount. This occurred prior to the error signal being received. When the error signal is received, the −20 volts connected to the grid of the triode 1222 is dropped to −50 volts. Thereafter, when the second re-set pulse appears, no further line feed can occur since the positive pulse equivalent to the re-set pulse appearing on the lead 1221 is ineffective to render the triode 1222 conductive. Also, since the outputs of the filters 130, 131, 135 and 136 are prevented from energizing the 4-to-15 converter 165, no set widths in the erroneous line can energize the set width counter 1116 so that this counter remains at its zero position.

Further, since the right-hand side of the error tube 1292 is held cut off by virtue of the negative potential from the anode of the error amplifier 1291 over the lead 1295, the positive potential on the anode of the right-hand side of the tube 1292 is applied through a diode 1296 and over the lead 1267 to the grid of the left-hand side of the trigger tube 1140, thereby maintaining the left-hand side of this tube conductive. It will be remembered that when the left-hand side of the tube 1140 is conducting, the brake solenoid 1145 is maintained in its energized condition so that the brake 206 is set to prevent rotation of the drum 170. This action assures that the drum 170 will be held at its right-margin position in preparation of a correct, next-succeeding line. Finally, when the second carriage return signal is applied over the lead 990, the inverter 991 is rendered conductive. When the inverter 991 conducts, its anode potential drops, and this decreased potential is impressed through a diode 1298 and to the grid of the left-hand side of the error tube 1292. Consequently, the left-hand side of the tube 1292 is again rendered nonconductive, its anode potential increases, and such an increase in potential is applied over the lead 1295 and to the power supply to cut off the inhibiting voltage of −50 volts and to reinstate the original bias voltage of −20 volts. As a result, the next-succeeding, correct line will be reproduced and the partial, erroneous line will have no effect on the printer.

It is to be understood that the above-described embodiment of the invention is merely illustrative of the principles thereof and that numerous modifications and embodiments of the invention may be devised within the spirit and scope thereof.

What is claimed is:

1. A photocomposing system for reproducing text material, which comprises a keyboard unit having thereon a plurality of selectable keylevers associated with characters in the text material to be reproduced and functions used for such reproduction, each of the characters and certain of the functions having predetermined set widths, means for generating a separate control voltage upon selection of each character or function, a plurality of oscillators operable to provide output voltages of different frequencies, a first converter having a number of input terminals equal to the number of selectable keylevers on the keyboard unit, a plurality of output terminals and means therein for applying voltages to predetermined and exclusive combinations of the output terminals upon the application of a voltage to each of the input terminals thereof, means for connecting each output terminal of the first converter to a predetermined one of the oscillators, means for applying the control voltage associated with each selected keylever to one of the input terminals of the first converter for energizing a first exclusive combination of the oscillators in accordance with the identification of the characters or functions selected, a second converter having a number of input terminals equal to the number of different set widths of the characters and functions, a plurality of output terminals and means therein for applying voltages to predetermined and exclusive combinations of the output terminals upon the application of a voltage to each of the input terminals thereof, means for connecting each output terminal of the second converter to a predetermined one of the oscillators, means for applying the control voltage associated with each selected keylever to one of the input terminals of the second converter for energizing a second exclusive combination of the oscillators in accordance with the set width of the character or function selected, and means energized by the output voltages of the oscillators for reproducing the text material.

2. In a photocomposing system for reproducing a plurality of selectable characters having predetermined set widths, means for generating an exclusive control voltage upon the selection of each of the characters, means for converting each control voltage into a signal corresponding to the set width of the selected character, a set width counter, a set width counter driving circuit for decreasing the count registerable on the set width counter, means for applying the signal to the set width counter for registering thereon a count corresponding to the selected character, a line length indicator including a counter for registering a count corresponding to the complete length of each line prior to the selection of any characters in such line, a line length indicator driving circuit for decreasing the count registered on the counter in the line length indicator, a normally-ineffective multivibrator, means energized by the means for applying a signal to the set width counter for rendering the multivibrator effective to supply a plurality of output pulses, means for applying the multivibrator output pulses to the driving circuits associated with the set width counter and the counter in the line length indicator to decrease the counts registered on the counters by an amount corresponding to the set width of the selected character, and means for again rendering the multivibrator ineffective after the counts registered on the counters are so decreased.

3. A photocomposing system for reproducing characters in lines of text material, which comprises a plurality of oscillators operable to provide output voltages at different frequencies, means for energizing predetermined ones of the oscillators in accordance with the identification of the selected characters to be reproduced, means for energizing predetermined ones of the remaining oscillators in accordance with the corresponding set widths of the selected characters, line length indicating means operated by the last-mentioned means for indicating the decreased length of each line remaining after each character selection in order to determine the number of characters capable of selection for each such line, manually-actuable switching means selectable upon the occurrence of a shortened line of characters to be reproduced, pulse generating means energized upon the selection of the switching means for energizing predetermined ones of the remaining oscillators in accordance with a predetermined amount of set width, means operated by the pulse generating means for decreasing the indication of line length on the line length indicating means by the predetermined amount of set width, means for reproducing each line of characters successively, and means energized by the output voltages of the oscillators for controlling the reproducing means.

4. A photocomposing system for reproducing and justifying lines of text material including words composed of characters and spaces between such words, which comprises a keyboard unit having thereon a plurality of keylevers corresponding to each character in the text material and to the word space function, a plurality of oscillators operable to provide output voltages of different frequencies, means for energizing predetermined ones of the oscillators upon the selection of each keylever on the keyboard unit, means for registering the number of word spaces selected in each line, means for indicating the amount of space remaining in each line with respect to a predetermined line length after each keylever selection, means under the control of the line length indicating means for generating a plurality of pulses corresponding to the amount of space remaining in each line upon the last keylever selection therein and for applying such pulses to predetermined ones of the oscillators to energize such oscillators, means under control of the word space registering means for generating a plurality of pulses corresponding to the number of word space selections in each line and for applying such pulses to predetermined ones of the oscillators to energize such oscillators, a storage medium, means for energizing the storage medium with the output voltages of the oscillators, means for reproducing and justifying each line of the text material, and means energized by the storage medium for controlling the operation of the reproducing and justifying means.

5. A photocomposing system for reproducing text material including words composed of characters and spaces between the words, which comprises a keyboard unit having thereon a plurality of selectable keylevers associated with characters in the text material and the word space function, a plurality of oscillators operable to provide output voltages at different frequencies, a first converter energized by each selection of a key-lever for translating each associated character or word space function according to its identification into a plurality of output voltages which are exclusive to the selected character or function, means for applying the output voltages of the first converter to predetermined ones of the oscillators for operating such oscillators, a second converter energized by each selection of a keylever for translating each associated character or word space function according to its set width into a plurality of output voltages which are exclusive to the selected character or function, means for applying the output voltages of the second converter to predetermined ones of the oscillators for operating such oscillators, means for registering the number of word spaces selected in each line, means for registering the amount of space remaining in each line after the selection of each character and word space function, means for applying control pulses indicative of the amount of space remaining in each line and under the control of the registering means therefor to predetermined ones of the oscillators to energize such oscillators, means for applying control pulses indicative of the number of word spaces selected in each line and under the control of the registering means therefor to predetermined ones of the oscillators to energize such oscillators, means controlled by the oscillators energized by output voltages from the two converters for reproducing the characters and word space functions in each line, and means controlled by the oscillators energized by the two control-pulse-applying means for justifying each such line.

6. In a system for reproducing text material, means for generating a signal having a predetermined and exclusive number of different frequencies for each character in the text material to be reproduced, a plurality of filter circuits each of which is designed to pass one of the frequencies of which the signal is comprised, means controlled by the outputs of the filter circuits for reproducing the text material, means for normally short-circuiting the filter outputs and thereby preventing such outputs from energizing the reproducing means, a time-delay circuit energized by the filter circuit associated with the highest frequency of which the signal is comprised, and means energized by the time-delay circuit for rendering the short-circuiting means ineffective after a predetermined time to apply all of the filter outputs simultaneously to the reproducing means.

7. An apparatus for composing and justifying lines of text material including words composed of characters and spaces interposed between such words, which comprises means for selectively representing each character of a predetermined set width and each word space of a minimum set width by an exclusive signal, a surface on which the text material is to be reproduced, means energized by each signal representing a selected character for reproducing such character on the surface, a first counter, means energized by the signals for registering in the first counter a count corresponding to the set width of each selected character upon the selection thereof and a count corresponding to the minimum set width of the word space upon its selection, means controlled by the first counter for advancing the surface a distance corresponding to the set width of each character upon the selection of such character, a second counter, means for registering in the second counter a count corresponding to the amount of space to be added to each word space of minimum set width in order to justify a line of the text material, and means controlled by the two counters and energized upon the selection of the word space function for advancing the surface an amount corresponding to the sum of the counts registered on the two counters.

8. An apparatus for composing and justifying lines of text material including words composed of characters and spaces interposed between such words, which comprises means for selectively representing each character of a predetermined set width and each word space function of a minimum set width by an exclusive signal, a surface on which the text material is to be reproduced, means energized by each signal representing a selected character for reproducing such character on the surface, a first counter having a predetermined number of stages therein, means for registering in the first counter a count corresponding to the set width of each character upon the selection thereof, means controlled by the first counter for advancing the surface a distance corresponding to the set width of each character upon the selection thereof, a second counter having a predetermined number of stages therein, a coincidence circuit connecting each of the stages of the first counter to a corresponding one of the stages of the second counter, means for registering in the first counter a count corresponding to the minimum set width of each word space upon the selection thereof, means for registering in the second counter a count corresponding to the amount of set width which must be added to the word space of minimum set width in order to justify a line, and means controlled by the two counters and the coincidence circuit upon the selection of the word space function for advancing the surface a distance corresponding to the minimum set width of the word space and the set width which must be added in order to justify the line.

9. An apparatus for composing and justifying lines of test material including words composed of characters and spaces interposed between such words, which comprises means for selectively representing each character to be reproduced and the word space function by an exclusive signal, means for generating an exclusive signal corresponding to the amount of space remaining in each line of the text material to be reproduced, a first counter controlled by the word space signal for registering therein a count corresponding to the total number of word spaces selected in each line, a second counter controlled by the signal corresponding to the amount of space remaining in each line for registering a total count corresponding thereto, a coincidence circuit for producing an operating pulse each time the count registered in the second counter is divisable integrally with the count registered in the first counter, and means controlled by the last-mentioned means and the word space signal for increasing the word spaces to justify each line.

10. An apparatus for composing and justifying lines of text material including words composed of characters and spaces interposed between such words, which comprises means for selectively generating an exclusive signal corresponding to each character to be reproduced and the word space function, means for generating exclusive signals corresponding to the amount of space remaining in each line of the text material to be reproduced, means controlled by the character signals for reproducing the characters corresponding thereto, a first counter, means controlled by the word space signals for registering in the first counter a count corresponding to the total number of spaces selected in each line, a second counter, means controlled by the signals corresponding to the amount of space remaining in the line for increasing the count registered in the second counter, a coincidence circuit for resetting the second counter to an initial count each time the increasing count therein is similar to the count registered in the first counter, means energized by the second counter for reproducing a pulse each time the predetermined count is registered therein, a third counter, means controlled by the pulse-producing means for increasing the count registered in the third counter, and means controlled by the last-mentioned means and the word space signal for increasing the space between the words in the reproduced text material.

11. An apparatus for composing and justifying lines of text material including words composed of characters and spaces between such words, which comprises a plurality of counters initially registering predetermined counts and including a set width counter, a word space counter, a justification counter and a word space add counter, means for reproducing the characters upon the selections thereof, means for registering in the set width counter a count corresponding to the width of each character and a minimum width of each word space upon the selections thereof, means controlled by the set width counter for advancing the reproducing means, upon the selection of a character, a distance corresponding to the width of the character, means for registering in the word space counter a count equal to the number of word spaces selected in each line, means for generating a series of pulses corresponding to the amount of space remaining to be justified in a line of the text material subsequent to the selection thereof and for applying such pulses to the justification counter to increase the count therein, a coincidence circuit connected between the word space counter and the justification counter for resetting the justification counter to its initial count and thereby effectively dividing the number of pulses in the series by the number of word spaces, means for increasing the count registered in the word space add counter each time the justification counter registers a predetermined count other than its initial count, and means controlled by the set width counter and the word space add counter for advancing the reproducing means a distance corresponding to the sum of the counts registered on the two counters upon the selection of the word space function.

References Cited in the file of this patent

UNITED STATES PATENTS

| | | |
|---|---|---|
| 1,732,049 | Hunter | Oct. 15, 1929 |
| 1,893,158 | Chereix | Jan. 3, 1933 |
| 2,058,398 | Bear | Oct. 27, 1936 |
| 2,275,017 | McNaney | Mar. 3, 1942 |
| 2,388,961 | Elliott | Nov. 13, 1945 |
| 2,603,418 | Ferguson | July 15, 1952 |
| 2,714,842 | Hooven | Aug. 9, 1955 |
| 2,769,379 | Perry | Nov. 6, 1956 |
| 2,786,400 | Perry | Mar. 26, 1957 |
| 2,816,163 | Robin | Dec. 10, 1957 |